(12) United States Patent
Badic et al.

(10) Patent No.: US 10,812,125 B1
(45) Date of Patent: Oct. 20, 2020

(54) RADIATION EXPOSURE CONTROL FOR BEAMFORMING TECHNOLOGIES

(71) Applicant: Intel Corporation, Santa Clara, CA (US)

(72) Inventors: Biljana Badic, Munich (DE); Michael Glik, Kfar Saba (IL); Bertram Gunzelmann, Koenigsbrunn (DE); Tom Harel, Shefayim (IL); Yeong-Sun Hwang, Oberhaching (DE); Andre Janssen, Munich (DE); Jonathan Kosloff, Tel Aviv (IL); Sebastian Mitelberg, Tzur Yitzchak (IL); Markus Dominik Mueck, Unterhaching (DE); Bernhard Raaf, Neuried (DE); Jianqiang Rao, Unterhaching (DE); Nir Tishbi, Kfar Saba (IL); Zhibin Yu, Unterhaching (DE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/427,372

(22) Filed: May 31, 2019

(51) Int. Cl.
*H04W 52/30* (2009.01)
*H04B 1/3827* (2015.01)
(Continued)

(52) U.S. Cl.
CPC ......... *H04B 1/3838* (2013.01); *H04B 7/0408* (2013.01); *H04B 7/0691* (2013.01);
(Continued)

(58) Field of Classification Search
CPC . H04W 52/30; H04W 72/30; H04W 72/0446; H04W 72/048; H04W 72/085;
(Continued)

(56) References Cited

U.S. PATENT DOCUMENTS 4,628,356 A * 12/1986 Spillman .............. G01N 23/043
   348/E5.086
5,490,196 A * 2/1996 Rudich ................ G01V 5/0041
   378/101

(Continued)

FOREIGN PATENT DOCUMENTS

| EP | 1775856 A2 | 4/2007 |
| JP | 2011127910 A | 6/2011 |
| WO | 0051364 A2 | 8/2000 |

OTHER PUBLICATIONS

Jain, R.: Introduction 60 GHz Millimeter Wave Multi-Gigabit Wireless Networks. 2014; 60 pages; Washington University, St. Louis, MO, USA. https://www.cse.wustl.edu/~jain/cse574-14/ftp/j_07sgh.pdf [Online; accessed on May 27, 2019].

(Continued)

*Primary Examiner* — Hai V Nguyen
(74) *Attorney, Agent, or Firm* — Viering, Jentschura & Partner MBB

(57) ABSTRACT

A communication device includes an evaluator configured to evaluate one or more criteria, wherein a first criterion of the one or more criteria includes detecting an object, a determiner configured to determine one or more beam pairs from a plurality of potential beam pairs to use in communications with a second device based on the evaluation of the one or more criteria and transmit an indication of one or more partner-side beams of a selected beam pair of the one or more beam pairs to the second device, and a beam controller configured to adjust an antenna to communicate with the second device via a device-side beam of the selected beam pair.

19 Claims, 40 Drawing Sheets

(51) Int. Cl.
  *H04B 7/0408* (2017.01)
  *H04W 72/12* (2009.01)
  *H04W 72/08* (2009.01)
  *H04W 72/04* (2009.01)
  *H04B 7/06* (2006.01)

(52) U.S. Cl.
  CPC ......... *H04W 52/30* (2013.01); *H04W 72/048* (2013.01); *H04W 72/0446* (2013.01); *H04W 72/085* (2013.01); *H04W 72/1231* (2013.01)

(58) Field of Classification Search
  CPC ............. H04W 72/1231; H04B 1/3838; H04B 7/0408; H04B 7/0691
  USPC ........................................................ 455/522
  See application file for complete search history.

(56) References Cited

U.S. PATENT DOCUMENTS

| | | | | |
|---|---|---|---|---|
| 6,580,525 B1* | 6/2003 | Iwakiri | ................ | H04N 1/0402 250/472.1 |
| 6,919,845 B2* | 7/2005 | Ozaki | ................ | G01R 29/0814 307/149 |
| 6,950,404 B2* | 9/2005 | Pearl | ................ | H04B 1/036 370/252 |
| 7,312,742 B2* | 12/2007 | Steinway | .............. | G01S 13/878 342/128 |
| 7,558,232 B2* | 7/2009 | Pearl | ................ | H04B 1/036 370/321 |
| 7,610,027 B2* | 10/2009 | Alapuranen | ........ | H04W 52/225 455/117 |
| 7,671,784 B2* | 3/2010 | Steinway | .............. | A61B 5/05 342/175 |
| 8,214,003 B2* | 7/2012 | Wong | ................ | H01Q 1/245 455/575.5 |
| 8,253,622 B2* | 8/2012 | Hampel | ................ | G01S 13/781 342/147 |
| 8,519,856 B2* | 8/2013 | Hyde | ................ | G08B 3/10 340/578 |
| 8,611,610 B2* | 12/2013 | Park | ................ | G06T 7/521 250/214 R |
| 8,686,865 B2* | 4/2014 | Hyde | ................ | A61N 1/16 340/600 |
| 8,781,687 B2* | 7/2014 | Han | ................ | B60R 21/015 280/735 |
| 8,787,996 B2* | 7/2014 | Friedlander | ........ | H04B 1/3838 455/423 |
| 8,798,695 B1* | 8/2014 | Zheng | ................ | G06F 1/1698 455/575.7 |
| 8,818,294 B2* | 8/2014 | Hochwald | .......... | H04B 7/0617 455/115.1 |
| 8,929,828 B2* | 1/2015 | Hochwald | .......... | H04B 7/0465 375/296 |
| 8,994,583 B2* | 3/2015 | Bruce | ................ | G01S 13/584 342/109 |
| 9,330,555 B2* | 5/2016 | Tesanovic | ........ | H04B 1/3838 |
| 9,354,304 B2* | 5/2016 | Kirsch | ............... | G01S 13/343 |
| 9,380,013 B1* | 6/2016 | Cashmore | ........ | G06Q 30/0263 |
| 9,407,309 B2* | 8/2016 | Lee | .................... | H04B 1/3838 |
| 9,515,378 B2* | 12/2016 | Prasad | ................ | H04B 7/0617 |
| 9,569,003 B2* | 2/2017 | Rofougaran | ........ | G06F 3/017 |
| 9,578,159 B2* | 2/2017 | Muthukumar | ........ | H04W 88/06 |
| 9,753,141 B2* | 9/2017 | Grauer | ................ | G01S 7/4868 |
| 9,780,856 B2* | 10/2017 | Cai | .................... | H04B 7/0617 |
| 9,871,350 B2* | 1/2018 | McLaurin | ............ | H01S 5/4093 |
| 9,910,109 B2* | 3/2018 | Thielens | .............. | G01R 33/12 |
| 9,961,647 B2* | 5/2018 | Lee | .................... | H04W 52/346 |
| 10,291,309 B2* | 5/2019 | Chakraborty | ........ | H04W 52/42 |
| 10,389,179 B2* | 8/2019 | Hannigan | .......... | H02J 50/10 |
| 10,436,888 B2* | 10/2019 | Li | ............................ | G01S 7/10 |
| 10,523,281 B2* | 12/2019 | Wilson | ................ | H04B 7/0617 |
| 2001/0027115 A1* | 10/2001 | Zilberberg | .......... | H01Q 1/245 455/575.5 |
| 2002/0011828 A1* | 1/2002 | Wallach | ............... | H04B 1/3838 324/76.15 |
| 2002/0167930 A1* | 11/2002 | Pearl | .................... | H04B 1/3838 370/345 |
| 2003/0080277 A1* | 5/2003 | Bauer, Jr. | ............ | G01R 29/0814 250/205 |
| 2005/0041746 A1 | 2/2005 | Rosen et al. | | |
| 2005/0215268 A1* | 9/2005 | Cheng | .................. | H04B 17/318 455/456.1 |
| 2006/0067245 A1* | 3/2006 | Pearl | .................... | H04B 1/3838 370/252 |
| 2007/0035427 A1* | 2/2007 | Schreier | .................. | H03M 3/40 341/143 |
| 2007/0035437 A1 | 2/2007 | Steinway et al. | | |
| 2007/0135154 A1* | 6/2007 | Gautier | ............... | H04B 1/3838 455/522 |
| 2007/0138284 A1* | 6/2007 | Giordano | ........... | H04N 1/02865 235/454 |
| 2008/0169961 A1* | 7/2008 | Steinway | ............... | G01S 13/878 342/27 |
| 2009/0143008 A1* | 6/2009 | Hottinen | ............... | H04B 7/0619 455/11.1 |
| 2010/0316163 A1* | 12/2010 | Forenza | ................ | H04L 1/0003 375/296 |
| 2011/0001659 A1* | 1/2011 | Hampel | .................... | G01S 3/74 342/120 |
| 2011/0002371 A1* | 1/2011 | Forenza | ................ | H04B 17/309 375/227 |
| 2011/0002410 A1* | 1/2011 | Forenza | ................ | H04B 7/0626 375/267 |
| 2011/0002411 A1* | 1/2011 | Forenza | ................ | H04B 7/024 375/267 |
| 2011/0003606 A1* | 1/2011 | Forenza | ................ | H04B 7/0417 455/501 |
| 2011/0003607 A1* | 1/2011 | Forenza | ................ | H04B 7/0413 455/501 |
| 2011/0003608 A1* | 1/2011 | Forenza | ................ | H04B 7/024 455/501 |
| 2011/0084939 A1* | 4/2011 | Gepner | .................. | G06F 3/017 345/175 |
| 2011/0118943 A1* | 5/2011 | Han | .................... | B60R 21/01534 701/46 |
| 2011/0176709 A1* | 7/2011 | Park | ...................... | G06T 7/521 382/106 |
| 2012/0092284 A1* | 4/2012 | Rofougaran | .......... | H04M 1/725 345/173 |
| 2012/0225411 A1* | 9/2012 | Puente | .................... | G09B 9/00 434/224 |
| 2012/0258672 A1* | 10/2012 | Hochwald | ............ | H04B 7/0617 455/67.14 |
| 2013/0090141 A1* | 4/2013 | Hottinen | ............... | H04W 72/1231 455/501 |
| 2013/0113647 A1* | 5/2013 | Sentelle | ................ | G01S 13/887 342/22 |
| 2013/0127652 A1* | 5/2013 | Bruce | .................... | G01S 13/584 342/109 |
| 2013/0172045 A1* | 7/2013 | Caballero | ............ | H04W 52/246 455/552.1 |
| 2013/0237272 A1* | 9/2013 | Prasad | ................ | H04B 7/0617 455/517 |
| 2014/0064401 A1* | 3/2014 | Wu | ...................... | H04B 7/0486 375/267 |
| 2014/0071008 A1* | 3/2014 | Desclos | ................ | H01Q 1/245 343/745 |
| 2014/0112403 A1* | 4/2014 | Falconetti | ............ | H04W 16/28 375/260 |
| 2014/0128032 A1* | 5/2014 | Muthukumar | ........ | H04W 4/12 455/411 |
| 2014/0153661 A1* | 6/2014 | Hochwald | ............ | H04B 7/0617 375/267 |
| 2014/0253365 A1* | 9/2014 | Kirsch | .................. | G01S 13/347 342/112 |
| 2014/0269443 A1* | 9/2014 | Hyde | .................... | H04L 12/1457 370/259 |
| 2014/0313041 A1* | 10/2014 | Tesanovic | ............ | H04B 1/3838 340/657 |

(56) References Cited

U.S. PATENT DOCUMENTS

| | | | | |
|---|---|---|---|---|
| 2014/0333939 | A1* | 11/2014 | Merettig | G01B 11/028 |
| | | | | 356/614 |
| 2015/0105031 | A1* | 4/2015 | Colombi | H04B 1/3838 |
| | | | | 455/73 |
| 2015/0171516 | A1* | 6/2015 | Chen | H01Q 3/00 |
| | | | | 342/368 |
| 2015/0188590 | A1* | 7/2015 | Lee | H04B 1/3838 |
| | | | | 455/566 |
| 2015/0340875 | A1* | 11/2015 | Prasad | H02J 50/30 |
| | | | | 307/104 |
| 2016/0002620 | A1* | 1/2016 | Montagnier | C12Q 1/689 |
| | | | | 435/173.1 |
| 2016/0178730 | A1* | 6/2016 | Trotta | G01S 7/354 |
| | | | | 342/175 |
| 2016/0211898 | A1* | 7/2016 | Cai | H04L 5/00 |
| 2016/0372893 | A1* | 12/2016 | McLaurin | H01S 5/32341 |
| 2017/0074974 | A1 | 3/2017 | Rao et al. | |
| 2017/0102457 | A1* | 4/2017 | Li | G01S 7/35 |
| 2017/0115395 | A1* | 4/2017 | Grauer | G01S 7/4868 |
| 2017/0179771 | A1* | 6/2017 | Leabman | H02J 5/005 |
| 2017/0187248 | A1 | 6/2017 | Leabman | |
| 2017/0290011 | A1 | 10/2017 | Kushnir et al. | |
| 2017/0353338 | A1* | 12/2017 | Amadjikpe | H01Q 1/243 |
| 2017/0356980 | A1* | 12/2017 | Islam | G01S 5/0226 |
| 2018/0046187 | A1* | 2/2018 | Martirosyan | G05D 1/0094 |
| 2018/0048178 | A1* | 2/2018 | Leabman | H04B 1/04 |
| 2018/0180713 | A1* | 6/2018 | Cohen | G01S 13/32 |
| 2018/0241255 | A1* | 8/2018 | Leabman | H02J 50/23 |
| 2018/0249526 | A1* | 8/2018 | Nagaraja | H04W 76/19 |
| 2018/0269715 | A1* | 9/2018 | Hannigan | H02J 50/60 |
| 2018/0278318 | A1* | 9/2018 | Chakraborty | H04B 7/088 |
| 2018/0287651 | A1 | 10/2018 | Fernando et al. | |
| 2018/0323298 | A1* | 11/2018 | Dasgupta | H01L 21/02433 |
| 2018/0323657 | A1* | 11/2018 | Hannigan | H02J 50/23 |
| 2019/0044561 | A1* | 2/2019 | Fernando | H04W 52/242 |
| 2019/0110281 | A1* | 4/2019 | Zhou | H04W 76/19 |
| 2019/0141692 | A1* | 5/2019 | Subramanian | H04B 7/0695 |
| 2019/0141783 | A1* | 5/2019 | Malik | H04L 27/2666 |
| 2019/0200365 | A1* | 6/2019 | Sampath | H04W 24/10 |
| 2019/0222326 | A1* | 7/2019 | Dunworth | H04W 72/1278 |
| 2019/0238202 | A1* | 8/2019 | Chavva | H04W 24/08 |
| 2019/0281587 | A1* | 9/2019 | Zhang | H04B 7/088 |
| 2019/0353750 | A1* | 11/2019 | Rimini | G01S 13/08 |
| 2020/0037254 | A1* | 1/2020 | Comsa | H04W 52/146 |

OTHER PUBLICATIONS

Moldovan et al., "A New 94-GHz Six-Port Collision-Avoidance Radar Sensor", Mar. 2004, IEEE Transactions on Microwave Theory and Techniques, vol. 52, No. 3, pp. 751-759.

Non-Final Office Action based on U.S. Appl. No. 15/389,426 (18 pages) dated Mar. 18, 2019 (for reference purpose only).

International Search Report based on International application No. PCT/US2017/056505 (3 pages) dated Jan. 19, 2018 (for reference purpose only).

Witten Opinion based on International application No. PCT/US2017/056505 (6 pages) dated Jan. 19, 2018 (for reference purpose only).

Partial European Search Report issueed for the corresponding EP application No. 20165868.9, dated Aug. 13, 2020, 14 pages (for informational purpose only).

* cited by examiner

FIG 13
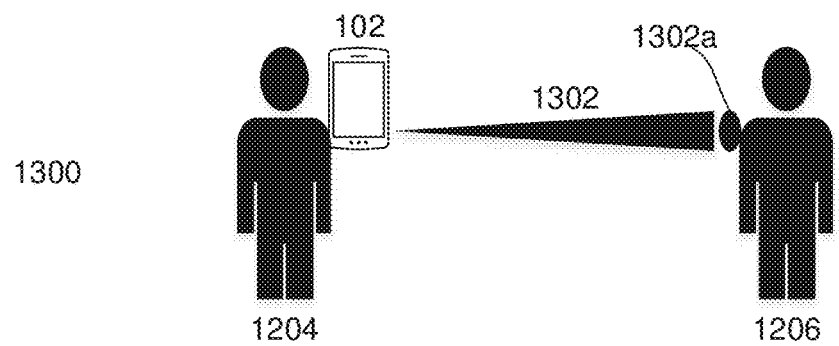
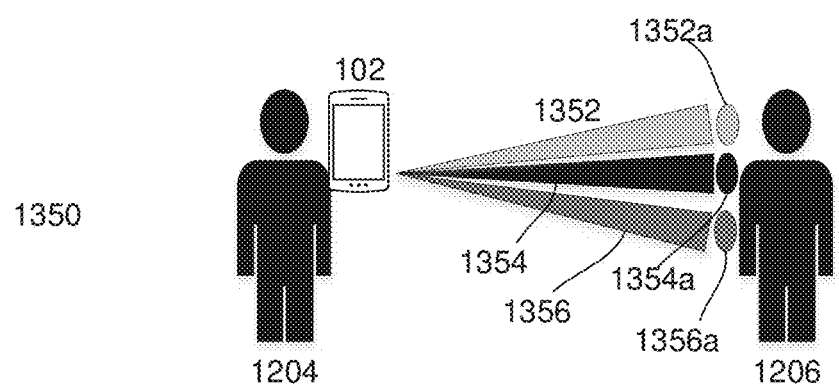

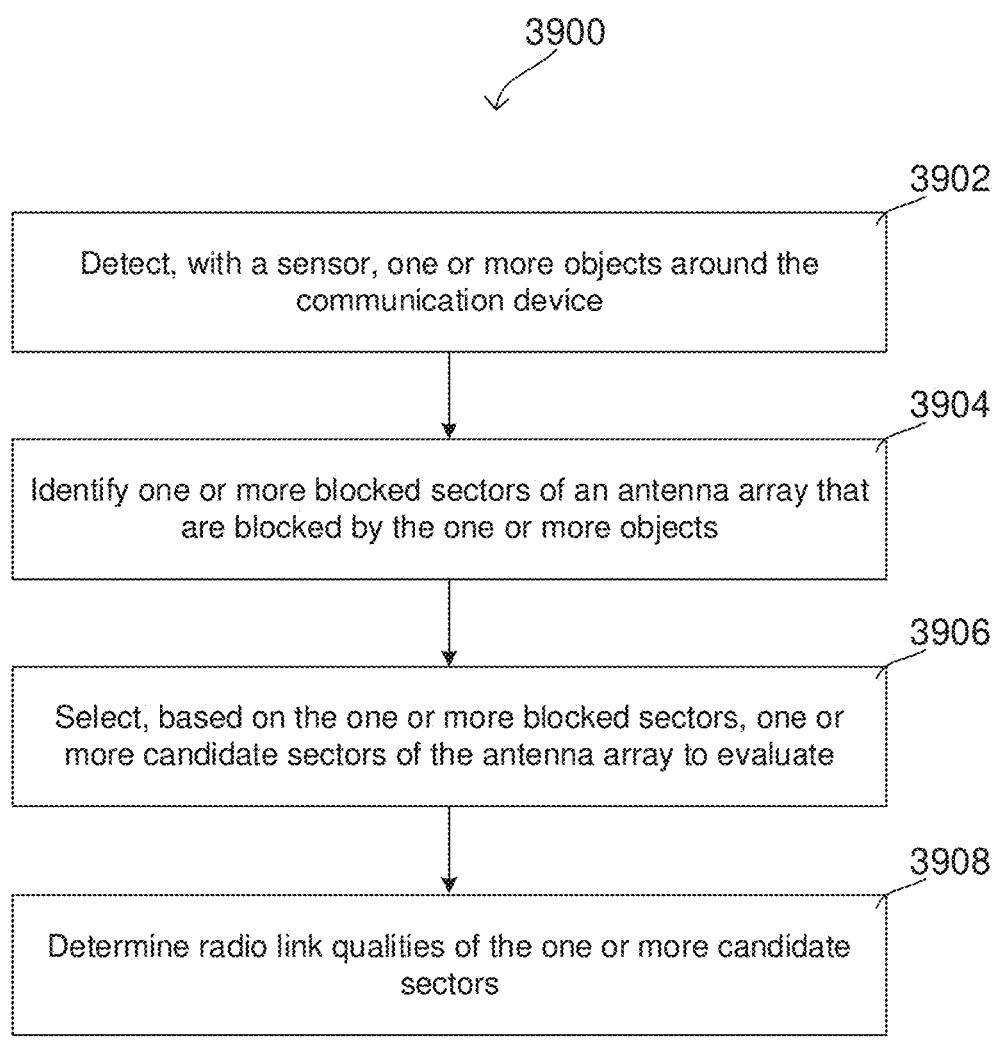

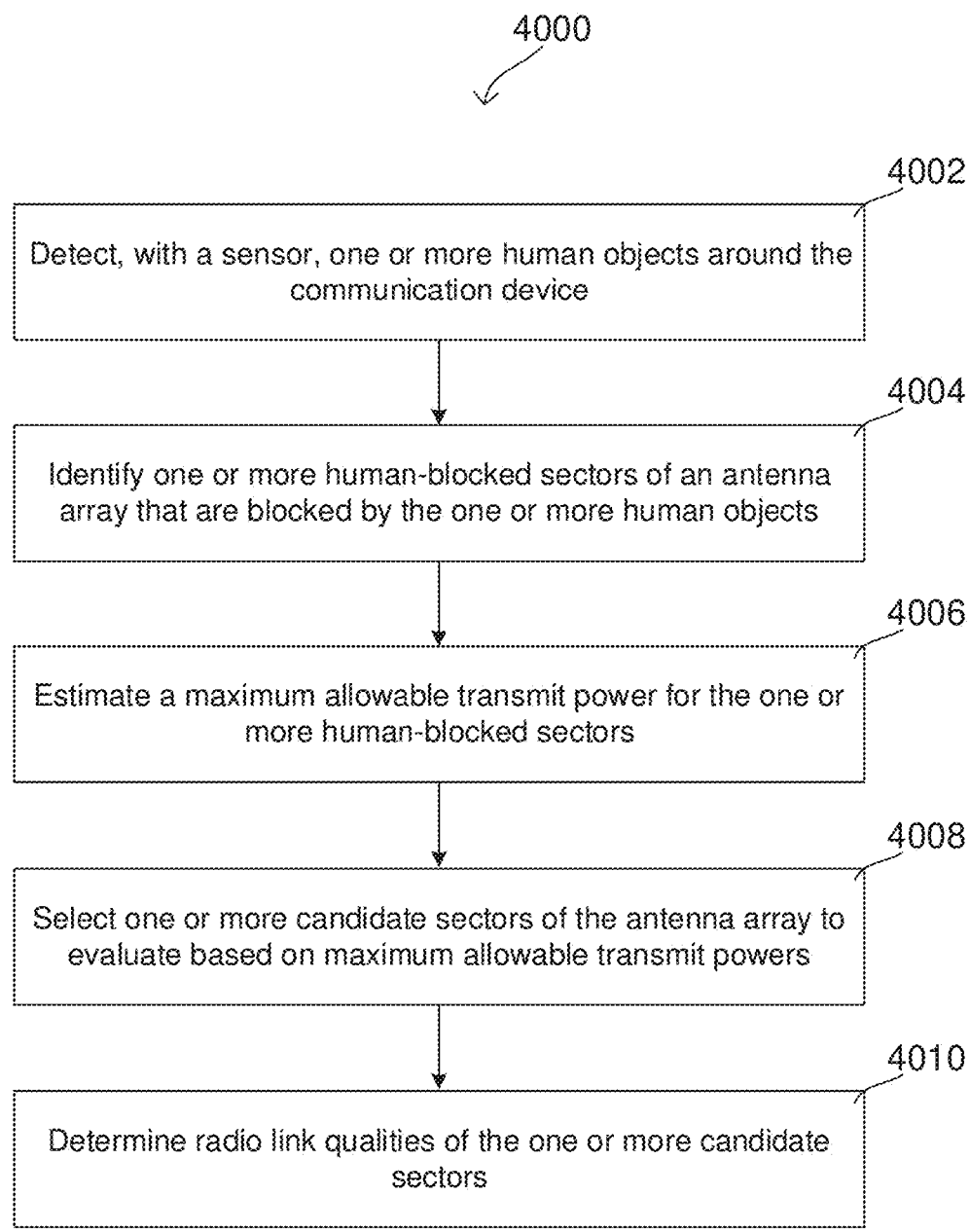

RADIATION EXPOSURE CONTROL FOR BEAMFORMING TECHNOLOGIES

TECHNICAL FIELD

Various embodiments relate generally to methods and devices for radiation exposure control in beamforming technologies.

BACKGROUND

Many emerging communication technologies, such as 5G New Radio (NR) and WiGig, have identified beamforming as a way to increase radio link strength. However, while beamforming may increase link sensitivity, it may also increase RF exposure power to humans. For example, when a device uses beamforming to focus its transmissions in a narrow direction, the resulting beam may deliver more radio energy to a focused area. When this focused area is pointed at a human user, the device may deliver high levels of radiation to them. Various regulators, including the Federal Communications Commission (FCC) and the International Commission on Non-Ionizing Radiation Protection (IC-NIRP), and standardization bodies like the $3^{rd}$ Generation Partnership Project (3GPP) have therefore introduced stringent requirements that limit the amount of radiation that a device can deliver to humans.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 13 shows an exemplary illustration depicting an exemplary beam sweeping scheme according to some aspects;

FIGS. 39 and 40 show exemplary methods of performing radio communications according to some aspects.

DESCRIPTION

Figure 1:
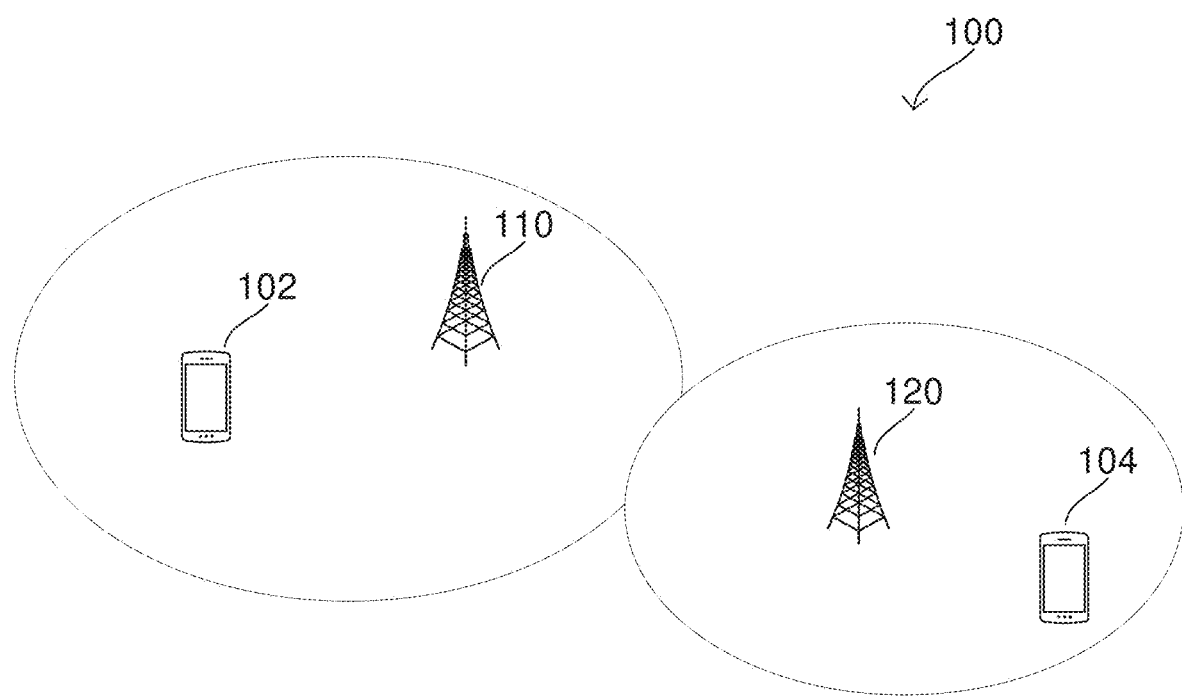
FIG. 1 shows an exemplary general network for wireless communications according to some aspects.

The following detailed description refers to the accompanying drawings that show, by way of illustration, specific details and aspects of embodiments in which the invention may be practiced.

The word "exemplary" is used herein to mean "serving as an example, instance, or illustration." The words "plurality" and "multiple" in the description and claims refer to a quantity greater than one. The terms "group," "set," "sequence," and the like refer to a quantity equal to or greater than one. Any term expressed in plural form that does not expressly state "plurality" or "multiple" similarly refers to a quantity equal to or greater than one. The term "lesser subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Figure 2:
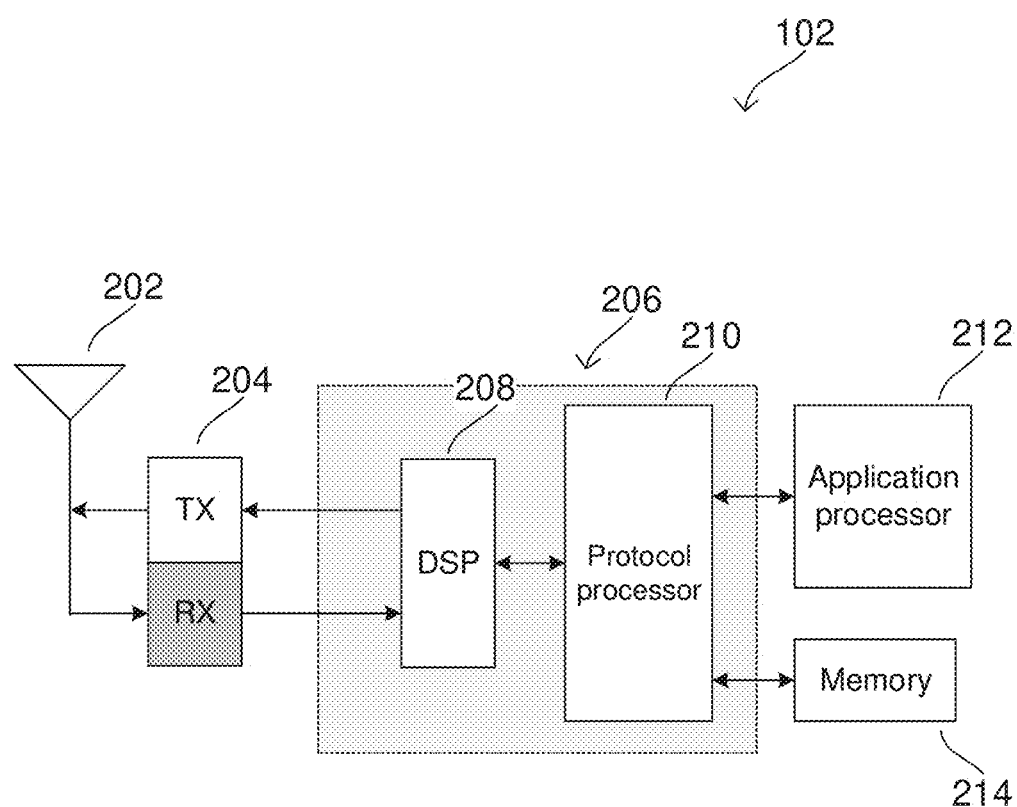
FIG. 2 shows an exemplary internal configuration of a device architecture according to some aspects.

FIGS. 1 and 2 depict a general network and device architecture for wireless communications. In particular, FIG. 1 shows exemplary radio communication network 100 according to some aspects, which may include terminal devices 102 and 104 and network access nodes 110 and 120.

Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Many emerging communication technologies use beamforming techniques to improve communication performance. These beamforming techniques operate by adjusting the phase of antennas in an array to produce radiation patterns of constructive and destructive interference. By shaping and steering these radiation patterns, radio communication devices can achieve high beamforming gains, which can in turn improve radio communication reliability and performance. This can be particularly beneficial in radio communication technologies that operate at high frequencies, such as millimeter wave (mmWave) technologies. Because these radio technologies may operate at carrier frequencies of 30 GHz and above, beamforming gains can be extremely helpful in compensating for the high pathloss often experienced at carrier frequencies in these ranges.

Figure 3A:
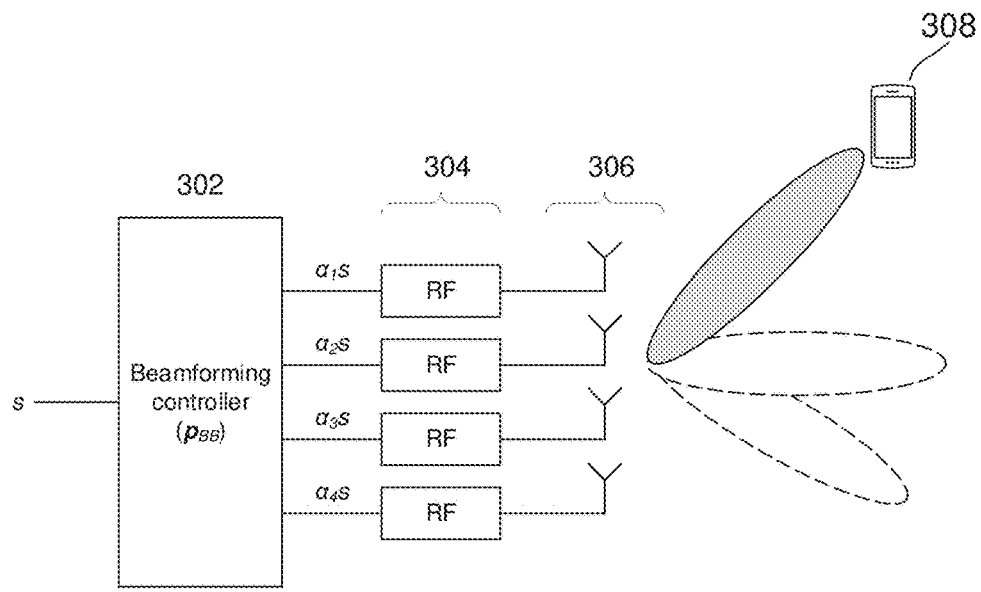
FIGS. 3A and 3B show exemplary beamforming architectures according to some aspects.
Figure 3B:
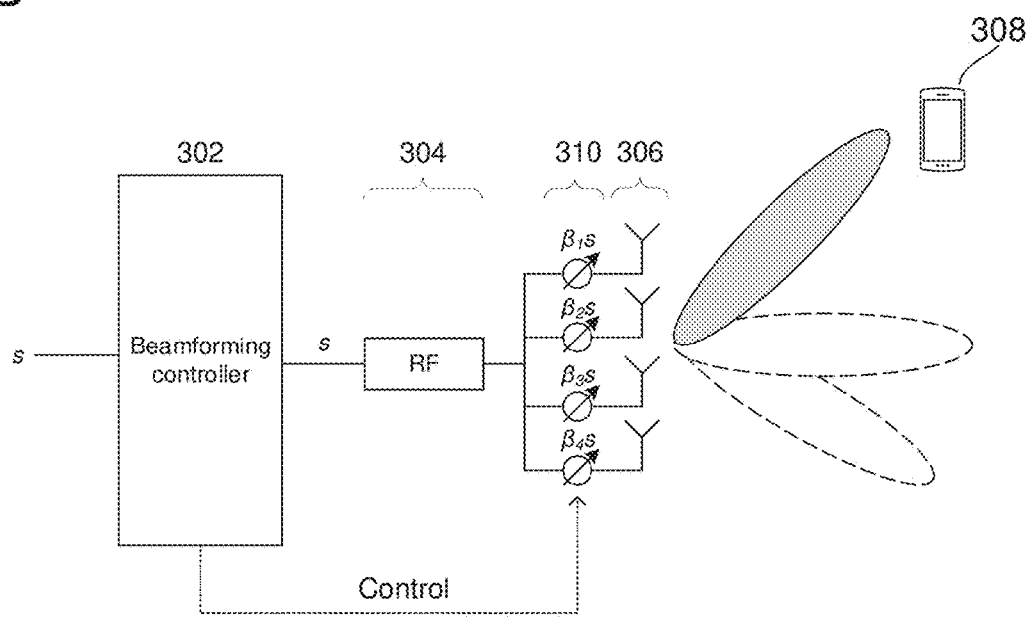

Beamforming systems may perform processing in one or both of the baseband and RF domains to shape antenna array beam patterns. FIGS. 3A and 3B show two simplified beamforming approaches as deployed for an exemplary four-element antenna array. Although the following description may focus on a beamforming in the transmit direction, skilled persons can also apply analogous beamforming techniques to achieve beamforming gains in the receive direction.

FIG. 3A illustrates a simplified digital baseband beamforming architecture that digitally applies complex beamforming weights (composed of both a gain and phase factor) in the baseband domain. As shown in FIG. 3A, beamforming controller 302 may receive baseband symbol s and subsequently apply a complex weight vector $p_{BB}=[\alpha_1\ \alpha_2\ \alpha_3\ \alpha_4]^T$ to s to generate $p_{BB}s$, where each element $\alpha_i$, i=1, 2, 3, 4 is a complex weight (comprising a gain factor and phase shift). Each resulting element $[\alpha_1 s\ \alpha_2 s\ \alpha_3 s\ \alpha_4 s]^T$ of $p_{BB}s$ may be baseband symbol s multiplied by some complex weight $\alpha_i$. Beamforming controller 302 may then map each element of $p_{BB}s$ to a respective RF chain of RF system 304, which may each perform digital to analog conversion (DAC), radio carrier modulation, and amplification on the received weighted symbols before providing the resulting RF symbols to a respective element of antenna array 306. Antenna array 306 may then wirelessly transmit each RF symbol. This exemplary model can also be extended to a multi-layer case where a baseband symbol vector s containing multiple baseband symbols $s_1$, $s_2$, etc., in which case baseband precoding vector $p_{BB}$ may be expanded to a baseband precoding matrix $p_{BB}$ for application to baseband symbol vector s. In this case, $\alpha_i$, i=1, 2, 3, 4 are row vectors, and $p_{BB}s=[\alpha_1 s\ \alpha_2 s\ \alpha_3 s\ \alpha_4 s]^T$. Thus, after multiplying $p_{BB}$ and s, the overall dimension is the same as the overall dimension at the output of beamforming controller 302. The below descriptions thus refer to beamforming controller 302 as $p_{BB}$ and transmit symbol/vector as s for this reason while this model can be extended to further dimensions as explained.

By manipulating the beamforming weights of $p_{BB}$, beamforming controller 302 may be able to utilize each of the four antenna elements of antenna array 306 to produce a steered beam that has greater beam gain than a single antenna element. The radio signals emitted by each element of antenna array 306 may combine to realize a combined waveform that exhibits a pattern of constructive and destructive interference that varies over distances and direction from antenna array 306. Depending on a number of factors (such as antenna array spacing and alignment, radiation patterns, carrier frequency, and the like), the various points of constructive and destructive interference of the combined waveform can create a focused beam lobe that can be "steered" in direction via adjustment of the phase and gain factors $\alpha_i$ of $p_{BB}$. FIG. 3A shows several exemplary steered beams generated by antenna array 306, which beamforming controller 302 may control by adjusting $p_{BB}$. Although only steerable main lobes are depicted in the simplified illustration of FIG. 3A, beamforming controller 302 may be able to comprehensively "form" the overall beam pattern including nulls and sidelobes through similar adjustment of $p_{BB}$.

Beamforming controller 302 may also perform adaptive beamforming, where beamforming controller 302 dynamically changes the beamforming weights in order to adjust the direction and strength of the main lobe in addition to nulls and sidelobes. With these adaptive approaches, beamforming controller 302 can steer the beam in different directions over time, which may be useful to track the location of a moving target point (e.g. a moving receiver or transmitter). In a radio communication context, beamforming controller 302 may identify the location of a target terminal device 308 (e.g. the direction or angle of terminal device 308 relative to antenna array 306) and subsequently adjust $p_{BB}$ in order to generate a beam pattern with a main lobe pointing towards terminal device 308, thus improving the array gain at terminal device 308 and consequently improving the receiver performance. Through adaptive beamforming, beamforming controller 302 may be able to dynamically adjust or "steer" the beam pattern as terminal device 308 moves in order to continuously provide focused transmissions to terminal device 308 (or conversely focused reception).

In some aspects, beamforming controller 302 may be implemented as a microprocessor. Beamforming controller 302 therefore may be able to exercise a high degree of control over both gain and phase adjustments of $p_{BB}$ with digital processing. However, as shown in FIG. 3A for RF system 304 and antenna array 306, digital beamforming configurations may use a dedicated RF chain for each element of antenna array 306 (where each RF chain performs radio processing on a separate weighted symbol $\alpha_i$s provided by beamforming controller 302); i.e. $N_{RF}$=N where $N_{RF}$ is the number of RF chains and N is the number of antenna elements. Because there may be a complex assortment of circuitry in each RF chain (DAC, amplification, mixing, etc.), these digital beamforming approaches can be expensive and power-inefficient. These issues may be worsened as the involved number of antennas increases, which may be particularly problematic for the massive antenna arrays targeted for next-generation technologies that will include tens or even hundreds of antenna elements.

Contrasting with the beamforming controller architecture of FIG. 3A, FIG. 3B shows an RF beamforming approach. As shown in FIG. 3B, beamforming controller 302 may provide baseband symbol s to RF transceiver 304. RF transceiver 304 may perform RF transmit processing on baseband symbol s and provide the resulting symbol s to each of phase shifters 310. In the example shown in FIG. 3B, phase shifters 310 may include four phase shifters 310 that each apply a respective phase shift $\beta_1$ to $\beta_4$ to s. In some aspects, phase shifters 310 may be analog RF phase shifters that apply their respective phase shifts in the analog RF domain. Phase shifters 310 may provide the resulting phase-shifted symbols $\beta_1$s to $\beta_4$s to antenna array 306. The respective antennas of antenna array 306 may wirelessly transmit the phase-shifted symbols. Similar to the operation of FIG. 3A's digital beamformer, FIG. 3B's RF beamformer may realize a specific antenna pattern by selecting the phase weights $\beta_1$ to $\beta_4$. Accordingly, beamforming controller 302 may be configured to select phase weights $\beta_1$ to $\beta_4$, such as based on the direction of terminal device 308, and provide the phase weights to $\beta_1$ to $\beta_4$ to phase shifters 310 (with the "Control" line shown in FIG. 3B). Beamforming controller 302 may therefore steer the main antenna beam towards terminal device 308 through proper selection of the phase weights $\beta_1$ to $\beta_4$. In some cases, the phase weights may be phase-only (e.g., only a phase shift with no amplitude change); in other aspects, the phase weights may have a phase and a gain component (e.g., a phase shift and an amplitude gain).

Many technologies may use these beamforming techniques to improve communications. For example, beamforming has found numerous applications in radar, sonar, wireless communications, radio astronomy, and acoustics. Such beamforming techniques may be particularly useful for technologies that use high carrier frequencies, such as 5G New Radio (5G NR) and other mmWave technologies that use extremely high frequency (EHF) operating bands. Because high frequency carriers experience more pathloss than lower frequency carriers, those high frequency carrier technologies may extensively use beamforming to provide beam gain that can compensate for high link attenuation.

However, while beamforming can improve wireless communications by boosting gain, it can have negative effects on human body radiation exposure. Because directional beamforming often focuses an antenna array's radiation pattern in a certain direction, the resulting beam will deliver more electromagnetic radiation (EMR). When the beam is pointed at a human body, it can expose the affected area to high levels of EMR that can be potentially dangerous. Various aspects of this disclosure examine mechanisms for limiting human radiation exposure when using beamforming technologies.

Regulations on EMR exposure to the human body have been presented for many wireless transmission systems and there are well-established procedures to satisfy these regulations based on human activity (e.g., base stations near residences) in the traditional context of non-beamforming or unidirectional (from the base station side only) beamforming systems. Such approaches include transmission (Tx) power reduction, where the device reduces its transmission power, and Tx duty cycle, where the device may reduce its transmission payload over time, e.g., engage in sporadic transmissions. However, these approaches fail to account for EMR exposure for beamforming from the mobile device side, and furthermore, fail to account for limiting the EMR exposure at the mobile device side while also accounting for link quality considerations.

With the advent of bi-directional beamforming systems in new radio (NR) technologies, such as fifth-generation (5G) wireless communication technology where the operating bands include extremely high frequency (EHF), e.g., millimeter waves, the traditional techniques do not provide reasonable solutions. The transmit power reduction introduces link quality issues and causes link failures, which is especially pronounced in EHF systems with high link attenuation characteristics, which is a key underlying reason for bi-directional beamforming in the first place. The transmit duty cycle reduction may also not be compatible with the primary purpose of many EHF systems such as 5G—high data-rate communication.

Accordingly, communication devices and methods are presented to address the challenge of meeting regulations and/or requirements on exposure to EMR in wireless communications, e.g., wireless communication devices configured to communicate via beamforming. In particular, detection results, e.g., body detection from sensors embedded in a mobile device (e.g., terminal device 102), are used to trigger a procedure where the device indicates a new transmission (Tx)-reception (Rx) beam pair (e.g., beamform pair) to the other device, e.g., a base station or another mobile device.

As described above for FIG. 3, beamforming is a signal processing technique used to control the directionality of the transmission and/or reception of a signal, such as a radio or sound signal. This directionality control may be achieved via electronically or mechanically controlled directional antennas. A widely used class of electronically-controlled directional antennas is the phased antenna array, whereby the signal at each array element is phase shifted so that the combined signal of an array at a particular angle is either constructively or destructively combined to induce spatial selectivity. For example, antenna 202 of terminal device 102 may be a phased antenna array to enable the terminal device to communicate via beamforming techniques.

By controlling the directional pattern of antennas of the antenna array, beamforming can improve signal quality at an intended receiver while reducing unintended interference to and from other directions. Accordingly, beamforming has found numerous applications in radar, sonar, wireless communications, radio astronomy, and acoustics. In particular, it is a key component of 5G wireless communication technology, where the operating bands include EHF, e.g., millimeter waves, with high link attenuation characteristics.

In communication systems operating at EHF, such as 5G frequency range 2 (FR 2) systems, beamforming at both the transmitter and the receiver at both ends (e.g., at the base station and the terminal device) is highly useful and, in some cases, may be necessary to maintain sufficient link qualities. This concept is described herein as bi-directional beamforming. In these bi-directional beamformed systems, the mobile device (e.g., terminal device 102) is also configured to employ beamforming for communications. However, since mobile devices typically operate much closer to bodies sensitive to EMR, e.g., the human body, than the base station and since beamforming increases radiated power in the selected directions, the potential EMR exposure level can significantly increase. This has prompted regulatory and guiding bodies such as the Federal Communications Commission (FCC) of the United States and the International Commission on Non-Ionizing Radiation Protection (IC-NIRP) as well as communication standardization bodies such as 3GPP to introduce stringent requirements and/or recommendations for human exposure to radio frequency (RF) radiation in the EHF bands. This may be referred to as the maximum permissible exposure (MPE). A recent trend in MPE regulations is the substantial reduction of the time interval for observing exposure level, meaning that even a brief over-exposure is less likely to be tolerated.

An alternative to the traditional methods used in unidirectional or non-beamforming systems is the autonomous mobile device-side Tx beam steering, whereby the mobile device, upon a detection of nearby human presence, may steer its transmission beam away from the estimated direction of the human body. This approach leverages the device-side beamforming capability in bi-directional beamforming systems, and it has the potential to maintain link quality and to be suitable for high data-rate applications while meeting MPE requirements. However, this approach does not exploit the potential of bi-directional beamforming systems to the fullest, in the sense that it may refine the mobile device-side beam but does not refine the beam of its communication partner, e.g., base station or another mobile device. In other words, it can optimize a beam but cannot optimize a beam-pair; e.g., it addresses one dimension in a two-dimensional optimization space. For example, if the current base station beam direction is such that all possible device-side Tx beam directions with meaningful propagation paths toward the base station are sufficiently blocked by a nearby human body, the autonomous Tx beam steering at the device will not help.

In some aspects, devices and methods for meeting one or more criterion, including at least one of an exposure criterion and/or link quality criterion, from the mobile device (terminal device) side in a bi-directional beamforming system are presented. This may include the devices being configured to exploit a Tx-Rx beam pair recovery procedure based on the detection of an information, such as the nearby presence of a human body.

In some aspects, devices and methods configured to perform communications in bi-directional beamforming systems, such as 5G systems, implement mechanisms to employ a beam recovery procedure to trigger setting beamforms at both the device and its communication partner. In some case, the mobile device (e.g., terminal device 102) may detect insufficient link quality due to the beam selection at its communication partner side, e.g., other mobile devices or base stations, such as gNBs. Additionally, the mobile device (e.g., terminal device 102) may be configured with sensing and/or detecting equipment to detect a nearby body (e.g., an animate body such as a human body) to trigger an adjustment of beams at both the mobile device-side and the communication partner-side, wherein the new, adjusted beams is performed via a beam recovery procedure, thereby initiating a mobile device-side re-selection of the communication partner-side (e.g., gNB) beams as well as the corresponding mobile device-side beams to establish a new pair of beam pairs that meet one or more criterion, e.g., MPE threshold, link quality, etc.

By employing the mechanisms described herein, the mobile device may satisfy exposure requirements and regulations while also maintaining link quality to fully take advantage of the bi-directional beamforming system. Unlike autonomous device-side Tx beam steering techniques, the mechanisms described herein explore both the mobile device and its communication partner (e.g., base station) side degrees of freedom in determining suitable beam pairs (e.g., UE-gNB beam-pairs) whose associated propagation paths sufficiently avoid exposure thresholds.

Figure 4:
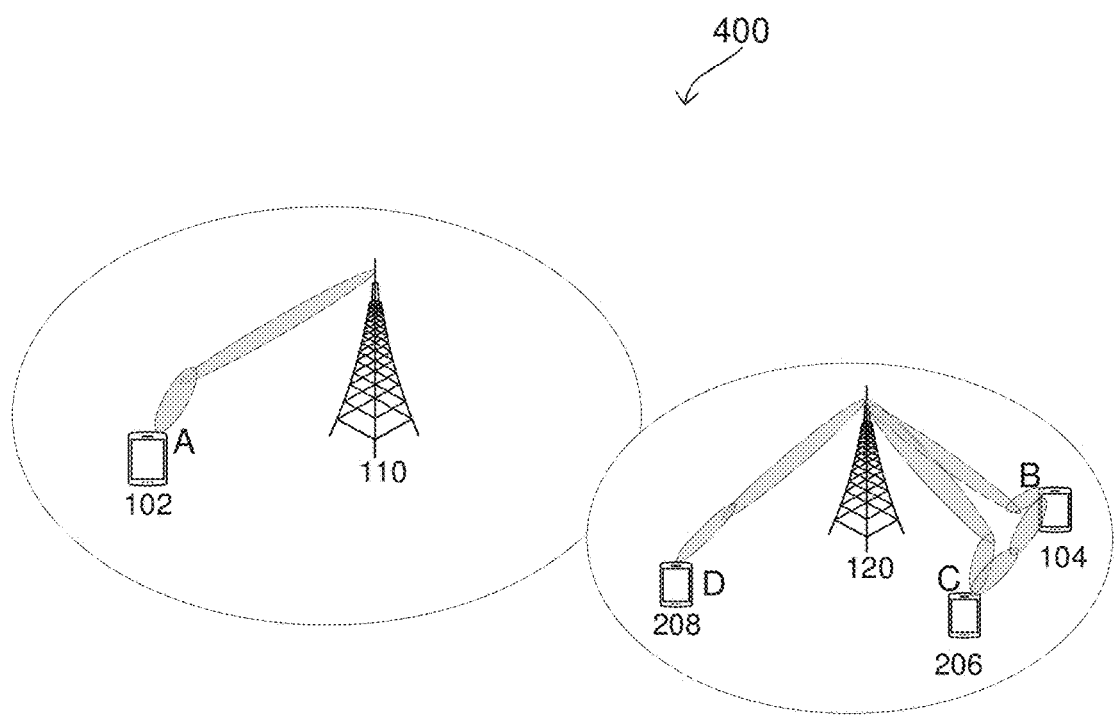
FIG. 4 shows an exemplary wireless communication network with beamforming devices according to some aspects.

FIG. 4 shows a communication network 400 with base stations, 110 and 120, which may serve terminal devices (e.g., mobile devices, UEs) 102, 104, 206, and 208. It is appreciated that communication network 400 may largely correspond to the network shown in FIG. 1. The illustration in FIG. 4 is exemplary in nature and may be simplified for purposes of this explanation.

In communication network 200, both base stations 110, 120 and terminal devices 102, 104, 206, and 208 are configured to communicate via beamforming. In other words, they may both have at least one RF chain and multi-antenna arrays as shown in FIGS. 3A-3B. Accordingly, the devices shown in network 400 are capable of bi-directional beamforming.

For example, terminal device 102 may communicate with base station (e.g., gNB) 110 via the beams shown. The letter "A" may be indicative of a user's position relative to terminal device 102 and may be detected by the terminal device via one or more sensors and/or detectors such as a passive infrared sensor, a capacitive sensor, a resistive sensor, an optical sensor, a piezoelectric sensor, a camera, a microphone, a radar sensor/detector, a proximity sensor, a proximity detector, or the like. As shown in network 400, the beams between terminal device 120 and base station 110 avoid the user's position. Similarly, base station 120 communicates with terminal device's 104, 206, and 208 via the respective beam pairs shown in network 400, while also avoiding the respective user positions indicated by the letters "B," "C," and "D" due to the detection of the user's presence by the respective terminal device.

Additionally, in device to device (D2D) communications, for example, terminal devices 104 and 206 may communicate with each other via bi-directional beamforming while also selecting beams so as to avoid the detected position of the users (B and C).

Figure 5:
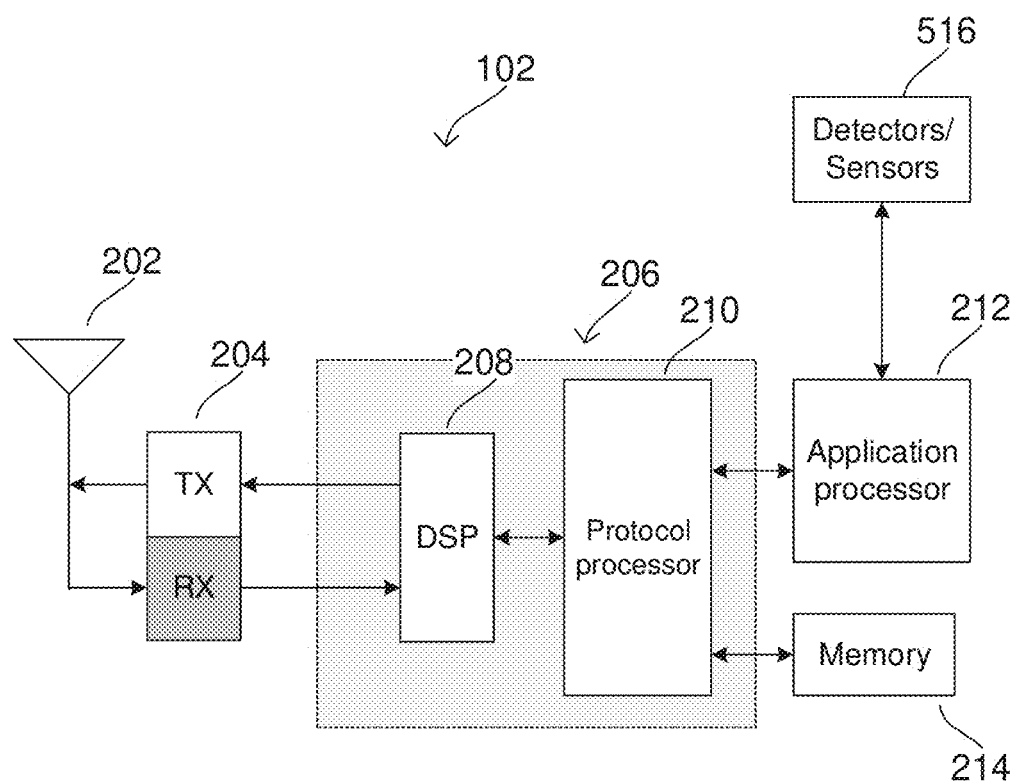
FIG. 5 shows an exemplary internal configuration of a device architecture according to some aspects.

FIG. 5 shows an internal configuration of terminal device 102 according to some aspects corresponding to FIG. 2 with the additional features of the detectors/sensors 516. Although not explicitly shown in FIG. 5, in some aspects terminal device 102 may include one or more additional hardware and/or software components, such as processors/microprocessors, controllers/microcontrollers, other specialty or generic hardware/processors/circuits, peripheral device(s), memory, power supply, external device interface (s), subscriber identity module(s) (SIMs), user input/output devices (display(s), keypad(s), touchscreen(s), speaker(s), external button(s), camera(s), microphone(s), etc.), or other related components.

The detectors/sensors 516 may be configured to detect an object located external to the terminal device 102, such as a body subject to MPE regulations, e.g., the user or another human object. The detectors/sensors may include, but are not limited to, equipment such as one or more of a passive infrared sensor, a capacitive sensor, a resistive sensor, an optical sensor, a piezoelectric sensor, a camera, a microphone, a radar sensor, etc. Each of these sensors may be configured to detect the presence of, for example, a human body in a distinct manner, e.g., the passive infrared sensor measures infrared light and may be configured to indicate the presence of a human body based on a known IR spectrum, the camera may be configured to determine the presence of a human body via recognition methods, etc. In another example, the sensors and/or detectors may include an mmWave radar proximity sensor, which may be located close to or in one or more antenna arrays of the antenna system 202, which may be configured to detect human presence in a number of manners. For example, in one aspect, detection of body movements and tremor by Doppler and micro-Doppler effects may be detected. In another aspect, a correlation of an object's distance with its reflectivity may be performed, and compared to values stored in the terminal device (e.g., the reflectivity of human body parts such as tissue may be characterized dependent on distance thereby allowing the terminal device to determine human presence based on the measured target distance and the reflected signal intensity). In a third aspect, the reflectivity of an object may be measured across a wide frequency range and the resulting signature can be compared with the expected response of the reflectivity of a human body. In another aspect, a joint decision based on the any combination of the aspects described above with respect to any of the sensors/detectors may be performed for body detection.

These detectors and/or sensors may be configured to communicate with the baseband modem 206 via the application processor 212.

Figure 6:
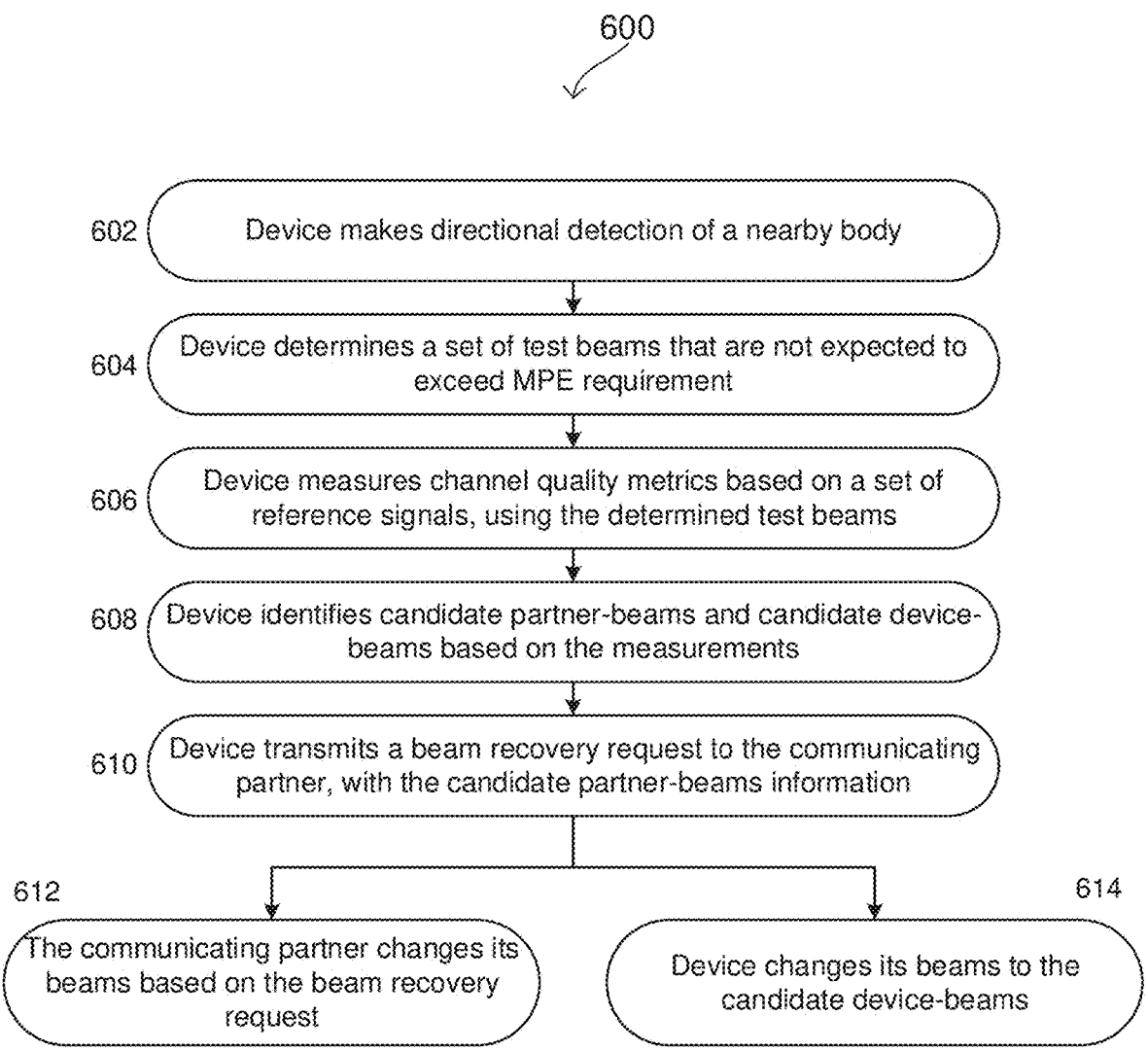
FIG. 6 shows an exemplary flowchart describing a body detection-based beam selection according to some aspects.

FIG. 6 shows a flowchart 600 describing a general method of body-detection-based beam recovery performed by a mobile device (e.g., terminal device 102 or UE) according to some aspects. Flowchart 600 illustrates an exemplary scenario showing the operation instance of a body-detection-based beam recovery method in the context of bi-directional beamforming communications between a mobile device and its communication partner (e.g., a second device, such as a base station or another mobile device).

The method described in flowchart 600 may be initiated when the device makes a directional detection of a nearby body 602. This detection may be defined as meeting a first criterion of one or more criterion and be performed after a certain time interval from the last body detection-based recovery instance (e.g., the last time the method shown in 600 was performed) by the device. The detection of the nearby body may be detected by one or more sensors and/or detectors of the mobile device, such as a body proximity sensor (BPS). BPSs include any mechanism that a mobile device, such as terminal device 102, may use to sense or detect a nearby presence of a body, e.g., an animate body such as a human body or the like, whether the body physically touches the sensor or not. Examples may include, but are not limited to, one or more of a passive infrared sensor (PIR), a capacitive sensor, a resistive sensor, an optical sensor, a piezoelectric sensor, a camera, a microphone, a radar sensor, or the like. For example, a PIR sensor measures infrared light radiated from objects within its field of view, and it can be tuned to certain bodies, e.g., human bodies, by targeting the range of infrared light emitted by humans, e.g., in the wavelength range of 10-15 micrometers. Each of these sensors or detectors has an associated coverage of directions, e.g., field of view (FOV), which is a three-dimensional angular range within which it reacts to a stimuli, or target. Thus, a device with one or more BPSs can, based on the placement and direction of its one or more sensors, associate body detection with a particular direction.

In some aspects, a terminal device may use two or more of these BPSs to increase its angular and/or distance coverage for detecting nearby bodies. For example, the terminal device may use its camera to cover a first area, and a PIR sensor to cover a second area, thereby increasing the area/volume in which the terminal device may detect the presence of a nearby body, where the sum of the first area and the second area is greater than each of the areas each of the BPSs would be able to cover individually. It is appreciated that other BPSs or any number of BPSs may also be included in this example of increasing the coverage area for detection.

For example, this detection of the nearby body may be made with respect to the distance to the body (from the mobile device) and the direction of the communication partner device.

Based on the detected information gathered in 602, the mobile device may determine a set of test beam directions 604. The test beam directions may be chosen based on a second criterion evaluated based on an MPE threshold requirement. The WE threshold requirement may be defined in terms of power per unit area. For example, the test beams may be selected from a plurality of test beams, wherein the test beams do not exceed the WE threshold requirement.

The determination of a set of MPE-compliant (or human-avoiding) test beam directions may be based on the directional body-detection and a mapping between the set of candidate body-proximity directions and a set of device beams. The mapping for the terminal device can be predetermined based on the known directional coverages of one or more BPSs of the terminal device and the directional coverages of possible beams of the terminal device. Such a mapping may allow for the identification of the beam directions that map to the detected direction of a body, hereafter referred to as "risky" beams for convenience, or equivalently, identifying the beam directions that do not map to the detected direction of a body, hereafter referred to as "safe" beams. The determined set of MPE-compliant test beam directions (also referred to as the primary beam or a device-side beam of a beam pair) may be a subset of the safe beams. As a non-limiting example, given the knowledge of risky beams and the antenna panels or arrays that form the risky beams, referred to as risky panels or arrays, the MPE-compliant set may exclude all beams formed by the risky antenna panels or arrays, although some of those beams may be safe beams.

In 606, the device measures a channel quality metric based on a set of signals from the communication partner device, e.g., reference signals, using the determined test beams. In some aspects, the measurement of the channel quality metric may be performed after the determination of the test beams as shown in flowchart 600, or in other aspects, the measurements may be performed prior to the determination of test beams. In this sense, the measurements may be conducted across all the plurality of test beams, or across a smaller subset that are expected to contain some beam directions meeting the MPE requirement regardless of the direction of the detected information in 602. Therefore, 606 may take place prior to, or concurrently with, 604.

The measurement of channel quality metrics using the determined MPE-compliant test beams may be based on reference signals that are configured to be used at the device for the purpose of identifying candidate partner beams. Examples of the channel quality metrics include, but are not limited to: received power, e.g., L1-RSRP (layer-1 reference signal received power) in 3GPP standards, determinations of signal-to-interference-plus-noise ratio (SINR), and/or a mutual information (MI) between a transmitted signal and the corresponding received signal which may include, for example, precoding matrix indicator (PMI) and/or channel quality indicator (CQI) information, etc.

Based on the measured channel quality metrics, the device may identify a set of candidate partner device beams for the communication partner and a set of its own candidate beams 608. The candidate partner device beam may be defined as a partner-side beam of the beam pairs and the own device beams may be defined as the device-side beam of the beam pair. In other words, the beam pair for the bi-directional beamforming methods described herein includes a device-side beam and a partner-side beam, e.g., a pair of beams.

Identification of candidate partner beams and candidate device beams may be based on the said measured channel quality metrics. For example, after making the measurements with a number of candidate partner-beam and candidate device-beam "pairs," the terminal device may identify a preferred beam pair whose associated channel quality metric is the highest and use this as the selected beam pair.

The device may then transmit the candidate partner beam information to the communication partner device, for example, through a beam recovery request to the communication partner 610. In response to this request, the communication partner may then adjust its beamform configuration based on the request 612 (adjust to the partner-side beam of the beam pair), while the device may adjust its own beamform configuration accordingly 614 (adjust to the device-side beam of the beam pair). The timing of the shift to the beam pair may be according to a timing schedule maintained between the device and the communication partner device. In the context of body-detection-based beam recovery methods of this invention, the terminal device may switch to the identified candidate device-beam on or before the time-schedule. Such an earlier switching may be beneficial or necessary to satisfy time-domain aspects of the MPE requirement. The partner device may switch to the device-indicated preferred set of beams or some other beams. The latter case may arise when the partner device can estimate its own set of MPE-compliant beams and may thereafter instruct the terminal device to adjust accordingly.

The transmission of the beam recovery request to the communication partner may be done according to a standardized procedure supported by the terminal device and the partner device. Accordingly, in some aspects, the bi-directional beamforming communication systems disclosed herein, such as 5G NR (New Radio) systems, support a device-triggered beam recovery procedure, whereby the device indicates a preferred set of partner-side beams to the partner device.

The communication partner device may be, for example, a base station (e.g., gNB), a relay node, another mobile device, or any other apparatus capable of beamformed communication with the terminal device.

Figure 7:
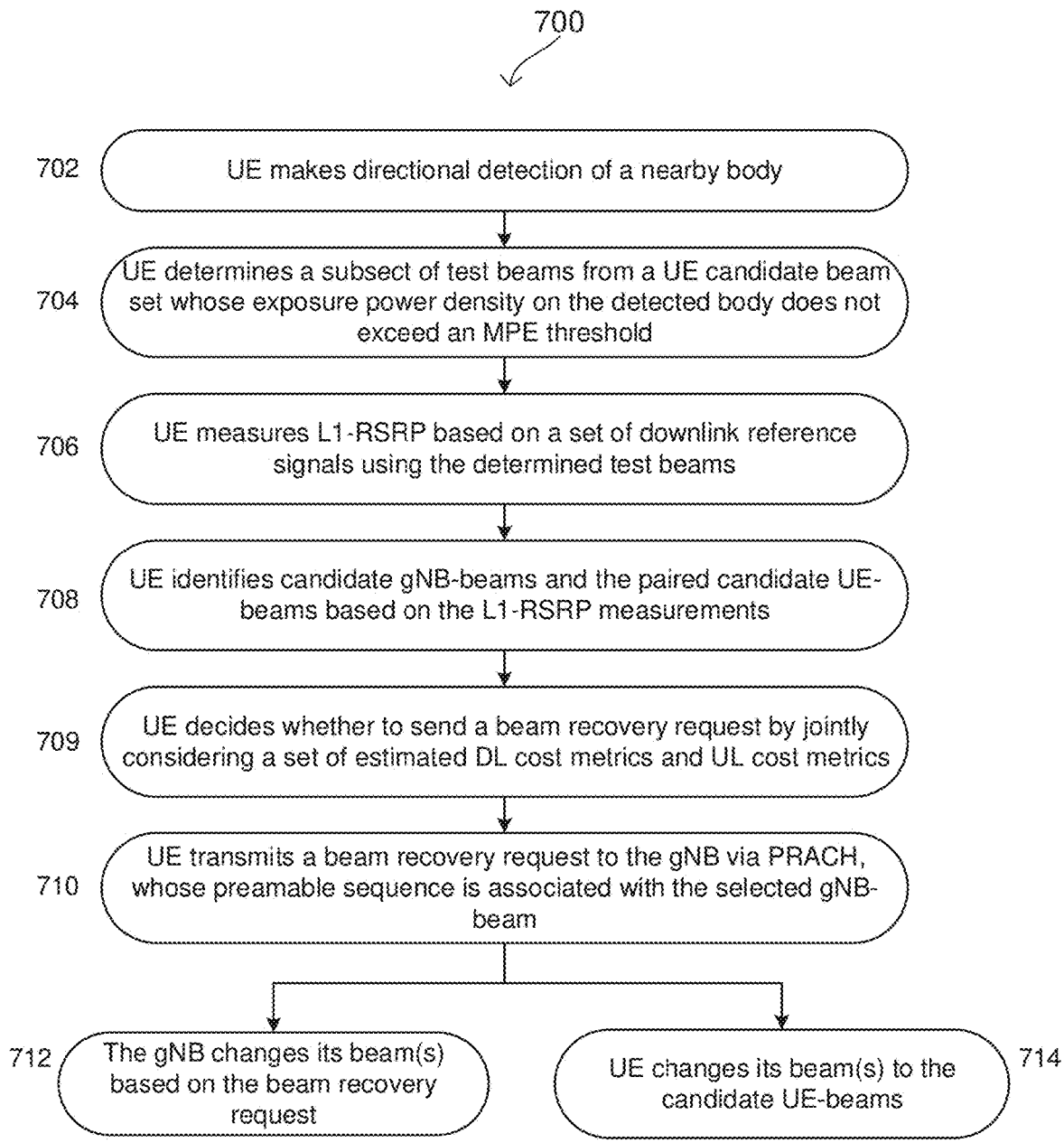
FIG. 7 shows an exemplary flowchart describing a body detection-based beam selection between a terminal device and a gNB according to some aspects.

FIG. 7 shows a flowchart 700 describing a method of body-detection-based beam recovery performed by a mobile device (e.g., terminal device 102, a UE) in the context of a communication between the mobile device and a gNB in accordance with 5G NR Release-15 standard according to some aspects. Although shown specifically to explain the bi-directional beam adjustment methods for a mobile device in 5G NR communications, it is appreciated that the methods shown in flowchart 700 may be similarly applied to other technologies employing bi-directional beamforming between a device and its communication partner.

In 702, the UE may make a directional detection of a nearby body similar to the directional detection of 602 in FIG. 6, e.g., via any one of the BPSs that the UE is equipped with. For example, this detection of the nearby body may be made with respect to the distance to the body (from the UE) and the direction of the gNB. The direction of the gNB may, for example, be determined based on the measurement of downlink (DL) test beams and/or reference signals.

In 704, the UE may determine a set of test beams from the UE candidate beam set whose estimated exposure power density on the detected body from 702 does not exceed an WE threshold. The MPE threshold may be set forth or based on EMR regulations and/or requirements set forth by regulatory authorities. The UE may be configured to make such a determination similar to the determination of the set of test beams described in 604 in FIG. 6. For example, the directional body-detection may trigger a determination of a set of MPE-compliant test beam directions at the UE. This determination may be based on the directional body-detection and a mapping between a set of candidate body-proximity directions and a set of device beams. In some aspects, all risky antenna panels or arrays that may form risk beams are first excluded, and the set of MPE-compliant test beams are constructed from the set of beams formed by the remaining "safe" antenna panels or arrays.

In 706, the UE may measure the reference signal received power (RSRP) based on a set of downlink reference signals using the determined test beams. This procedure may correspond to 606 in FIG. 6.

For example, once a set of MPE-compliant test beam directions are determined in 704, the UE measures channel quality metrics such as L1-RSRP using the MPE-compliant test beams and based on a set of candidate-beam-detection (CBD) reference signal (RS) resources. This set of CBD-RS resources, also known as BFR (beam failure recovery) RS resources, may be configured by the network via radio resource control (RRC) signaling, in particular the candidateBeamRSList field within the RRC information element (IE), BeamFailureRecoveryConfig. The set of CBD-RS resources may be synchronization signal block (SSB) resources defined via the RRC field BFR-SSB-Resource or channel state information-reference signal (CSI-RS) resources defined via the RRC field BFR-CSIRS-Resource.

In 708, the UE identifies candidate gNB-beams (e.g., partner-side beams of the potential beam pairs) and the corresponding paired UE-beams (e.g., device-side beams of the potential beam pairs) based on the L1-RSRP measurements. In a simple example, the UE may identify the candidate beams based on the beams associated with the highest L1-RSRP measurements. This procedure may correspond to 608 in FIG. 6.

In 709, the UE may decide whether to send a beam recovery request to the gNB by considering at least one of a set of estimated downlink (DL) cost metrics and/or uplink (UL) cost metrics. The DL metrics may include, in layer 1 (L1), an estimated DL throughput loss, e.g., based on DL MI estimation, if the UE does trigger the beam pair switching. For higher layers (e.g., layer 2 and above), the DL metrics may include an estimation of DL quality of service (QoS) loss if the UE does trigger the beam pair switching. The UL metrics may include, in L1, an estimation of UL throughput loss if the UE does not trigger beam pair switching but instead performs a transmission (Tx) power reduction. For higher layer, the UL metrics may include an estimation of the UL QoS loss if the UE does NOT trigger beam pair switching but instead performs a Tx power reduction.

In 710, the UE transmits the beam recovery request to the gNB via the physical random-access channel (PRACH), wherein the PRACH preamble sequence may be associated with the selected gNB-side beam. For example, the UE may transmit the beam recovery request to the gNB via the PRACH in an UL slot "n" according to 5G NR standards.

After the transmission and reception of the beam recovery request in 710, the gNB changes it beam(s) based on the received beam recovery request 712 while the UE changes its beam(s) to the selected beam(s) of the candidate UE-beams 714. This procedure may include, for example, the gNB to start transmitting DCI (downlink control information) in PDCCH (physical downlink control channel) in the search space indicated via the RRC field recoverySearchSpaceId in the RRC IE BeamFadureRecoveryConfig, starting from downlink (DL) slot $\lfloor n \cdot 2^{\mu_{DL}}/2^{\mu_{UL}} \rfloor + 4$, where $\mu_{DL} \in \{0, 1, 2, 3\}$ and $\mu_{UL} \in \{0, 1, 2, 3\}$ denote downlink and uplink subcarrier spacing (SCS) configuration, e.g., subcarrier spacing $\Delta f = 2^\mu \cdot 15$ KHz, respectively. Eventually, the gNB may update active transmission configuration indicator (TCI) states via a TCI States Activation/Deactivation for UE-specific PDSCH (physical downlink shared channel) MAC (medium access control) CE (control element). The UE may switch its beams to the identified candidate UE-beams in a corresponding manner.

Figure 8:
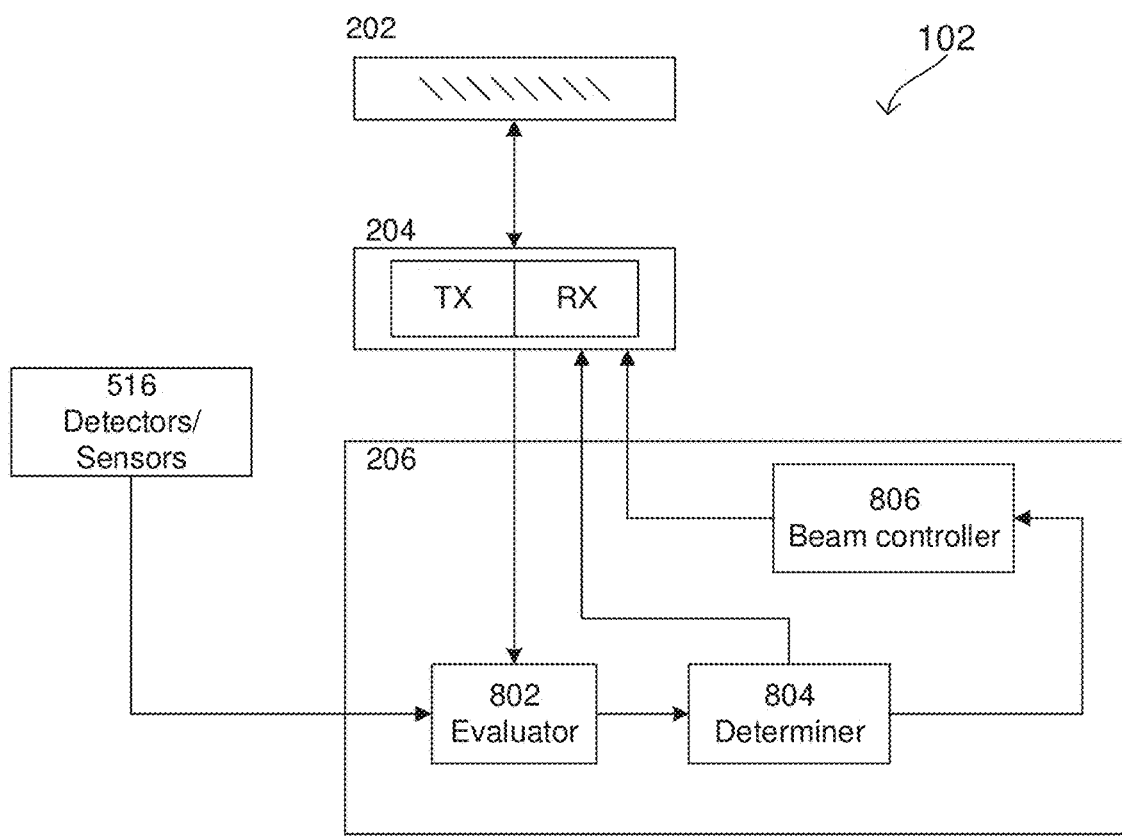
FIG. 8 shows an exemplary internal diagram a terminal device depicting components for implementing beam selection methods according to some aspects.

FIG. 8 shows an internal diagram a terminal device 102 depicting components according to some aspects. Accordingly, the illustrated depiction of FIG. 8 may omit certain components of terminal device 102 that are not directly related to methods described herein. Additionally, components depicted as being separate in FIG. 8 may be incorporated into a single, hybrid component that performs the same functions as the separate components, and, similarly, single components may be split into two or more separate components that perform the same function as the single component.

As shown in FIG. 8, the baseband modem 206 may include an evaluator 806 for evaluating one or more criterion as described herein, for example, based on the detection of another body, an MPE threshold, or the like. Baseband modem 206 may include a determiner 804 for determining one or more beam pairs from a plurality of potential beam pairs to use in communications with a second device based on the one or more criterion. Determiner 804 may also be configured to transmit an indication of one or more partner-side beams of a selected beam pair of the one or more beam pairs to the second device. Baseband modem 206 may include a beam controller 806 configured to adjust an antenna configuration of the terminal device to communicate with the second device via a device-side beam of the selected beam pair.

For example, the one or more criterion may include determining a body based on information provided by one or more detectors/sensors 516, e.g., BPSs. It is appreciated that evaluator 802 may be located in the application processor (not shown in FIG. 8, but shown as 212 in FIG. 2) and provide the information to the determiner 804 via an interface between the baseband modem 206 and application processor 212.

Figure 9:
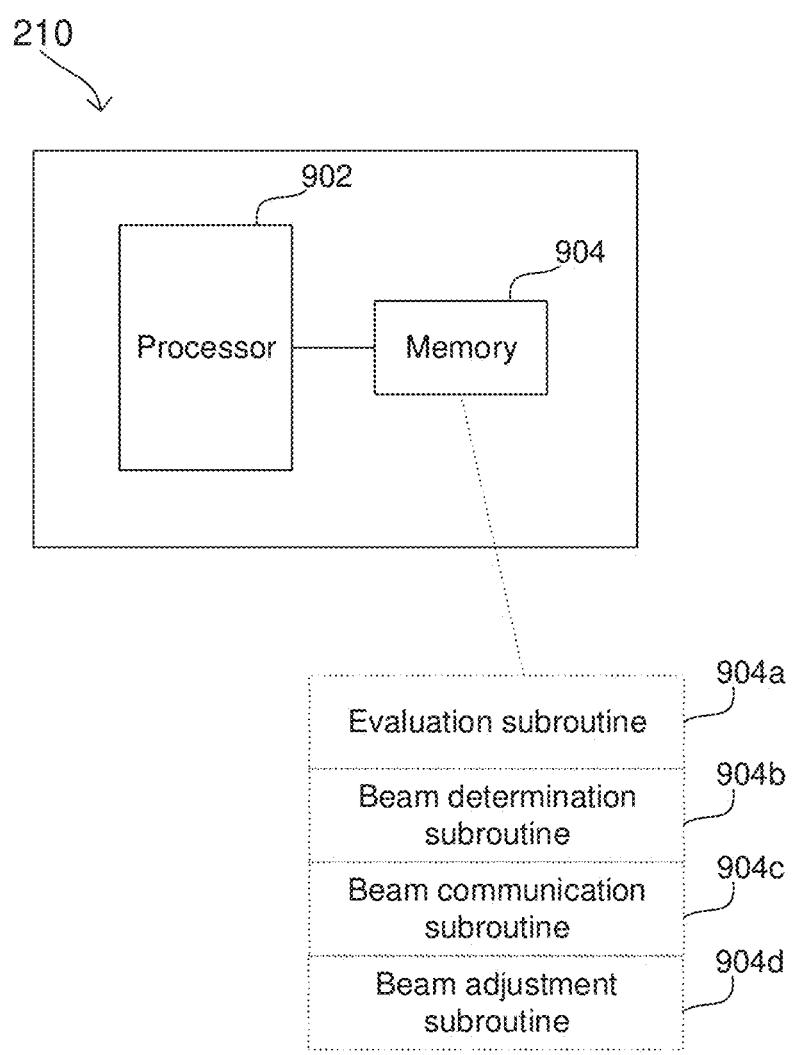
FIG. 9 shows an exemplary internal configuration of controller for implementing beam selection methods according to some aspects

FIG. 9 shows an exemplary internal configuration of controller 210 according to some aspects. As shown in FIG. 9, controller 210 may include processor 902 and memory 904. Processor 902 may be a single processor or multiple processors, and may be configured to retrieve and execute program code to perform the transmission and reception, channel resource allocation, and cluster management as described herein. Processor 902 may transmit and receive data over a software-level connection that is physically transmitted as wireless radio signals by digital signal processor 208, RF transceiver 204, and antenna 202. Memory 904 may be a non-transitory computer readable medium storing instructions for one or more of an evaluation subroutine 904a, a beam determination subroutine 904b, a beam communication subroutine 904c, and/or a beam adjustment subroutine 904d.

Evaluation subroutine 904a, a beam determination subroutine 904b, a beam communication subroutine 904c, and/or a beam adjustment subroutine 904d may each be an instruction set including executable instructions that, when retrieved and executed by processor 902, perform the functionality of controller 210 and the methods as described herein. In particular, processor 902 may execute evaluation subroutine 904a to evaluate one or more criterion as described herein. For example, the one or more criterion may include one or more of a detection of a body based on information gathered and provided by one or more detectors/sensors of the terminal device, an MPS threshold, and/or a link quality between the terminal device and a second device, e.g., a base station or a UE. Processor 902 may execute beam determination subroutine 904b to determine one or more beam pairs from a plurality of potential beam pairs to use in communications with a second device based on the one or more criterion as described herein. Processors 902 may also execute beam communication subroutine 904c to transmit an indication of one or more partner-side beams of a selected beam pair of the one or more beam pairs to the second device. Processors 902 may execute beam adjustment subroutine 904d to adjust an antenna configuration of the terminal device to communicate with the second device via a device-side beam of the selected beam pair. For example, this may include electronically adjusting the weights of the antenna array of the terminal device so as to provide for constructive interference to produce the selected device-side beam of the selected beam pair.

Figure 10:
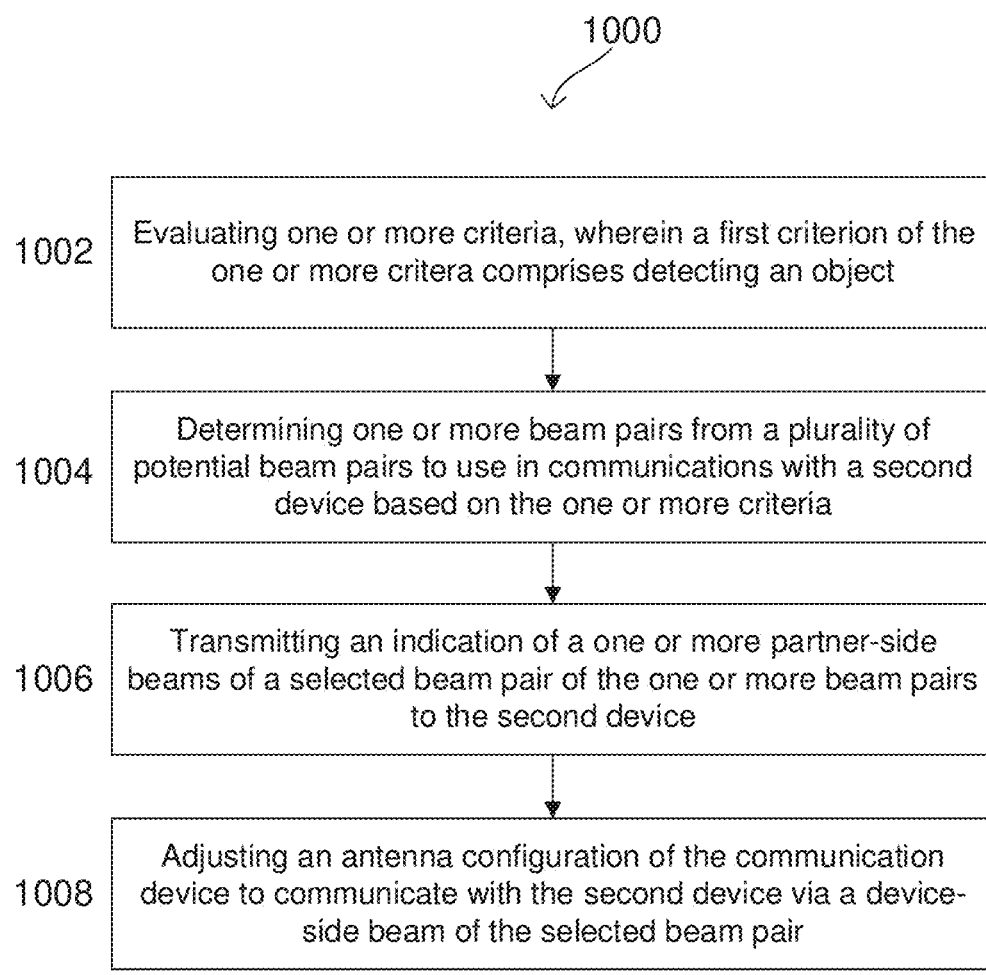
FIG. 10 shows an exemplary flowchart describing a method for a communication device to determine a beam pair to communicate with a second device according to some aspects.

FIG. 10 shows an exemplary flowchart 1000 describing a method for a communication device to determine a beam pair to communicate with a second device according to some aspects.

The method may include evaluating or more criteria, wherein a first criterion of the one or more criterion comprises detecting an object 1002, determining one or more beam pairs from a plurality of potential beam pairs to use in communications with a second device based on the one or more criteria 1004, transmitting an indication of one or more partner-side beams of a selected beam pair of the one or more beam pairs to the second device 1006, and adjusting an antenna configuration of the communication device to communicate with the second device via a device-side beam of the selected beam pair 1008.

Figure 11:
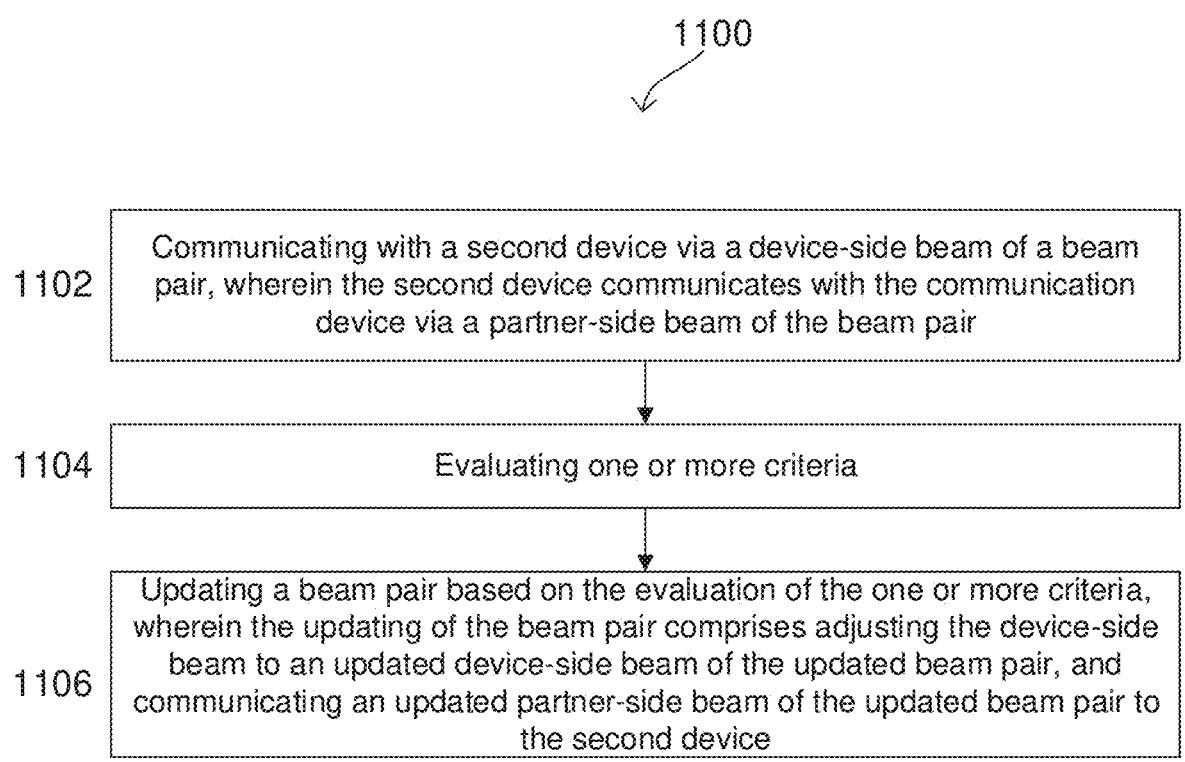
FIG. 11 shows an exemplary flowchart describing a method for a communication device to update a beam pair to communicate with a second device according to some aspects.

FIG. 11 shows an exemplary flowchart 1100 describing a method for a communication device to update a beam pair to communicate with a second device according to some aspects.

The method may include communicating with a second device via a device-side beam of a beam pair, wherein the second device communicates with the communication device via a partner-side beam of the beam pair 1102, evaluating one or more criteria 1104, and updating a beam pair based on the evaluation of the one or more criteria, wherein the updating of the beam pair comprises adjusting the device-side beam to an updated device-side beam of the updated beam pair, and communicating an updated partner-side beam of the beam pair to the second device 1106.

For terminal devices operating in the mmWave frequency bands, the actual exposure radio frequency (RF) exposure range to comply with regulations and/or rules to the human body may be below 15 cm, leading to the potential for the user to absorb a great deal of the energy on a specific and isolated part of his/her body. This is particularly dangerous if the beam is highly focused and all the energy is absorbed by a small surface of the human body.

Figure 12:
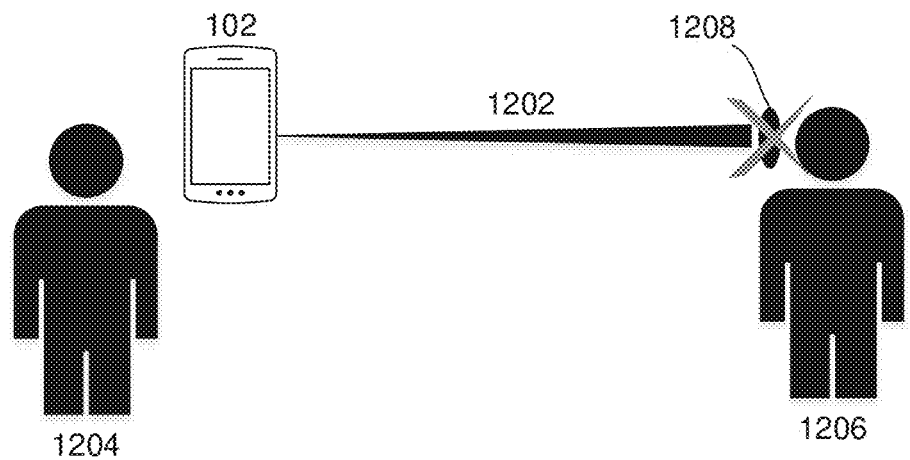
FIG. 12 shows an exemplary high-powered beam from a terminal device according to some aspects.

FIG. 12 shows an exemplary illustration showing a concentrated, high-powered beam 1202 from terminal device 102 and the isolated spot 1208 of another human body 1206 which may bear the entire brunt of the of the high-powered beam 1202. This "pencil-type" emission beam 1202 is typically highly directive and may result in up to an about 30 dBi antenna gain.

The isolated spot 1208 of the human body 1206, in this example located in the head, may be exposed to power density levels in excess of permissible power density levels as allowed by regulatory authorities, e.g., maximum power exposure (MPE) thresholds.

Although not shown in FIG. 12, it is also appreciated that the beam 1202 may be focused on user 1204 instead, such as when a communication partner device (e.g., another UE or a base station) is located on the opposite side of user 1204 as terminal device 102. Accordingly, user 1204 may experience even higher levels of power density levels in this scenario.

Previous solutions include reducing the emission power so that a lower level of energy is absorbed by the user. However, this leads to lower performance of the communication system since less energy will be received by the target device. This problem is especially pronounced in the mmWave frequency bands which experience greater problems associated with link attenuation.

Accordingly, this disclosure provides methods and devices to account for this problem. In some aspects, methods and devices are configured to implement a first scheme to change the emission angle of the beam over time through controlling the angular diversity of the beam emitted by the one or more antenna arrays of the terminal device. In this manner, the emitted energy is spread over a larger surface area over time instead of pointing continuously to a specific spot for large durations of time. In some aspects, methods and devices are configured to implement a second scheme to widen the transmitted beams without reducing the transmission power, thereby reducing the power density levels experienced by the user. This widening of the beam may also provide the benefit of extra gain due to the uplink signal reflections from the sidelobes. In some aspects, methods and devices are configured to dynamically adjust between the first scheme and the second scheme, for example, based on channel parameters such as downlink and/or uplink channel measurements. In some aspects, methods and devices are configured to perform beam identification at the receiver in an expeditious manner by identifying the antenna elements of the antenna array receiving higher levels of energy, and modifying the actively receiving antenna elements based on a deviation in the detection of the angle of arrival (AoA) of a received signal.

By implementing these methods and devices, the disclosure provided herein avoids the problem of focusing all the energy of an emitted beam on a specific spot on the user's body, thereby complying with MPE thresholds, while maintaining the directivity and output power levels. Consequently, the overall performance of the system may not (or only slightly) be impacted while providing the ability to meet any regulations and/or standards.

The methods and devices may be configured to detect a human body with the user of any sensors and/or detectors, e.g., BPSs, as described in FIG. 5.

FIG. 13 shows an illustration depicting a problem scenario 1300 like the one shown in FIG. 12 compared to an exemplary beam sweeping scenario 1350 according to some aspects. Although not shown in FIG. 13, it is also appreciated that the beams 1352-1356 may be focused on user 1204 instead, for example, if a communication partner device (e.g., another UE or a base station) is located on the opposite side of user 1204 as terminal device 102. Accordingly, user 1204 may experience even higher levels of power density levels in this since he/she is located closer to terminal device 102.

As shown in 1350, a beam sweeping scheme is implemented by terminal device 102 to slightly change the angular direction of beams 1352-1356 to spread the energy absorbed by a detected human body 1206 across multiple spots 1352a-1356a.

The beam sweeping scheme slightly changes the direction of the beam (e.g., mmWave beam) over time. For example, this may include terminal device 102 being configured to time-multiplex the Tx beam angles near a spatial neighborhood of the currently acquired optimal angle of departure (AoD) of the communication partner device, e.g., another UE or a base station. This may have a limited performance loss, if any, on the uplink (UL) traffic, but provides the benefits of meeting MPE threshold requirements by distributing the energy absorbed by a user (or other human) over a larger surface, e.g., 1352a-1356a.

The communication partner device (not shown, e.g., another UE or a base station) receiving the transmitted beams 1352a-1356a may employ a same beam/receive configuration to communicate with terminal device 102 employing a beam sweeping scheme shown by beams 1352a-1356a. In some aspects, the communication partner device may coordinate a timing schedule of the beam sweeping scheme with terminal device 102 a priori, and therefore be configured to adjust its beam configuration/receive configuration accordingly. In some aspects, the communication partner device may be configured to recognize the beam sweeping schedule based on the terminal device's history and adjust accordingly.

Figure 14:
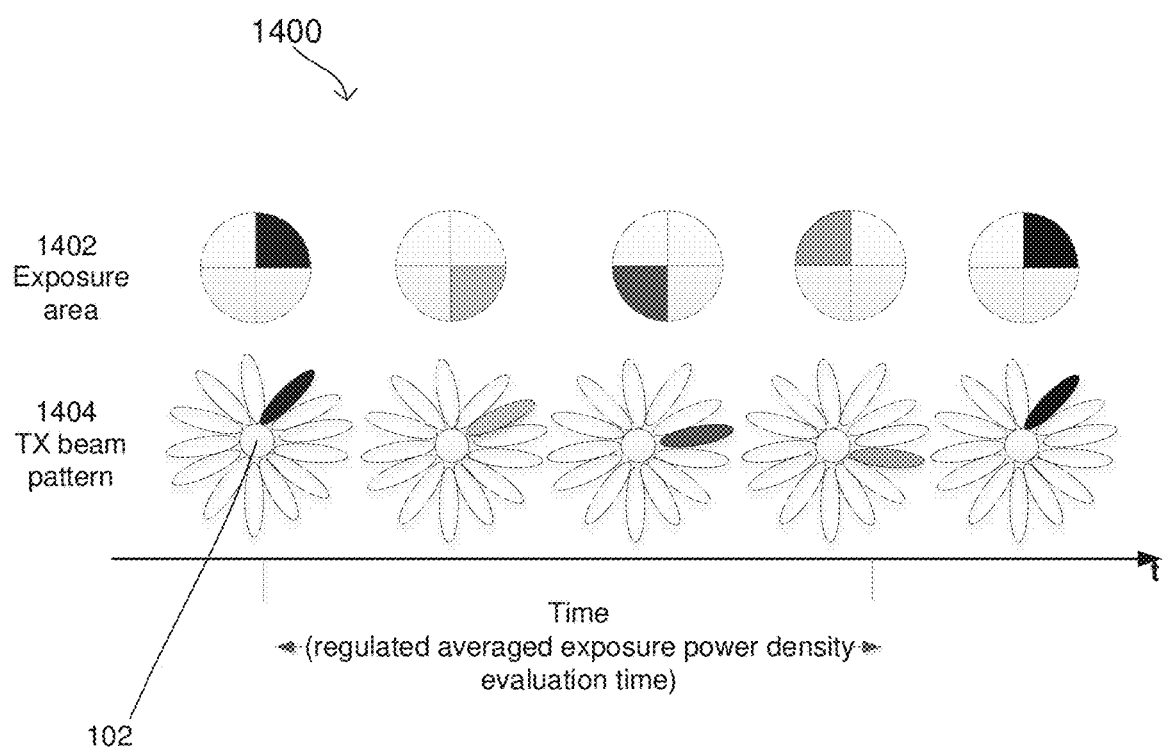
FIG. 14 shows an exemplary diagram depicting exposure areas and transmission beam patterns according to aspects.

FIG. 14 shows an exemplary illustration 1400 depicting the exposure areas 1402 versus the transmission (Tx) beam patterns 1404 from a terminal device 102 as a function of time according to some aspects.

Although only four beams are shown as part of the beam sweeping scheme in illustration 1400, it is appreciated that any number of beams may be used. The time may be determined based on any regulations, standards, and/or rules set forth by regulatory bodies (e.g., FCC) or other standards committees (e.g., 3GPP). For example, the time may be 4 seconds as set forth by the FCC, so each beam shown in illustration 1400 may be used for a duration of 1 second.

As shown in illustration 1400, the alternating Tx beams of beam scheme may be scheduled in a round-robin manner whose regulation period can be adapted to the averaging window length for RF exposure power density limits, e.g., MPE thresholds. As a result, the equivalent exposure power density per exposure area within the regulated power density averaging time window is reduced. An important distinction to the beam sweeping schemes described herein, e.g., as shown in illustration 1400, is that data is communicated in each of the beams. In other words, the beam sweeping scheme is not simply to identify beams meeting a certain criterion, but is instead used to transmit information. In this manner, the terminal device may schedule with the communication partner device the order of the beam sweeping scheme so as to ensure good link conditions for the communication of the data.

Figure 15:
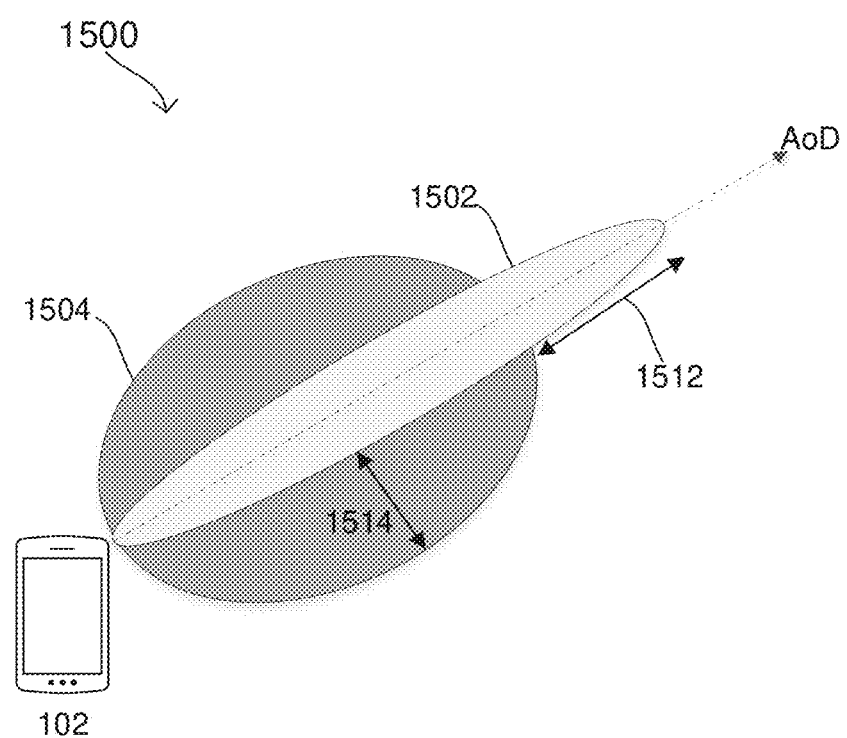
FIG. 15 shows an exemplary selective beam narrowing and/or widening scheme according to some aspects.

FIG. 15 shows an exemplary selective beam narrowing and/or widening scheme 1500 according to some aspects.

Beam 1502 depicts a narrow beam while beam 1504 depicts the wide beam. Arrow 1512 indicates the exposure power density back-off between the narrow beam 1502 and the wide beam 1504. Arrow 1514 indicates the potential extra performance gain attainable from reflected uplink signals from the side-lobes of the widen beam 1504 when compared to the narrow beam 1502.

In the selective beam widening and/or narrowing scheme, the direction of the optimal Angle of Departure (AoD) to the communication partner device remains largely, or completely, unchanged. The selection between the wide beam or the narrow beam may further be influenced by the detection of a human body as described herein. Instead of transmitting a narrow Tx beam with reduced transmission power, the terminal device 102 may widen the Tx beam pattern from 1502 to 1504 without a reduction in the transmission power. This reduces the exposure power density in the case of the detection of a body, for example, by increasing the exposure area with the widened beam, while maintaining the same level of transmission power. This may result is increased signal gain due to the reflected UL signals from the side lobes.

In some aspects, the terminal device 102 may include a beam controller configured to dynamically select between the beam sweeping scheme and the selective beam widening and/or narrowing scheme described herein. The dynamic selection may be based on one or more different factors, including, but not limited to: the detection of an object such a human body, MPE thresholds, link quality considerations, channel conditions, and/or channel parameters.

Both of the beam sweeping and the selective widening and/or narrowing schemes described herein have extra gains when compared with simply reducing the transmission power of a narrow Tx beam. Furthermore, with respect to one another, the beam sweeping scheme generally presents better performance gain in line-of-sight (LoS) channel conditions while the beam widening and/or narrowing technique generally presents better performance gain in multi-path channels by exploiting the gains from the signal reflections of the wide-beam side lobes. The dynamic selection between the two schemes may be either open-looped or close-looped.

In some aspects, in an open-loop example, terminal device 102 may directly measure the channel parameters (e.g., delay spread) from DL signals which are spatially associated to the UL channels and compare it with a predefined threshold. In some aspects, in a closed-loop example, when a human body is detected, terminal device 102 may attempt to try both schemes and measure the UL quality for each scheme. The UL quality measurement can be based on run-timing UL block error rate (BLER) and UL throughput measurement of physical uplink shared channel (PUSCH) transmissions. Based on the UL quality measurements, terminal device 102 could select the TX beam control scheme with the best UL quality.

In some aspects, in addition to selecting between beam sweeping and beam widening/narrowing, the beam controller of terminal device 102 may also be used to select between different methods of beam widening. For example, the widening may be performed in either the horizontal or vertical direction. In a further example, the exact width of the widening/narrowing may be controlled. In a further example, determining which secondary beams to use for beam sweeping may be controlled. Accordingly, in the beam sweeping schemes described herein, non-adjacent beams may also be used. For example, a subset of the best beams may be selected and the transmissions may be distributed across this subset beams. The highest rated beam of the selected subset may, for example, be selected to transmit data of a higher priority.

By dynamically choosing between the different beam schemes described herein, the beam controller of the terminal device determining which beams to use based on a compromise between gain by reducing the local exposure and loss by having to resort to less optimal beams (be it in terms of direction or shape) by adapting suitable parameters like beam width, the direction into which to broaden the beam, or the selection of adjacent or even non-adjacent beams to use. In some aspects, when sweeping between different beams, the sweeping cycle may be designed to preferably switch between nearby beams rather than to jump instantly between beams which are further apart. The relevant distance between the beams or active antenna elements of an antenna array may not be considered at the transmission side but only at the reception side.

The different schemes described herein, either individually or in any combination, may be implemented by communication device with a beam controller. For example, the beam controller may be configured to perform a proximity detection and if a user is detected nearby, it may collect channel state measurements to decide which of the proposed schemes, e.g., the beam sweeping scheme or the selective widening and/or narrowing scheme, to apply.

The widening and/or narrowing of a beam may be controlled by changing the number of activated antenna elements within an antenna panel (e.g. each element of antenna array 306 of FIG. 3A-3B, where four antenna elements are shown in each exemplary antenna array). Changing of the angular position of the beam may be controlled by changing the RF system and/or phase shifter setting of the activated antenna elements within an antenna panel (e.g. RF 304 in FIG. 3A and phase shifters 310 in FIG. 3B). The changes of the activated antenna elements and in the phase shifter setting of the antenna elements are described in further detail with respect to FIG. 3A-3B.

Furthermore, the beam controller may be fine-tuned to perform each of the beam diversity methods (e.g., beam sweeping or the widening/narrowing) by looking at the Quality of Service (QoS). If the channel quality is good or meets a certain threshold, the beam might be steered to a direction that will be away from a user but still guarantees a certain QoS without impacting user experiences. If the channel quality is bad or below a certain threshold, then the beam may be narrowed in the direction of the communication partner device.

Each of the beam schemes may also be negotiated between a terminal device and its communication partner device, e.g., the base station. However, this may require standardization and a specific communication protocol between the devices. In some aspects, the devices and methods described herein are implemented based on alternating the Tx code-words within the antenna panel. The code-words may be pre-defined and the Tx beam pattern neighborhood information may also be known a priori.

Figure 16:
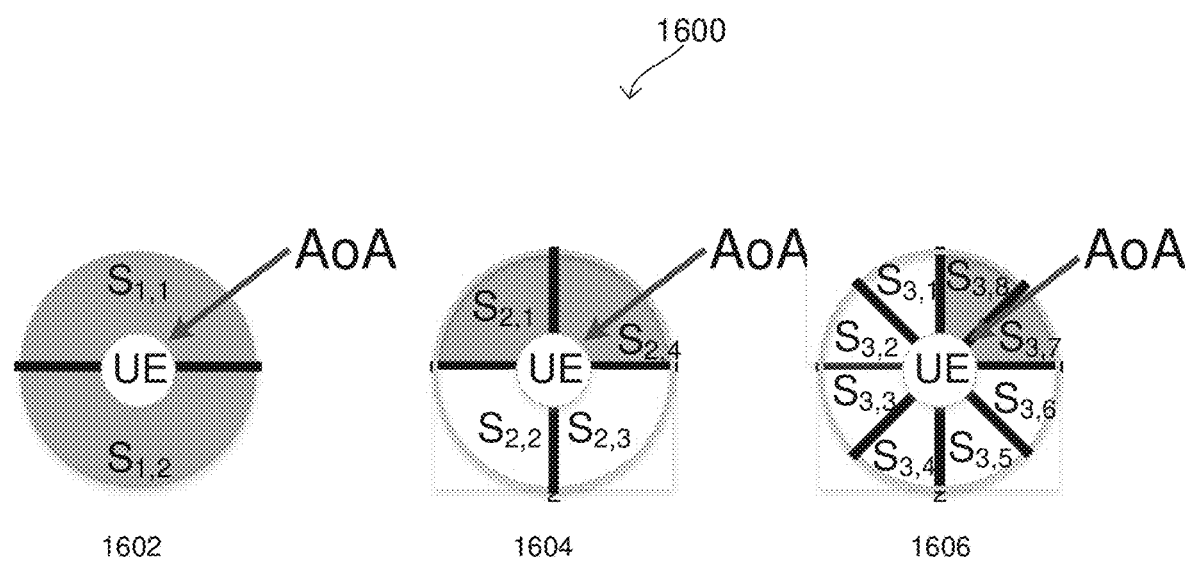
FIG. 16 shows an exemplary beam-finding reception method for an array reception controller to control one or more antenna arrays according to some aspects.

In some aspects, a communication device may include an array reception controller configured to control one or more antenna arrays of the communication device according to a beam-finding reception scheme. FIG. 16 shows an illustration of a method 1600 according to some aspects.

According to some aspects, in case the transmission angle is altered at the transmitter of the communication partner device, the receiver if the terminal device 102, whose location is depicted as "UE" in FIG. 16 may be depicted to perform a method according to 1602-1606. The transmission angle of the incoming signal is denoted by the angle of arrival (AoA). When the transmission angle is altered, the terminal device detects the change (e.g., by a differing amount of energy being received by one or more antenna elements of its antenna system) and triggers a beam-finding approach highlighted in 1602-1606.

Each time that the transmission angle is altered at the transmitter side, the array reception controller at the communication device may restart a beam-finding approach in order to identify the suitable reception cluster, wherein the reception cluster includes one or more reception elements of the antenna array. Since small angular changes in the transmitter may typically lead to small angular changes of the AoA in the receiver in case of Line-of-Sight propagation and a near-by located receiver, the array reception controller may be configured to, instead of restarting the entire identification of the reception cluster process from 1602, start the identifying of the reception cluster from an intermediate step, such as in 1604 or 1606, for example. The array reception controller may initiate this method based on the assumption that the incoming beam is expected to arrive in one of the neighboring clusters, or the same cluster, as the previous reception cluster.

In 1602, the array reception controller may identify that the AoA of the incoming signal is in cluster S1,1. Cluster S1,1 corresponds to a first subset of antenna array elements of a plurality of antenna array elements of the UE. For example, the first subset may correspond to a first antenna array of two antenna arrays located in the UE, or half (or any other proportion) of antenna array elements of a single antenna array.

In 1604, the array reception controller is configured to further narrow down the array elements associated with the AoA in a further, or second, subset of antenna array elements S2,4, wherein the second subset may located within the first subset of antenna array elements. And, in 1606, the array reception controller is configured to further narrow down the array elements associated with the AoA in a further, or third, subset of antenna array elements S3,7, wherein the third subset may located within the second subset of antenna array elements.

Also, angular changes in the transmitter may be typically cyclically repeated and a small number of different transmission angles may be typically applied. For example, angles "alpha_1," "alpha_2," and "alpha_3" may be cyclically applied at the transmitter. Once the corresponding reception clusters are identified for each of the angles (e.g., "alpha_1"→Cluster "S_x1,y1," "alpha_2"→Cluster "S_x2,y2" and "alpha_3"→Cluster "S_x3,y3"), the array reception controller may not need to be repeat the identification of the appropriate reception clusters in the future, but rather, the array reception controller may be configured to identify the clusters based on its previous learnings, e.g., the clusters from the previous reception cluster identification processes are reused.

Figure 17:
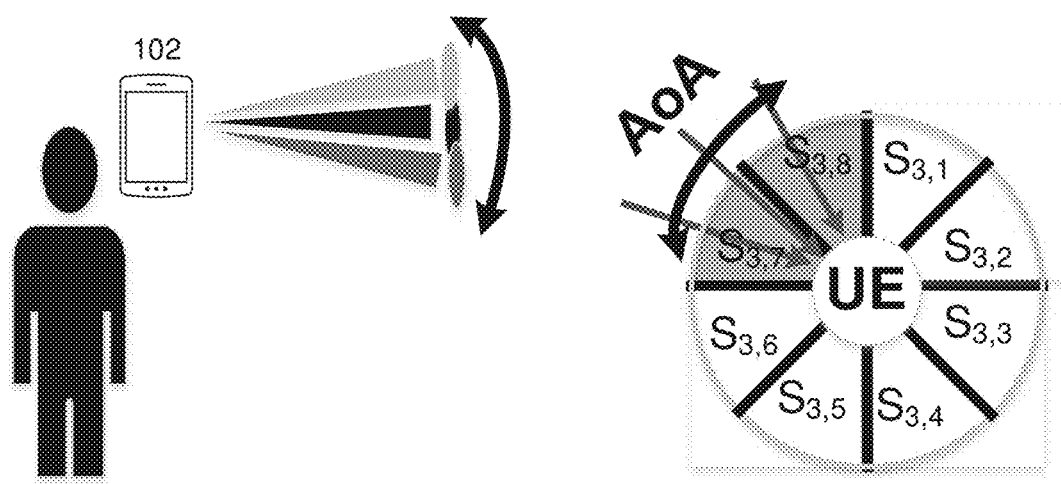
FIG. 17 shows an exemplary illustration for cluster identification of antenna array elements for beam-finding reception according to some aspects.

When a small angular change is applied to the transmission beam, the array reception controller may be configured to anticipate that the new incoming beam may either arrive i) in the current cluster or ii) in a neighboring cluster. It is thus typically sufficient to check the neighboring clusters of incoming energy as illustrated in FIG. 17. As shown, the array reception controller may only need to perform the identification of clusters as shown in 1606 instead of starting from 1602 every time. And, in case that the checking of neighboring clusters is insufficient for identifying the incoming beam, the array reception controller may be configured to start the overall beam identification process from an earlier step, e.g., 1604 or, in the last resort, 1602.

Figure 18:
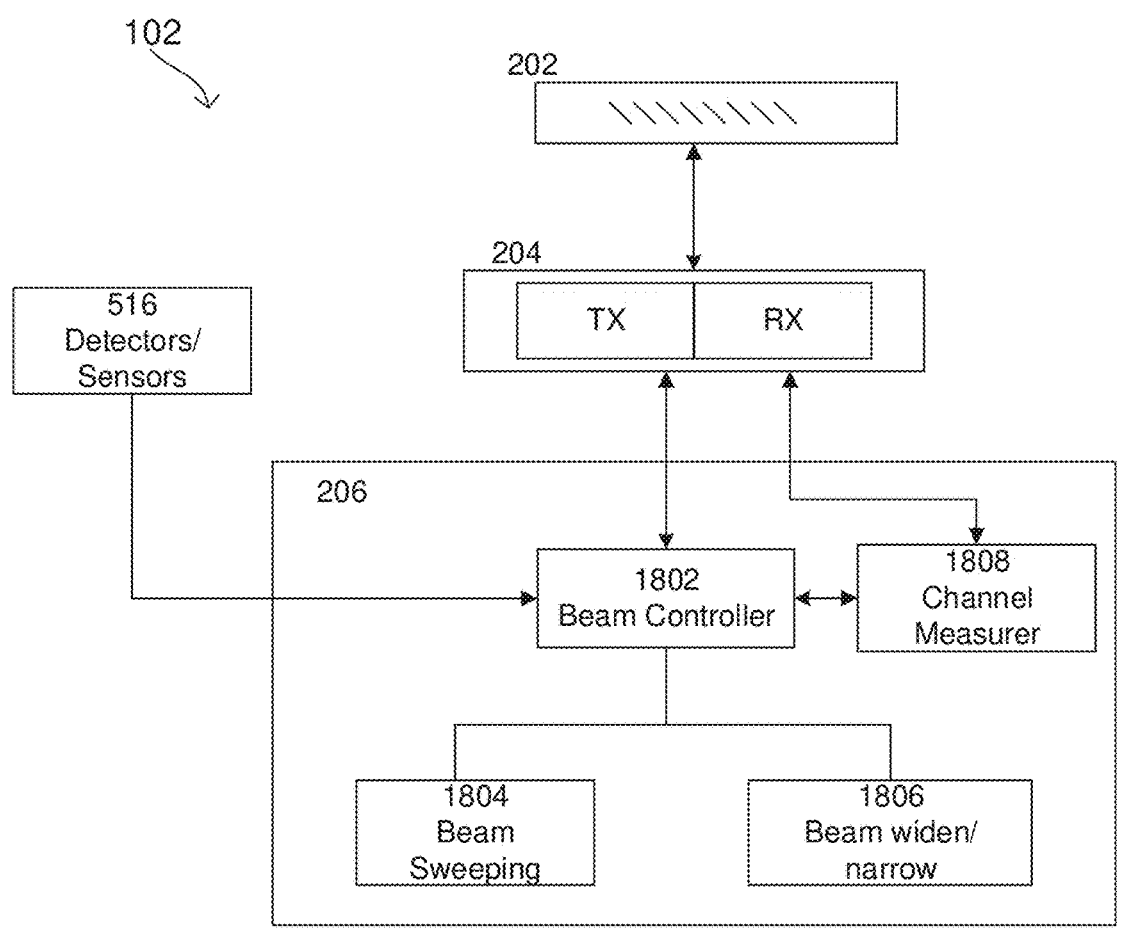
FIG. 18 shows an exemplary internal diagram of a terminal device with components for beam controlling according to some aspects.

FIG. 18 shows an internal diagram a terminal device 102 depicting components according to some aspects. Accordingly, the illustrated depiction of FIG. 18 may omit certain components of terminal device 102 that are not directly related to methods described herein. Additionally, components depicted as being separate in FIG. 18 may be incorporated into a single, hybrid component that performs the same functions as the separate components, and, similarly, single components may be split into two or more separate components that perform the same function as the single component.

As shown in FIG. 18, the baseband modem 206 may include a beam controller 1806 for implementing at least one of two beam schemes: a beam sweeping scheme 1804 or a beam widening and/or narrowing scheme 1806. In some aspects, the beam controller 1802 may be configured to dynamically select between both schemes based on information provided by detectors/sensors 516 or channel measurements obtained from a channel measurer 1808.

Figure 19:
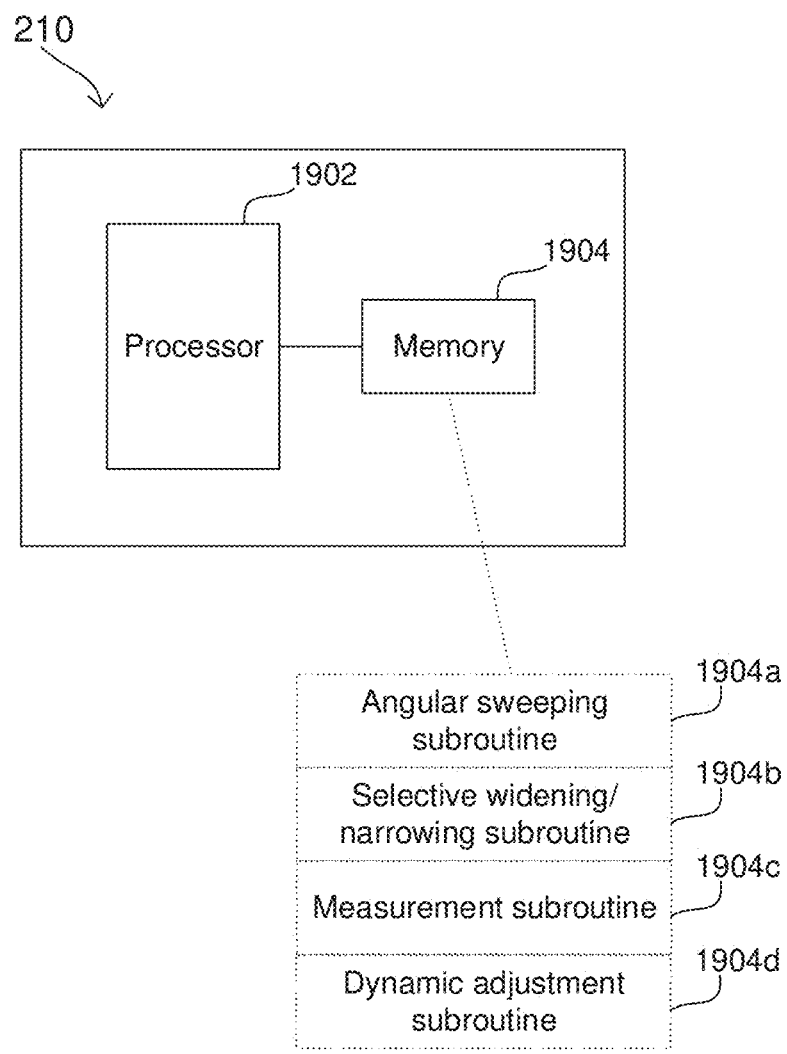
FIG. 19 shows an exemplary internal configuration of controller for beam controlling according to some aspects.

FIG. 19 shows an exemplary internal configuration of controller 210 according to some aspects. As shown in FIG. 19, controller 210 may include processor 1902 and memory 1904. Processor 1902 may be a single processor or multiple processors, and may be configured to retrieve and execute program code to perform the transmission and reception, channel resource allocation, and cluster management as described herein. Processor 1902 may transmit and receive data over a software-level connection that is physically transmitted as wireless radio signals by digital signal processor 208, RF transceiver 204, and antenna system 202. Memory 1904 may be a non-transitory computer readable medium storing instructions for one or more of an angular sweeping subroutine 1904*a*, a selective beam widening and/or narrowing subroutine 1904*b*, a measurement subroutine 1904*c*, and/or a dynamic beam adjustment subroutine 1904*d*.

Angular sweeping subroutine 1904*a*, a selective beam widening and/or narrowing subroutine 1904*b*, a channel measurement subroutine 1904*c*, and/or a dynamic beam adjustment subroutine 1904*d* may each be an instruction set including executable instructions that, when retrieved and executed by processor 1902, perform the functionality of controller 210 and the methods as described herein. In particular, processor 902 may execute angular sweeping subroutine 1904*a* to perform the beam sweeping scheme across a plurality of different angles with respect to the communication device as described herein. Processor 902 may selective beam widening and/or narrowing subroutine 1904*b* to perform the beam widening and/or narrowing beam schemes as described herein. Processors 902 may also execute measurement subroutine 1904c to provide the at least one of an information from a sensor/detector and/or channel measurements for use in the dynamic selection between the schemes described herein. Processors 902 may execute dynamic adjustment subroutine 1904d to adjust dynamically adjust the antenna array system of the terminal device between the beam sweeping and beam widening and/or narrowing schemes described herein.

Figure 20:
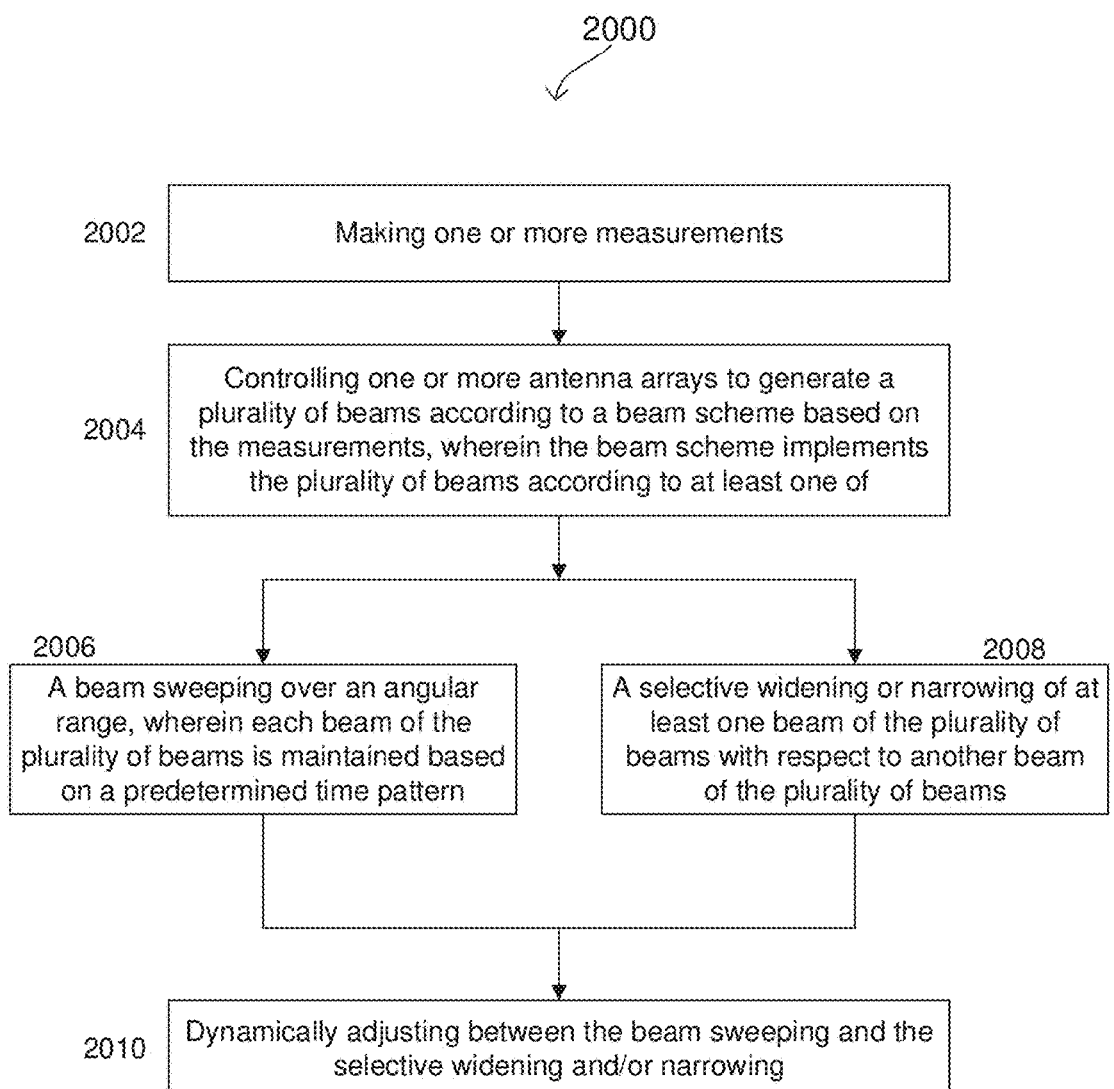
FIG. 20 shows an exemplary flowchart for determining a transmission beam scheme to use in wireless communications according to some aspects.

FIG. 20 shows an exemplary flowchart 2000 describing a method for a communication device to determine a transmission beam scheme to use in wireless communications according to some aspects.

The method may include making one or more measurements 2002; controlling one or more antenna arrays to generate one or more beams according to a beam scheme based on the one or more measurements 2004, wherein the beam scheme implements the one or more beams according to at least one of: over an angular range with respect to the communication device, wherein a first beam of the one or more beams has a different angle with respect to the communication device than a second beam of the one or more beams, and each beam of the one or more beams is maintained based on a predetermined time pattern 2006, or a selective widening and/or narrowing of at least one beam of the one or more beams 2008. In some aspects, the method may further include dynamically adjusting between the beam sweeping and the selective widening and/or narrowing 2010.

The one or more measurements of 2002 may include, for example, measurements made by one or more sensors/detectors for detecting an obstacle (e.g., human body), channel condition measurements (e.g., delay spread, other metrics for determining channel conditions), and/or link quality measurements.

Figure 21:
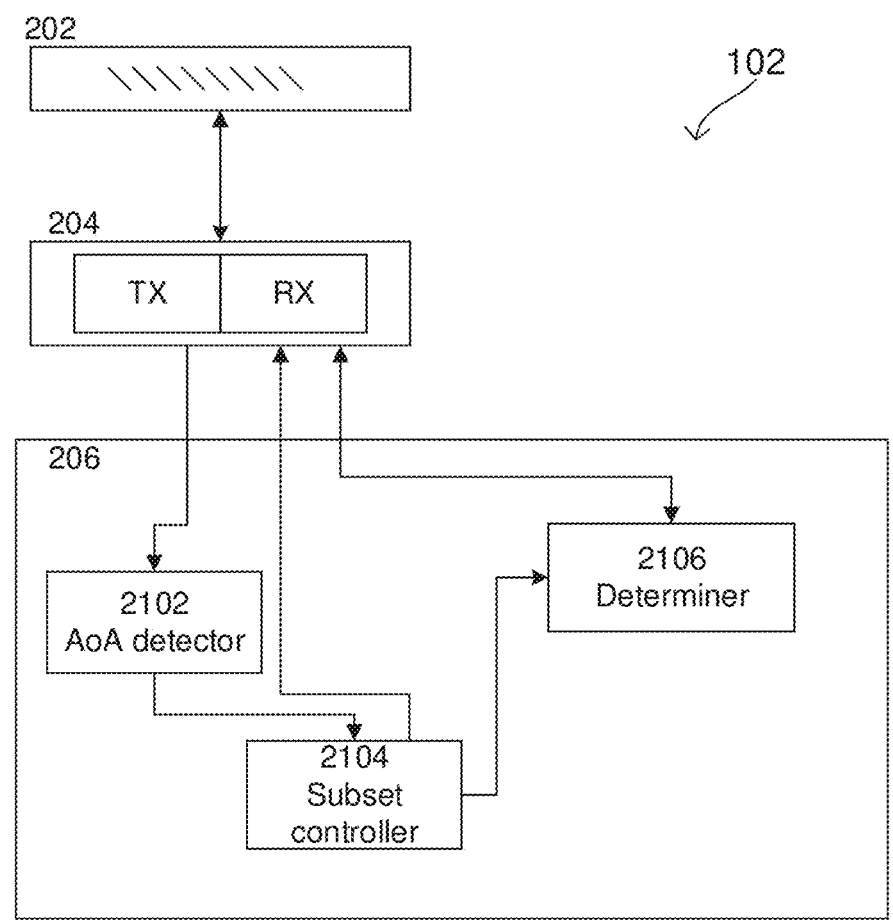
FIG. 21 shows an exemplary internal diagram of a terminal device with components for beam-finding reception according to some aspects.

FIG. 21 shows an internal diagram a terminal device 102 depicting components according to some aspects. Accordingly, the illustrated depiction of FIG. 21 may omit certain components of terminal device 102 that are not directly related to methods described herein. Additionally, components depicted as being separate in FIG. 21 may be incorporated into a single, hybrid component that performs the same functions as the separate components, and, similarly, single components may be split into two or more separate components that perform the same function as the single component.

As shown in FIG. 21, the baseband modem 206 may include an AoA detector 2106 for detecting a change in an angle of arrival of a signal; a subset controller 2104 for controlling a first subset of antenna elements of the plurality of antenna elements to receive the signal based on the detected change, wherein the first subset of antenna elements is fewer in number than the plurality of antenna elements; and a determiner 2106 for determining which of the antenna elements in the first subset of antenna elements reports a suitable reception strength and set the one or more antenna arrays to the receive scheme based on the determination.

Figure 22:
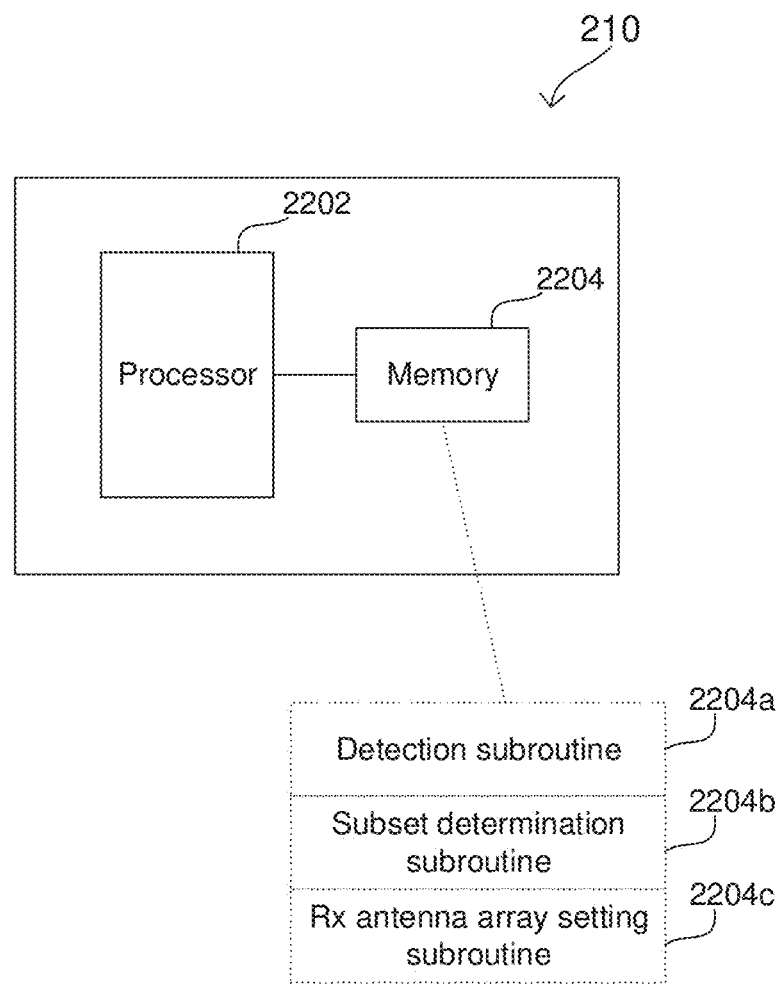
FIG. 22 shows an exemplary internal configuration of controller for beam-finding reception according to some aspects.

FIG. 22 shows an exemplary internal configuration of controller 210 according to some aspects. As shown in FIG. 22, controller 210 may include processor 2202 and memory 2204. Processor 2202 may be a single processor or multiple processors, and may be configured to retrieve and execute program code to perform the transmission and reception, channel resource allocation, and cluster management as described herein. Processor 2202 may transmit and receive data over a software-level connection that is physically transmitted as wireless radio signals by digital signal processor 208, RF transceiver 204, and antenna system 202. Memory 2204 may be a non-transitory computer readable medium storing instructions for one or more of a detection subroutine 2204a, a subset determination subroutine 2204b, and/or a reception (Rx) antenna array setting subroutine 2204c.

Detection subroutine 2204a, a subset determination subroutine 2204b, and/or a reception (Rx) antenna array setting subroutine 2204c may each be an instruction set including executable instructions that, when retrieved and executed by processor 2202, perform the functionality of controller 210 and the methods as described herein. In particular, processor 2202 may execute detection subroutine 2204a, a subset determination subroutine 2204b, and/or a reception (Rx) antenna array setting subroutine 2204c according to the methods described herein, e.g., with respect to FIGS. 16, 17, 21, and 23.

Figure 23:
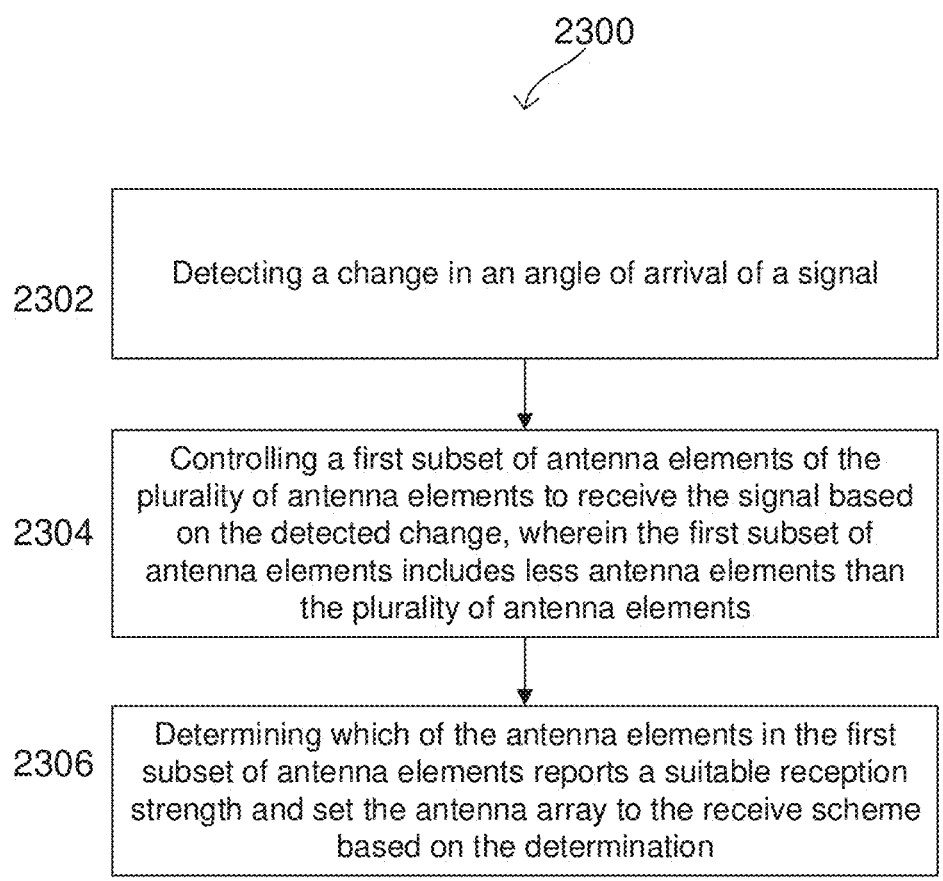
FIG. 23 shows an exemplary flowchart for beam-finding reception according to some aspects.

FIG. 23 shows an exemplary flowchart 2300 describing a method for a communication device to set an antenna array receive configuration according to some aspects.

The method may include detecting a change in an angle of arrival of a signal 2302, controlling a first subset of antenna elements of the plurality of antenna elements to receive the signal based on the detected change, wherein the first subset of antenna elements includes less antenna elements than the plurality of antenna elements 2304, and determining which of the antenna elements in the first subset of antenna elements reports a suitable reception strength and set the one or more antenna arrays to the receive scheme based on the determination 2306.

As discussed above, beamforming can concentrate an antenna array's radiation pattern into a focused beam. While this can provide beamforming gain, it can also increase the level of human RF exposure, such as when beamforming focuses an antenna array's radiation onto a user's body. This may be particularly problematic in emerging high-frequency radio technologies such as 5G, which may use beamforming to counteract the pathloss of high-frequency carriers.

To manage human RF exposure, regulatory bodies have introduced more stringent requirements for mmWave technologies. These include the MPE requirements discussed above, such as those specified in the 5G NR standard. While legacy 3G and 4G technologies were governed only by near-field RF exposure restrictions, these MPE requirements require exposure protection in both the near-field and far-field regions of the transmit antennas (e.g., up to 15 cm depending on RF measurements).

Aspects described above sought to reduce human RF exposure by changing the beamforming configuration used by a transmitting terminal device, such as by switching the matched transmit-receive beamforming pair between a terminal device and network access node or by cyclically adjusting a terminal device's beamforming configuration to spread out the affected area of a human. By contrast, aspects of this disclosure described here seek to reduce human RF exposure by triggering a channel switch procedure to a narrower bandwidth channel. Because the new channel has narrower bandwidth, the terminal device can reduce its transmit power without reducing the transmit power density. Since the transmit power density can be maintained, the terminal device can continue to perform uplink communications with sufficient link quality while also reducing human exposure power levels. As described below, these aspects may use 5G NR's bandwidth part (BWP) fallback mechanism to trigger a channel switch procedure that switches from a current BWP to a default BWP with narrower bandwidth. These aspects can therefore re-purpose 5G NR's BWP fallback mechanism to help mitigate human RF exposure.

Figure 24:
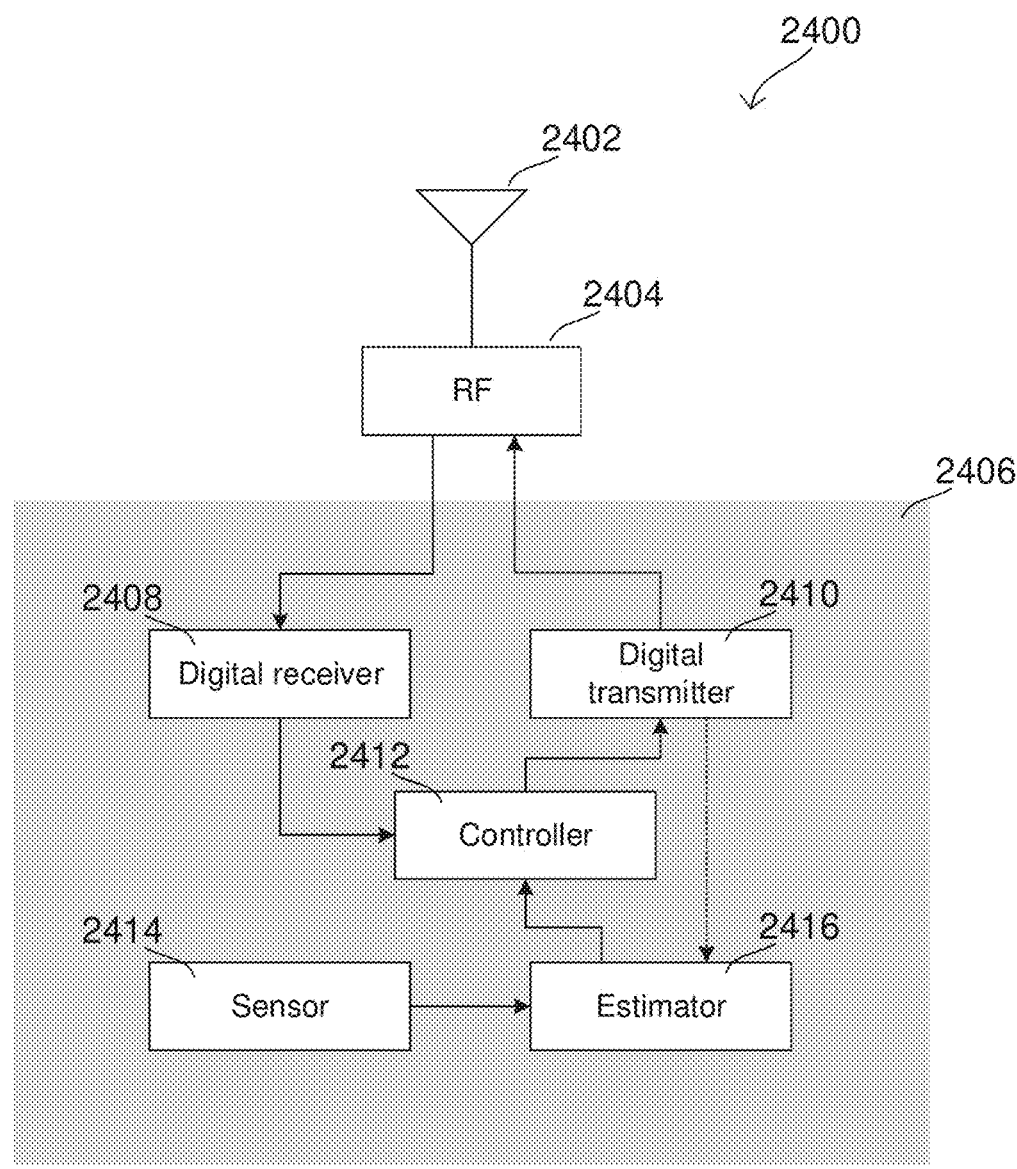
FIG. 24 shows an exemplary internal configuration of a terminal device according to some aspects.

FIG. 24 shows an exemplary configuration of terminal device 2400 according to some aspects. The configuration shown in FIG. 24 is focused on the human RF exposure mitigation features of terminal device 2400 and may not expressly depict other components that are less relevant to these features. As FIG. 24 shows, terminal device 2400 may include antenna system 2402, RF transceiver 2404, and baseband modem 2406. Terminal device 2400 may transmit and receive radio signals on one or more radio access networks. Baseband modem 2406 may direct such communication functionality of terminal device 2400 according to the communication protocols associated with each radio access network, and may execute control over antenna system 2402 and RF transceiver 2404 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 2400 shown in FIG. 24 depicts only a single instance of such components.

Terminal device 2400 may transmit and receive wireless signals with antenna system 2402, which may be a single antenna, an antenna array that includes multiple antennas, or multiple antenna arrays that each include multiple antennas. In some aspects, antenna system 2402 may additionally include analog antenna combination and/or beamforming circuitry. In the receive (RX) path, RF transceiver 2404 may receive analog radio frequency signals from antenna system 2402 and perform analog and digital RF front-end processing on the analog radio frequency signals to produce digital baseband samples (e.g., In-Phase/Quadrature (IQ) samples) to provide to baseband modem 2406. RF transceiver 2404 may include analog and digital reception components including amplifiers (e.g., Low Noise Amplifiers (LNAs)), filters, RF demodulators (e.g., RF IQ demodulators)), and analog-to-digital converters (ADCs), which RF transceiver 2404 may utilize to convert the received radio frequency signals to digital baseband samples. In the transmit (TX) path, RF transceiver 2404 may receive digital baseband samples from baseband modem 2406 and perform analog and digital RF front-end processing on the digital baseband samples to produce analog radio frequency signals to provide to antenna system 2402 for wireless transmission. RF transceiver 2404 may thus include analog and digital transmission components including amplifiers (e.g., Power Amplifiers (PAs), filters, RF modulators (e.g., RF IQ modulators), and digital-to-analog converters (DACs), which RF transceiver 2404 may utilize to mix the digital baseband samples received from baseband modem 2406 and produce the analog radio frequency signals for wireless transmission by antenna system 2402. In some aspects baseband modem 2406 may control the radio transmission and reception of RF transceiver 2404, including specifying the transmit and receive radio frequencies for operation of RF transceiver 2404.

FIG. 24 also depicts several internal components of baseband modem 2406, including digital receiver 2408, digital transmitter 2410, controller 2412, sensor 2414, and estimator 2416. In some aspects, baseband modem 2406 may include a digital signal processor and a protocol controller. Digital receiver 2408, digital transmitter 2410, and controller 2412 may therefore be subcomponents of the digital signal processor (e.g., physical layer components) and/or subcomponents of the protocol controller (e.g., protocol stack components). In some aspects, digital receiver 2408 may be the physical layer receive chain, digital transmitter 2410 may be the physical layer transmit chain, and controller 2412 may be the protocol controller that executes the protocol stack of baseband modem 2406. For example, digital receiver 2408 may include a demodulator, demapper (e.g., constellation demapper), de-interleaver, decoder, and/or descrambler. Digital receiver 2408 may receive wireless signals in the form of baseband samples via antenna system 2402 and RF transceiver 2404. Digital receiver 2408 may then sequentially process these baseband samples with the demodulator, demapper (e.g., constellation demapper), de-interleaver, decoder, and/or descrambler to produce a bitstream, which digital receiver 2408 may provide to controller 2412 (e.g., to protocol stack layers of controller 2412). Digital transmitter 2410 may include a scrambler, encoder, interleaver, mapper (e.g., constellation mapper), and/or a modulator, which may sequentially process a bitstream (e.g., provided by protocol stack layers of controller 2412) to produce baseband samples (e.g., complex IQ symbols). Digital transmitter 2410 may then transmit these baseband samples as wireless signals via RF transceiver 2404 and antenna system 2402. Controller 2412 may include one or more processors configured to execute the protocol stack layers as software. This may include generating messages for digital transmitter 2410 to transmit (e.g., messages including user or control data) and/or recovering messages from bitstreams provided by digital receiver 2408. In some aspects, controller 2412 may be configured to perform user-plane and control-plane functions to facilitate the transfer of application layer data to and from terminal device 2400 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 2412 may include executable instructions that define the logic of these functions. Controller 2412 may also be configured to control beamforming by antenna system 2402. In some aspects, controller 2412 may be configured with the features of beamforming controller 302 in FIGS. 3A and 3B and may control the digital or RF beamforming of antenna system 2402. Controller 3512 may therefore select the beamforming weight vector for antenna system 2402 (either to apply digitally like in FIG. 3A or with RF phase shifters like in FIG. 3B).

Figure 25:
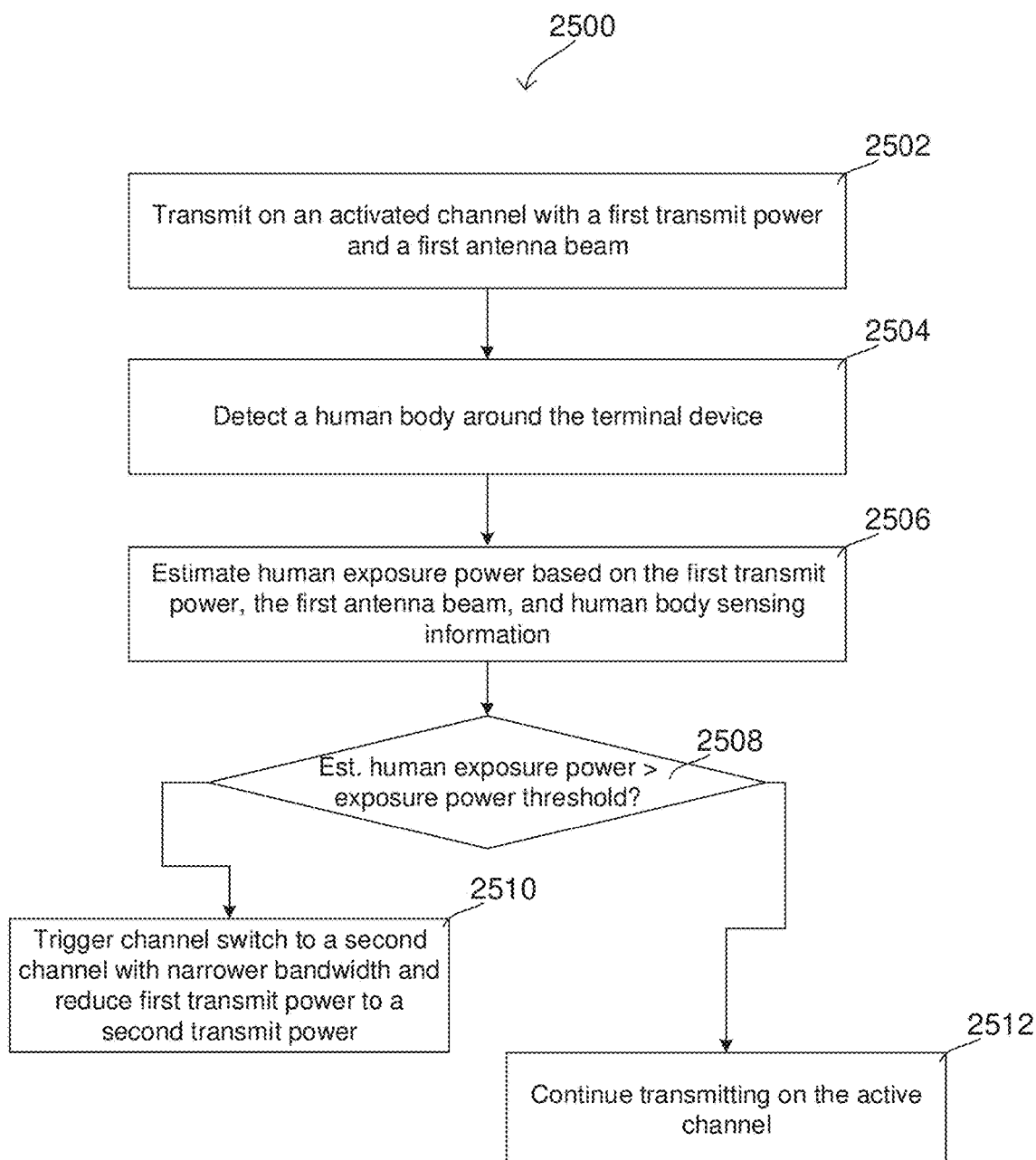
FIG. 25 shows an exemplary flowchart for mitigating human RF exposure with channel switching according to some aspects.

Terminal device 2400 may be configured to mitigate human RF exposure with channel switching. FIG. 25 shows exemplary method 2500, which terminal device 2400 may execute to perform the human RF exposure mitigation with channel switching in some aspects. As described below, in some aspects terminal device 2400 may use the 5G NR BWP fallback mechanism as the channel switching mechanism; in other aspects, terminal device 2400 may use another available channel switching mechanism (such as where terminal device 2400 is configured to operate with another radio access technology). Terminal device 2400 may use this channel switching mechanism to switch to a channel with narrower bandwidth, which can enable terminal device 2400 to reduce its transmit power without reducing uplink sensitivity.

Specifically, as shown in FIG. 25 terminal device 2400 may first transmit on an activated channel with a first transmit power and a first antenna beam in stage 2502. For example, controller 2412 of terminal device 2400 may specify the first transmit power to digital transmitter 2410, and digital transmitter 2410 may then transmit data via RF transceiver 2404 at the first transmit power. Controller 2412 may also specify the activated channel to digital transmitter 2410, and digital transmitter 2410 may transmit the data on the activated channel. Controller 2412 may also specify a first antenna beam to digital transmitter 2410 and/or to an RF phase shifter array attached to antenna system 2402 (not explicitly shown in FIG. 24), such as where the first antenna beam is represented by a first beamforming weight vector. Digital transmitter 2410 may transmit the data with the first antenna beam by applying digital beamforming (e.g., as in FIG. 3A), such as by applying a the first beamforming weight vector to the data when transmitting the data; alternatively, digital transmitter 2410 may transmit the data with the first antenna beam by applying RF beamforming (e.g., as in FIG. 3B), such as where an RF phase shifter array attached to antenna system 2402 applies the first beamforming weight vector to the data.

In some aspects, the activated channel may be a bandwidth part (BWP), such as a BWP used in 5G NR. The 5G NR standard specifies that different BWPs can be assigned to different parts of a wideband carrier. For example, a first BWP may be assigned to a first frequency range in the carrier's bandwidth, a second BWP may be assigned to a second frequency range in the carrier's bandwidth, a third BWP to a third section, and so forth. Each BWP can then act as its own channel, and can, for example, have its own bandwidth, subcarrier spacing, symbol duration, and/or cyclic prefix (CP) length. A terminal device that is operating on the carrier can then select one of the BWPs to use for uplink and/or downlink communications (e.g., the same or different BWP for uplink and downlink). In some aspects, the terminal device can select a specific BWP based on the type of communications; for example, a terminal device that is receiving bursty traffic (e.g., IP traffic) may select a BWP with a wider bandwidth. Providing multiple BWPs on a single carrier may therefore provide flexibility, allowing terminal devices to use different BWPs based on the demands of their current data connections.

5G NR further specifies that the network can configure a terminal device for four BWPs in uplink and four BWPs in downlink at a time (e.g., via control signaling from the network access node) but currently limits a terminal device to only one uplink BWP and one downlink BWP active at a time. The network designates one of the configured BWPs the as the default uplink BWP. The terminal device can then use the default uplink BWP for timing advance and to re-synchronize when timing advance is lost. In some cases, the network may configure the same BWP as both a default uplink and downlink BWP; in other cases, the network may configure a default uplink BWP that is different from the default downlink BWP.

In the example of FIG. 25, terminal device 2400 may initially be using a non-default BWP as the activated channel. Accordingly, while terminal device 2400 may have initially used the default BWP (e.g., a default channel) to determine a timing advance and to establish synchronization with the network, terminal device 2400 may have switched to a non-default BWP as the activated channel. In this 5G NR example, the activated channel may be one of the four configured uplink BWPs.

After transmitting on the activated channel, terminal device 2400 may detect a human object nearby in stage 2504. For example, sensor 2414 may be configured to sense a human object around terminal device 2400. As used herein, a human object refers to a whole human body or any part of a human body (e.g., a hand, a torso, a head, and the like). The human object may be the body of a user of terminal device 2400 or a human body of a non-user that is near terminal device 2400. In various aspects, sensor 2414 may be an infrared sensor, a capacitive sensor, a resistive sensor, an optical sensor, a piezoelectric sensor, a camera, a microphone, a radar sensor, or the like. Sensor 2414 may be configured to perform human object sensing depending on its sensor type. For example, the infrared sensor measures infrared light and may be configured to detect a human object based on a known IR spectrum, the camera may be configured to detect a human object via image recognition, the capacitive sensor may be configured to detect a human object by observing charge variations in a capacitor, and so forth. In some aspects, sensor 2414 may be a mmWave radar sensor, and may use an antenna array of antenna system 2402 to detect a human object (e.g., an antenna array-based radar sensor). This mmWave radar sensor is fully described below in FIGS. 37 and 38. In some aspects, the mmWave radar sensor may be configured to detect human object movements and tremor with Doppler and micro-Doppler effects. In some aspects, the mmWave radar sensor may be configured to correlate a blocking object's distance with its reflectivity, and to distinguish between human and non-human blocking objects by comparing the correlation to values stored in the terminal device (e.g. the reflectivity of human body parts such as tissue may be characterized dependent on distance thereby allowing the terminal device to determine human presence based on the measured target distance and the reflected signal intensity). In some aspects, the mmWave radar sensor may measure the reflectivity of an object across a wide frequency range and may compare the resulting signature with the expected response of the reflectivity of a human object. In some aspects, the mmWave radar sensor may combine multiple of Doppler, correlation of distance with reflectivity, and frequency response reflectivity signatures to detect human bodies.

Sensor 2414 may use any of these techniques (or multiple of these techniques) to detect a human object. Based on the detection, sensor 2414 may obtain human object sensing information that describes the orientation of the detected human object. For example, sensor 2414 may obtain a distance value for the distance between terminal device 2400 and the detected human object. Sensor 2414 may also obtain a direction value that represents the direction of the detected human object relative to terminal device 2400. The direction can be, for example, an angular direction or a vector direction that expresses where the detected human object is relative to terminal device 2400. This distance value and direction value can be the human object sensing information.

Figure 26:
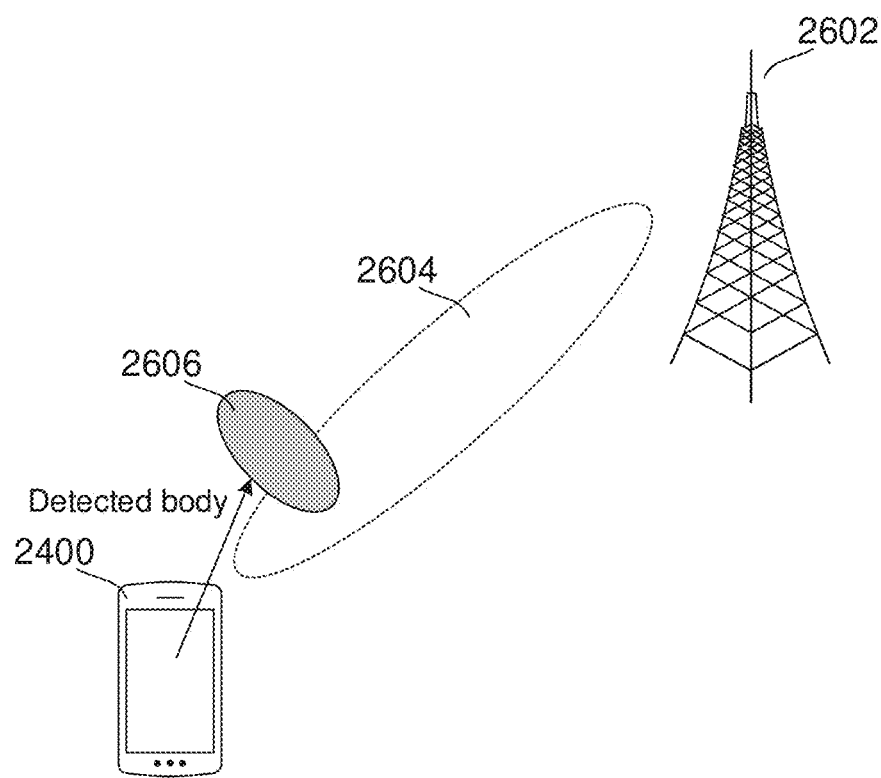
FIG. 26 shows an exemplary scenario of a sensor detecting an object according to some aspects.

FIG. 26 shows an example of sensor 2414 detecting a human object according to some aspects. As shown in FIG. 26, terminal device 2400 may transmit data to network access node 2602 (e.g., using the first transmit power and the first antenna beam; antenna beam 2604 is shown in FIG. 26). Sensor 2412 may then detect human object 2606 and may obtain human object sensing information that represents the location of human object 2606 relative to terminal device 2400. The human object sensing information may, for example, include a distance value for the distance between terminal device 2400 and human object 2606 and a direction value for the direction of human object 2606 relative to terminal device 2400.

After detecting the human object, sensor 2414 may provide the human object sensing information to estimator 2416. Estimator 2416 may then estimate a human RF exposure power based on the first transmit power, the first antenna beam, and the human object sensing information in stage 2506. The estimated human exposure power (estimated RF exposure power to a human body) may be an estimated amount of RF energy from the antenna beam that hits the human object, such as a value of units mWatts/cm$^2$ (or, equivalently, any unit of power over area). Estimator 2416 may be a processor configured to calculate an estimated human exposure power based on these input parameters, and may use any of a number of estimation techniques to calculate the estimated human exposure power. For example, estimator 2416 may base its estimation on whether the detected human object's location (represented by the human object sensing information) overlaps with the first antenna beam. FIG. 26 shows an example of this, where antenna beam 2604 hits human object 2606 (e.g., human object 2606 falls within the path of antenna beam 2604). Estimator 2416 may estimate the human exposure power to have a larger value when the detected human object has a larger spatial overlap with the first antenna beam, and may estimate the human exposure power to have a smaller value when the detected human object has a smaller spatial overlap with the first antenna beam. Estimator 2416 may also, for example, base its estimation on the distance between terminal device 2400 (e.g., between the antenna array of terminal device 2400 that is transmitting the data) and the detected human object. For instance, estimator 2416 may estimate the human exposure power to have a larger value when the detected human object is closer to terminal device 2400, and may estimate the human exposure power to have a smaller value when the detected human object is farther from terminal device 2400. Estimator 2416 may also, for example, base its estimation on the first transmit power that terminal device 2400 is using to transmit the data. For instance, estimator 2416 may estimate the human exposure power to have a larger value when the first transmit power is larger, and may estimate the human exposure power to have a smaller value when the first transmit power is smaller. In some aspects, estimator 2416 may estimate the human exposure power by detecting the distance between the detected human object and the antenna array and then offsetting the first transmit power based on the distance.

Estimator 2416 may provide the estimated human exposure power to controller 2412. Controller 2412 may then compare the estimated human exposure power with an exposure power threshold in stage 2508 and determine whether the estimated human exposure power is greater than or below the exposure power threshold. In some aspects, the exposure power threshold may be, or may be based on, a standardized exposure power threshold. For example, the exposure power threshold may be an MPE threshold, such as an MPE threshold specified by a regulatory body like the Federal Communications Commission (FCC) or the International Commission on Non-Ionizing Radiation Protection (ICNIRP). In another example, the exposure power threshold may be set to a slightly lower value than a regulatory threshold, such as to provide a tolerance range.

Controller 2412 may then proceed to stage 2510 or 2512 based on whether the estimated human exposure power is greater than or less than the exposure power threshold. As shown in FIG. 25, if the estimated human exposure power is greater than the exposure power threshold, controller 2412 may trigger a channel switch to a second channel with narrower bandwidth and may reduce the first transmit power to a second transmit power in stage 2510. In a general example, controller 2412 may send signaling to the network access node that triggers a channel switch from the activated channel to a second channel, where the second channel has narrower bandwidth than the activated channel. Controller 2412 may also reduce the first transmit power to a second transmit power and instruct digital transmitter 2410 and RF transceiver 2404 to use the second transmit power to transmit subsequent data to the network access node. In some aspects, after triggering the channel switch, controller 2412 may receive uplink grants from the network that assign terminal device 2400 to transmit on the second channel. These uplink grants may optionally specify the second transmit power. For example, the network may linearly assign transmit power based on the allocated bandwidth, and so may instruct terminal device 2400 to use the second transmit power when transmitting on the second channel. Controller 2412 may then control terminal device 2400 to transmit according to the second transmit power specified in the uplink grant. Alternatively, controller 2412 may select the second transmit power independently (e.g., without receiving an explicit instruction from the network to use the second transmit power). In some aspects, controller 2412 may configure digital transmitter 2410 for transmission on the second channel, such as by specifying the channel parameters (e.g., frequency range, subcarrier spacing, symbol duration, and/or CP length) for the second channel. Digital transmitter 2410 may then modulate data (e.g., perform PHY layer processing on the data) and transmit the data on the second channel via RF transceiver 2404 and antenna array 2402. In some aspects, controller 2412 may continue to use the first antenna beam when digital transmitter 2410 transmits the data on the second channel (e.g., may not change the first antenna beam). In some aspects, the data that digital transmitter 2410 transmits on the second channel may be part of the same uplink data stream (e.g., on the same radio bearer, part of the same data connection, or to the same end location or server) as the data that digital transmitter 2410 previously transmitted on the first channel.

Conversely, if controller 2412 determines that the estimated human exposure power is less than the exposure power threshold, controller 2412 may continue transmitting on the activated channel with the first transmit power. For instance, because the estimated human exposure power was below the exposure power threshold, there may not be reason to change the transmission configuration (e.g., no reason to reduce the bandwidth or transmit power).

With this procedure, terminal device 2400 may reduce the human exposure power without weakening the radio link and causing coverage issues. For example, if terminal device 2400 only reduced the transmit power (from the first transmit power to the second transmit power) and did not switch to a narrower bandwidth, the power density per resource element (e.g., per subcarrier and symbol) would decrease; in other words, reducing the transmit power without reducing bandwidth will decrease the amount of power per unit frequency (the power spectral density). Reducing the power spectral density reduces the SNR, and can in turn cause coverage issues and make it difficult for the network access node to recover the transmitted uplink data.

By contrast, with the procedure of method 2500, terminal device 2400 can reduce the transmit power without significantly decreasing the power spectral density. Specifically, terminal device 2400 switches to a second channel with narrower bandwidth and reduces the transmit power. Terminal device 2400 can therefore maintain, or even increase, the power spectral density, and as a result can maintain a strong link with the network access node. In some aspects, terminal device 2400 may reduce the data rate (e.g., reduce throughput) when transmitting data on the second channel with the second transmit power, since it can be difficult to transmit data at the same rate without seeing data loss. In either case, terminal device 2400 may reduce the transmit power, and consequently reduce the human exposure power, without significantly impairing the transmit link.

As previously indicated, in a general example terminal device 2400 may exchange signaling with the network access node to perform the channel switch from the activated channel to the second channel with narrower bandwidth. In one example of this, controller 2412 of terminal device 2400 may consider multiple channels and identify one of those channels with a narrower bandwidth than the activated channel. These multiple channels may be configured so the channels occupy different frequency ranges (e.g., non-overlapping bandwidths, such as for 5G NR BWPs). Controller 2412 may select that channel as the second channel, and may send signaling to the network access node that triggers a channel switch from the activated channel to the second channel. Controller 2412 may optionally receive signaling from the network access node that confirms the channel switch to the second channel, and may then perform the channel switch to the second channel.

In an example for 5G NR or other technologies with a BWP fallback mechanism, controller 2412 may utilize BWP fallback as the channel switching mechanism in stage 2510. BWP fallback is a standardized 5G NR procedure that terminal devices can use when they lose uplink timing with the network. Specifically, when a 5G NR terminal device is using a non-default BWP and loses its uplink timing (e.g., from timing advance drift), it can send a random access transmission (e.g., a physical random access channel (PRACH) transmission) to the gNodeB on the default BWP. The terminal device can base the random access transmission (e.g., its preamble sequence) on a beam index that represents the antenna beam that the terminal device is using. This signals to the gNodeB that the terminal device has lost timing and needs to re-establish its timing advance. The gNodeB then schedules uplink grants (e.g., physical uplink shared channel (PUSCH) grants) on the default BWP for the terminal device, and uses the antenna beam identified by the random access transmission for receiving uplink data from the terminal device. The terminal device then performs uplink transmission on the default BWP according to the uplink grants.

This procedure, known as BWP fallback, is therefore intended to address uplink timing loss. Aspects of this disclosure, however, re-purpose BWP fallback to trigger a channel switch from the activated channel to the second channel. For example, digital transmitter 2410 may initially be using a BWP that is not the default BWP (a non-default BWP) as the activated channel in stage 2502. If controller 2412 determines that the estimated human exposure power is greater than the exposure power threshold in stage 2508, controller 2412 may use BWP fallback as the channel switching mechanism in stage 2510. Specifically, controller 2412 may control digital transmitter 2410 to transmit a random access transmission (PRACH) on the default BWP (e.g., also using a predefined beam index of the first antenna beam to generate a preamble sequence that identifies the first antenna beam). The network access node may receive the random access transmission on the default BWP and recognize that terminal device 2400 is triggering BWP fallback. The network access node may register the BWP fallback and may start sending uplink grants (PUSCH grants) to terminal device 2400 on the default BWP. Digital receiver 2408 may receive these uplink grants (via RF transceiver 2404) and provide them to controller 2412. Controller 2412 may configure digital transmitter 2410 to transmit on the default BWP, and digital transmitter 2410 may transmit data on the default BWP (the second channel). This may deactivate the activated BWP and switch all uplink transmission to the default BWP. As previously described, controller 2412 may also reduce the first transmit power (used earlier for transmitting on the default BWP) to a second transmit power, and digital transmitter 2410 and RF transceiver 2404 may transmit the data on the default BWP with the second transmit power. Since the default BWP generally has the narrowest bandwidth of the configured BWPs, this BWP fallback likely restrict the maximum bandwidth allocation of uplink channels (e.g., the number of resource blocks allocated for PUSCH) for terminal device 2400. Transmit power is linearly scaled with the number of allocated resource blocks so terminal device 2400 will reduce its transmit power when it switches to the default BWP. Terminal device 2400 will therefore deliver less RF energy the human object and cause less RF exposure damage. Even though terminal device 2400 reduced it transmit power, it can maintain uplink sensitivity because it also reduced its transmission bandwidth. In some cases, controller 2412 may maintain the same first antenna beam (e.g., unless separate factors like mobility independently trigger a beam change).

Default BWP may therefore serve as the channel switching mechanism. However, while the default BWP often has the narrowest bandwidth out of the configured uplink BWPs, in some cases it may not. Accordingly, in some aspects controller 2412 may first compare the bandwidth of the activated BWP to the bandwidth of the default BWP before triggering a channel switch in stage 2510. If the default BWP's bandwidth is narrower than the activated BWP's bandwidth, controller 2412 may trigger the channel switch using BWP fallback. Conversely, if the default BWP's bandwidth is wider than the activated BWP's bandwidth, BWP fallback may not cause a channel switch to a narrower bandwidth. In that scenario, controller 2412 may decide not to trigger a channel switch and may instead reduce the first transmit power to a second transmit power and start transmitting on the activated channel with the second transmit power. Controller 2412 may select the second transmit power based on the estimated human exposure power from stage 2506, such as by selecting a second transmit power that will reduce the human exposure power to be below the exposure power threshold. Since controller 2412 could not use BWP fallback to switch to a BWP with narrower bandwidth and could only reduce the transmit power, this procedure may reduce the power spectral density of terminal device 2400's transmissions. Accordingly, this many reduce uplink sensitivity and cause coverage issues; however, terminal device 2400 may not have an alternative option because there may not be an available mechanism for terminal device 2400 to trigger BWP fallback to a BWP with narrower bandwidth.

In some aspects, controller 2412 may consider the default BWP's bandwidth size when deciding whether to trigger a channel switch in stage 2510. For example, in some cases the default BWP may have considerably smaller bandwidth than the activated BWP. As a result, switching to the default BWP may cause a significant drop in bandwidth, which may impair terminal device 2400's ability to continue transmitting data (e.g., without having to drop the throughput to an unacceptably low level). Accordingly, controller 2412 may decide in stage 2510 whether to trigger a channel switch based on how much narrower the default BWP's bandwidth is than the activated BWP's bandwidth. If the default BWP's bandwidth is too narrow (e.g., less than a predetermined percent of the activated BWP's bandwidth, such as 25%, 50%, 75%, or the like; less than a predetermined number of resource blocks; or less than a predetermined bandwidth), controller 2412 may decide not to trigger a channel switch, and may instead continue transmitting on the activated BWP with a reduced transmit power.

In some aspects, uplink and downlink communications may be locked to the same BWP. In other words, terminal device 2400 may be constrained to use the same BWP for both uplink and downlink (e.g., the network may configure terminal device 2400 to use the same BWP as the default uplink and downlink BWP, or may generally lock device 2400 to use the same BWP for uplink and downlink at all times). As a result, when terminal device 2400 performs BWP fallback to the default BWP for uplink, terminal device 2400 also has to switch its downlink reception to the default BWP. If the default BWP has narrower bandwidth, downlink throughput may drop, which may not be acceptable in certain scenarios (e.g., if terminal device 2400 is streaming heavy data). Accordingly, in these scenarios controller 2412 may consider whether the default BWP can support ongoing downlink reception (e.g., whether the default BWP can support a minimum throughput level used by the ongoing downlink connection) when it decides whether to trigger a channel switch. If the default BWP can support the downlink reception, controller 2412 may trigger the channel switch in stage 2510. Conversely, if the default BWP cannot support the downlink reception, controller 2412 may decide not to perform the channel switch in stage 2510. Furthermore, in some aspects controller 2412 may consider the potential downlink performance degradation versus the potential uplink performance degradation when deciding to perform a channel switch in stage 2510. For instance, when terminal device 2400 is locked to the same uplink and downlink BWP, there may be a downlink performance degradation if controller 2412 triggers BWP fallback: because the default BWP often has narrow (or the narrowest) bandwidth, the default BWP may have lower downlink throughput, deeper fading, and/or more channel interference. Conversely, there may be an uplink performance degradation if controller 2412 does not trigger BWP fallback: because terminal device 2400 will continue to transmit on the same bandwidth but need to reduce its transmit power, there will be lower uplink power spectral density and thus a higher uplink error rate. Controller 2412 may therefore consider the tradeoff between uplink and downlink performance degradation when deciding to trigger the BWP fallback. In some aspects, controller 2412 may estimate the potential downlink performance degradation from triggering BWP fallback (e.g., based on throughput, fading, and/or channel interference for the default BWP) and estimate the potential uplink performance degradation from not triggering BWP fallback (e.g., based on uplink error rate for the default BWP). Controller 2412 may then decide whether to trigger BWP fallback based on the potential downlink performance degradation and the potential uplink performance degradation.

With these aspects, terminal device 2400 may be able to mitigate human RF exposure by reducing its transmit power. Moreover, by triggering a channel switch to a channel with narrower bandwidth, terminal device 2400 may maintain uplink sensitivity (by maintaining, increasing, or only slightly reducing the uplink power spectral density) and may avoid uplink coverage issues.

Figure 27:
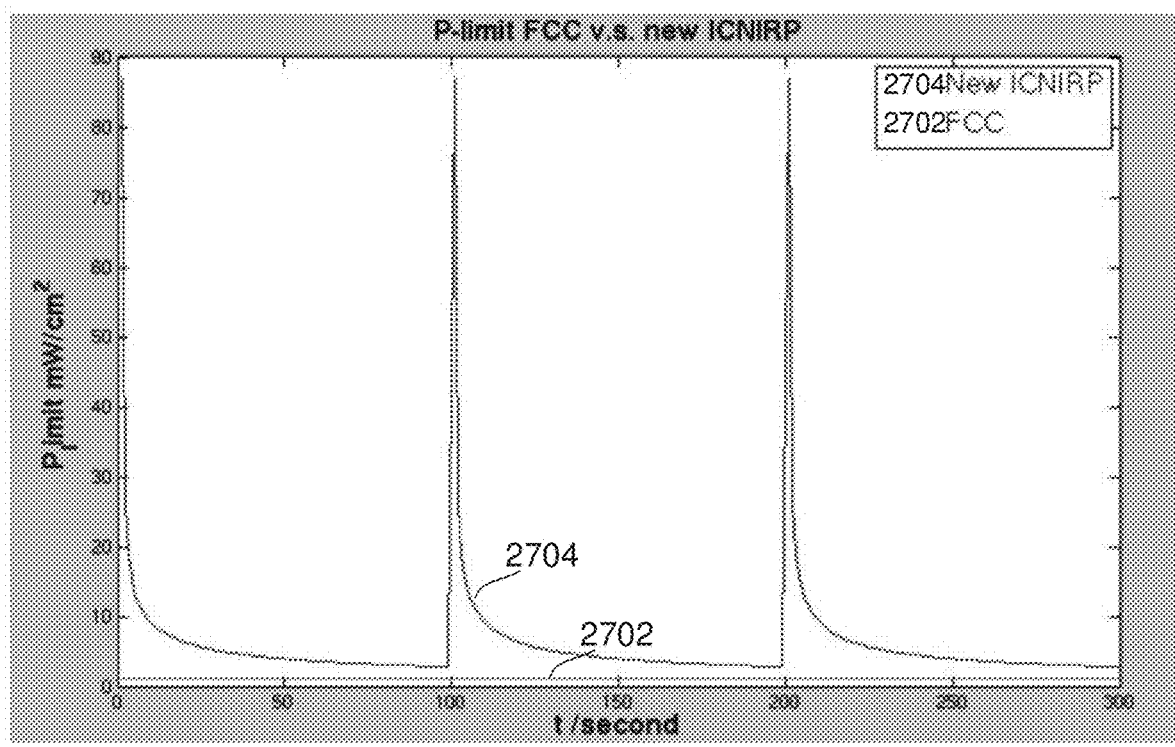
FIG. 27 shows an example of constant and time-dependent human exposure power limits according to some aspects.

In some aspects, controller 2412 may time the channel switch based on a time-dependent human exposure power limit. For example, the FCC regulates human RF exposure with a static human exposure power limit, meaning that the power limit is constant over time and that a terminal device should not exceed that limit at any point in time. By contrast, other regulatory bodies like the ICNIRP have also proposed new time-dependent human exposure power limits (e.g., the ICNIRP exposure category termed "brief exposure"). These time-dependent human exposure power limits allow for different human power exposure levels at different times. For example, a time-dependent exposure power limit may initially allow a high level of human exposure power that is increasingly restricted as a human is exposed to RF over a longer period of time. FIG. 27 shows an example of the human exposure power limits ("P-limit") proposed by the FCC and the ICNIRP. As shown in FIG. 27, the FCC may use a constant human exposure power limit 2702, which forbids terminal devices from causing human exposure power that exceeds a constant value at any time. The ICNIRP, by contrast, uses a time-dependent human exposure power limit 2704 that varies the permitted human exposure power over time. The ICNIRP's time-dependent human exposure power limit may initially permit a high level of human exposure power but may increasingly restrict the human exposer power as time passes. The time-dependent human exposure power limit in FIG. 27 is cyclical, meaning that a terminal device that initially causes a higher level of exposure may have to wait a cool-off period before causing high exposure levels again (e.g., until the cyclical time-dependent exposure power limit resets). In other words, the time-dependent human exposure power limit may only budget for a certain amount of exposure per cycle (e.g., over one second, or over another cycle duration), and a terminal device that uses up most of its budget will need to restrict its human exposure power until the cycle (and budget) reset. To generalize, the time-dependent human exposure power limit may specify a high human exposure power limit during a first time window and may specify a lower human exposure power limit during a second time window.

As introduced above, in some aspects controller 2412 may time the channel switch based on a time-dependent human exposure power limit. For example, the time-independent human exposure power limit may have certain time windows that permit high levels of human exposure power. Because terminal device 2400 is permitted to transmit at high power during these time windows, it may be disadvantageous to cause a channel switch that occurs around these high exposure power limit windows. Controller 2412 may therefore trigger channel switches so they occur around low exposure power limit windows.

Figure 28:
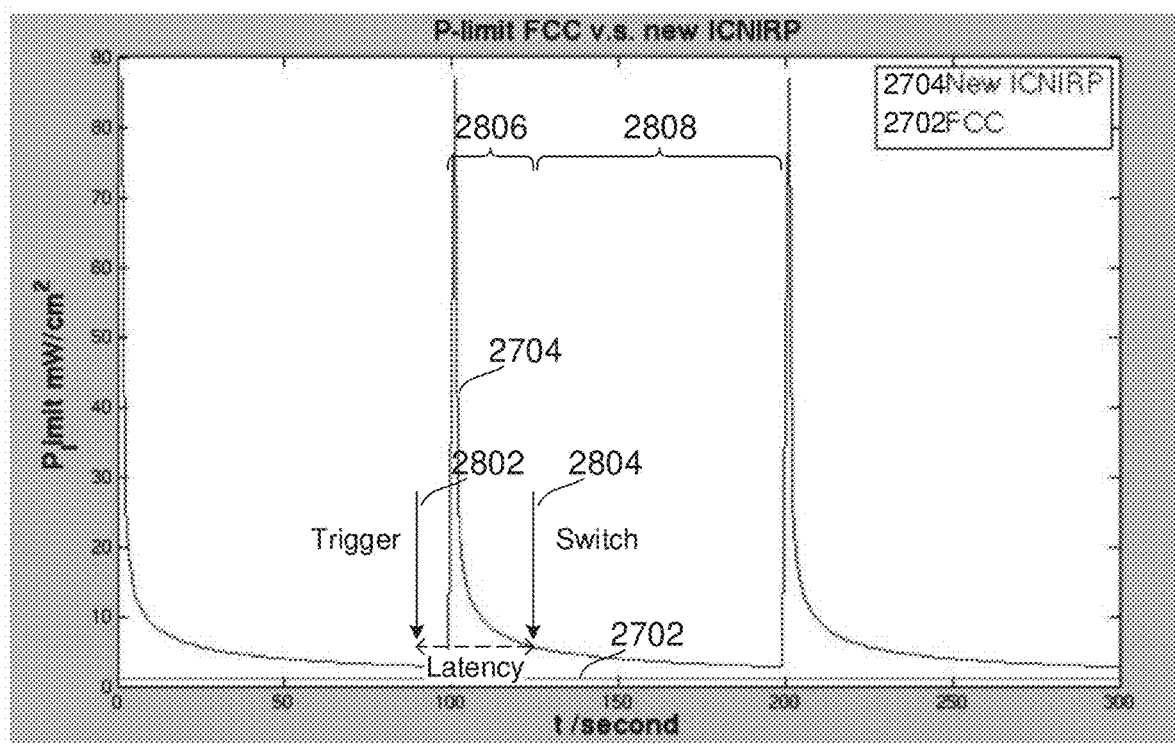
FIG. 28 shows an exemplary timing diagram for triggering channel switches according to some aspects.
Figure 29:
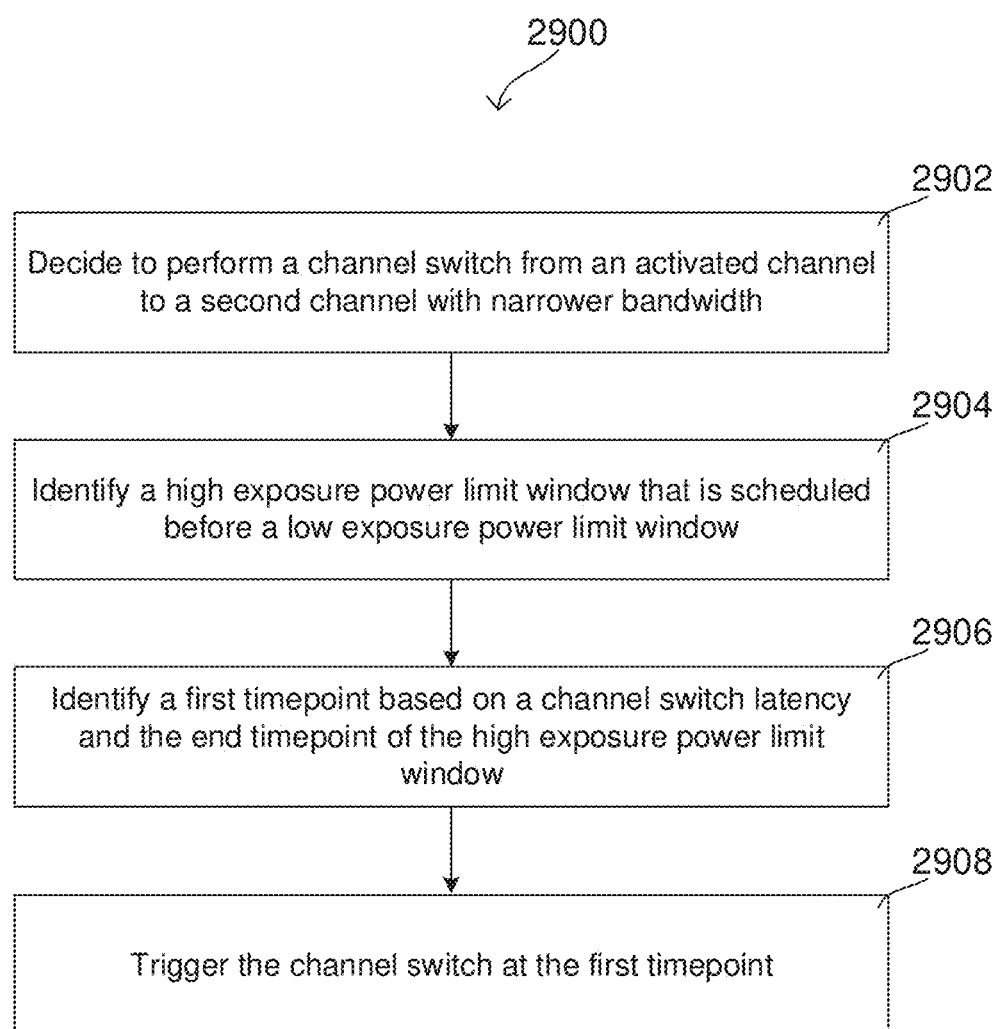
FIG. 29 shows an exemplary flow chart for timing channel switches based on a time-dependent human exposure power limit according to some aspects.

FIG. 28 shows an example of how controller 2412 of terminal device 2400 may trigger channel switches based on a time-dependent human power exposure limit. FIG. 28 includes the same human exposure power limits 2702 and 2704 of FIG. 27, where human exposure power limit 2702 is constant and where human exposure power limit 2704 is time-dependent. As introduced immediately above, controller 2412 may trigger channel switches so they occur after high exposure power limit windows and around low exposure power limit windows. FIG. 29 shows an exemplary flow chart illustrating that process according to some aspects. As shown in FIG. 29, controller 2412 may first decide to perform a channel switch from an activated channel (e.g., an activated BWP) to a second channel with narrower bandwidth (e.g., the default BWP) in stage 2902. In one example, controller 2412 may make this decision in stage 2510 of FIG. 25, where controller 2412 decides to trigger a channel switch based on the estimated human exposure power being greater than the exposure power threshold. Then, after deciding to perform a channel switch in stage 2902, controller 2412 may identify a high exposure power limit window that is scheduled before a low exposure power limit window in stage 2904. Using time-dependent power limit 2704 as an example, controller 2412 may identify high exposure power limit window 2806 and low exposure power limit window 2808. High exposure power limit window 2806 may be positioned around a section of time-dependent exposure power limit 2704 that is high (allowing a higher level of human exposure power) while low exposure power limit window 2808 may be positioned around a section of time-dependent exposure power limit 2704 that is low (restricting the human exposure power to lower levels). The curve of time-dependent exposure power limit 2704 is exemplary and, to generalize, controller 2412 may identify the high exposure power limit window as any section of a time-dependent exposure power limit that is considerably higher than a subsequent section of the time-dependent exposure power limit. In some aspects, the high exposure power limit window may be immediately before the low exposure power limit window.

After identifying the high and low exposure power limit windows, controller 2412 may in stage 2906 identify a first timepoint based on a channel switch latency and the end timepoint of the high exposure power limit window. As to the channel switch latency, controller 2412 may know in advance approximately how long it takes between when controller 2412 triggers a channel switch and when the channel switch actually occurs. For example, controller 2412 may transmit control signaling to the network access node that triggers the channel switch at a first time, and the channel switch may actually take place at a later time; in other words, the network access node may start sending uplink grants for the second channel to terminal device 2400 after some delay has occurred. In a BWP fallback example, controller 2412 may control digital transmitter 2410 to transmit a random access transmission on the default BWP at a first time, and the network access node may send PUSCH grants to terminal device 2400 that permit terminal device 2400 to start transmitting on the default BWP at a second later time. That difference between the first time (when the channel switch is triggered) and the second time (when the channel switch takes effect) is the channel switch latency.

Because high exposure power limit window 2806 allows terminal device 2400 to transmit at high power without violating the exposure limits, it may be advantageous for terminal device 2400 to trigger the channel switch so it takes effect after most of high exposure power limit window 2806 is over (e.g., right before or around when low exposure power limit window 2808 starts). Accordingly, controller 2412 may identify the first timepoint so the channel switch takes effect after most of high exposure power limit window 2806 is over (or, e.g., at or after low exposure power limit window 2808 starts). Controller 2412 may therefore identify the first timepoint based on the endpoint of high exposure power limit window 2806. In some aspects, controller 2412 may identify the first timepoint by identifying a second timepoint, such as timepoint 2804 in FIG. 28, when controller 2412 wants the channel switch to occur. The second timepoint may be after most of high exposure power limit window 2806 is over, at or after low exposure power limit window 2808 starts, or around the endpoint of high exposure power limit window 2806. Controller 2412 may then subtract the channel switch latency from the second timepoint to obtain the first timepoint (e.g., where the first timepoint is separated from the second timepoint by the channel switch latency).

After identifying the first timepoint in stage 2906, controller 2412 may trigger the channel switch at the first timepoint in stage 2908. In a general example, controller 2412 may send to the network access node at the first timepoint control signaling that triggers the channel switch; in a BWP example, controller 2412 may send to the gNodeB at the first timepoint a PRACH transmission that triggers BWP fallback. Due to the channel switch latency, the channel switch may then occur at or around the second timepoint (as the channel switch latency may be approximate or unpredictable). In the example of FIG. 28, the channel switch may take effect at timepoint 2804, which is slightly before low exposure power limit window 2808 starts. Controller 2412 may then start transmitting on the second channel (with narrower bandwidth than the activated channel), and may reduce the first transmit power to a second transmit power (e.g., with lower throughput).

With this procedure, terminal device 2400 may transmit at high power during high exposure power limit window 2806, and may therefore not violate the time-dependent exposure power limit 2704. Once the time-dependent exposure power limit 2704 transmissions to the stricter low exposure power limit window 2808, terminal device 2400 may have its transmit power restricted to a significantly lower level. To avoid violating the stricter exposure power limit, terminal device 2400 may trigger the channel switch in advance so terminal device 2400 can switch to a narrower bandwidth channel around when low exposure power limit window 2808 starts. This may be preferable to case where terminal device 2400 does not consider the time-dependent exposure power limit when triggering channel switches. For example, if terminal device 2400 were to not consider the time-dependent exposure power limit when triggering channel switches, terminal device 2400 could inadvertently trigger a channel switch that takes effect right before or during the beginning of high exposure power limit 2806. Even though terminal device 2400 could be transmitting at higher power on larger bandwidth had it not switched channels, it would end up switching to a narrower bandwidth channel and reducing its power. With this procedure terminal device 2400 can avoid that scenario.

Figure 30:
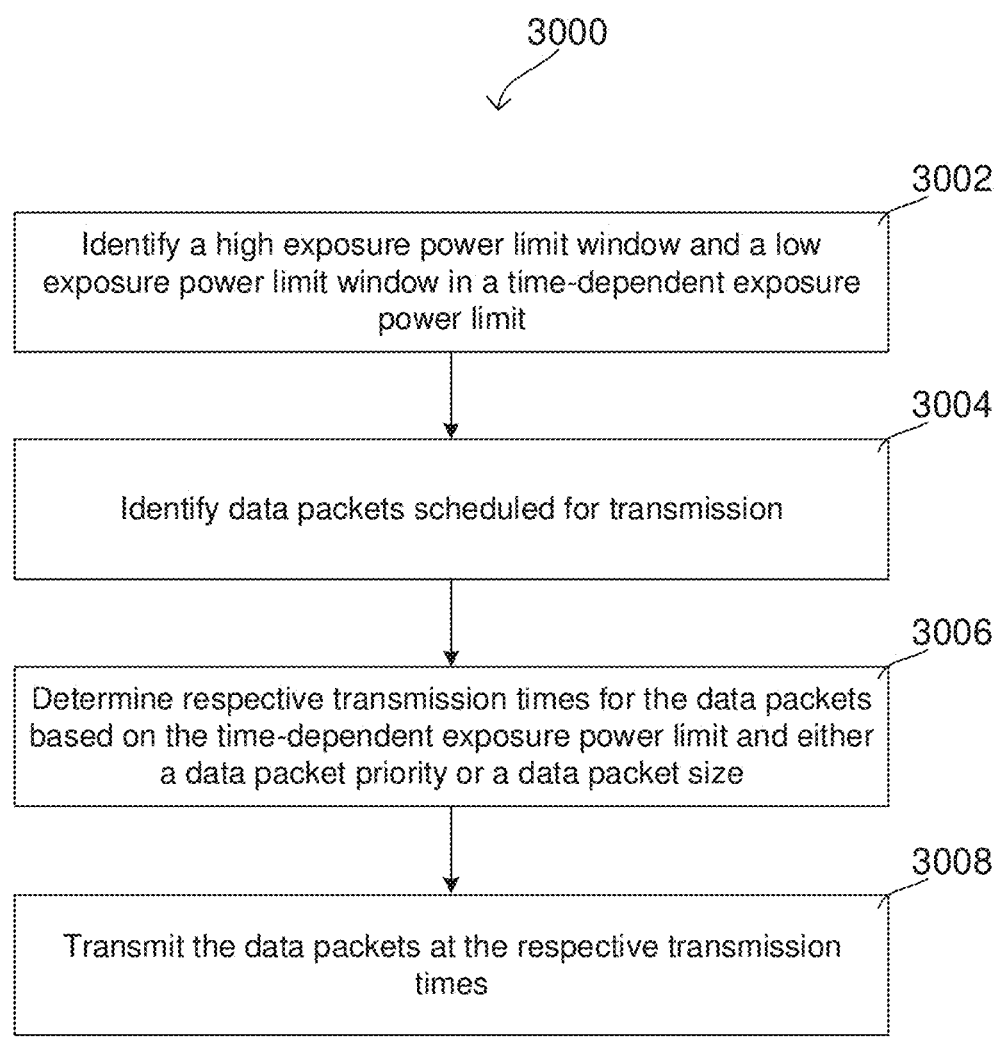
FIG. 30 shows an exemplary flow chart for scheduling data transmission based on a time-dependent power limit according to some aspects.

In some aspects, controller 2412 may schedule data transmission based on time-dependent power limits like those described above for ICNRIP. FIG. 30 shows exemplary flow chart 3000 illustrating that procedure according to some aspects. As shown in FIG. 30, controller 2412 may first identify a high exposure power limit window and a low exposure power limit window in a time-dependent exposure power limit in stage 3002. Using the example of FIG. 28, controller 2412 may identify high exposure power limit window 2806 and low exposure power limit window 2808 in time-dependent exposure power limit 2704. To generalize, controller 2412 may identify, as the high exposure power limit window, a window in time-dependent exposure power limit 2704 that has higher power than other windows of time-dependent exposure power limit 2704. Controller 2412 may then identify, as the low exposure power limit window, a window in time-dependent exposure power limit 2704 that has lower power than the high exposure power limit window.

Controller 2412 may then identify data packets that are scheduled for transmission in stage 3004. For example, controller 2412 may perform scheduling operations for terminal device 2400, such as by executing a MAC layer scheduler program. Controller 2412 may therefore control when digital transmitter 2410 transmits data packets via RF transceiver 2404. In some aspects, controller 2412 may have a buffer of data packets scheduled for transmission, and may identify these data packets in stage 3004.

Controller 2412 may then in stage 3006 determine transmission times for the data packets based on the time-dependent exposure power limit and either a data packet priority or a data packet size. In an example using data packet priority, controller 2412 may identify a first data packet and a second data packet that has a lower priority than the first data packet. For example, the first data packet may have a first QoS requirement and the second data packet may have a first QoS requirement that has a lower priority than the first QoS requirement. In some aspects, the QoS requirements may be QoS requirements from a cellular standard or an IP standard and may be assigned to the data packets by higher communication layers (e.g., IP or transport layers). Controller 2412 may then assign to the first data packet a transmission time that is in the high exposure power limit window and may assign to the second data packet a transmission time that is in the low exposure power limit window. In other words, controller 2412 may assign the higher-priority data packet to the high exposure power limit window and the lower-priority data packet to the low exposure power limit window. This means that, when terminal device 2400 transmits the first and second data packets, the first data packet will likely have a higher transmit power than the second data packet (e.g., the uplink transmit power will be larger, and will have a larger power margin during the high exposure power limit window). This may be advantageous because the first data packet has higher priority and can be transmitted with higher transmit power, increasing the probability that the network access node will successfully receive and decode it. Accordingly, terminal device 2400 may use data packet priority to schedule data packets for transmission so that data packets with higher priorities are scheduled for and transmitted during high exposure power limit windows of the time-dependent exposure power limit.

Controller 2412 may use a similar technique to schedule transmission times for data packets based on data packet size. In one example, controller 2412 may identify a first data packet and a second data packet that has a smaller packet size than the first data packet. For example, the first data packet may have a first packet size (e.g., in bytes) and the second data packet may have a second packet size that is smaller than the first packet size. Controller 2412 may then assign to the first data packet a transmission time that is in the high exposure power limit window and may assign to the second data packet a transmission time that is in the low exposure power limit window. In other words, controller 2412 may assign the larger data packet to the high exposure power limit window and the smaller data packet to the low exposure power limit window. As a result, when terminal device 2400 transmits the first and second data packets, the first data packet will likely have a higher transmit power than the second data packet. This may be advantageous because the first data packet has larger size and can be transmitted with higher transmit power, increasing the probability that the network access node will successfully receive and decode it. Accordingly, terminal device 2400 may use data packet size to schedule data packets for transmission so that data packets with larger sizes are scheduled for and transmitted during high exposure power limit windows of the time-dependent exposure power limit.

Controller 2412 may thus assign respective transmission times to the data packets in stage 3006. Controller 2412 may then transmit the data packets at the respective transmission times in stage 3008. For example, controller 2412 may provide the data packets to digital transmitter 2410 and control digital transmitter 2410 to transmit each data packet at its respective transmission time. Digital transmitter 2410 may then transmit the data packets via RF transceiver 2404.

Figure 31:
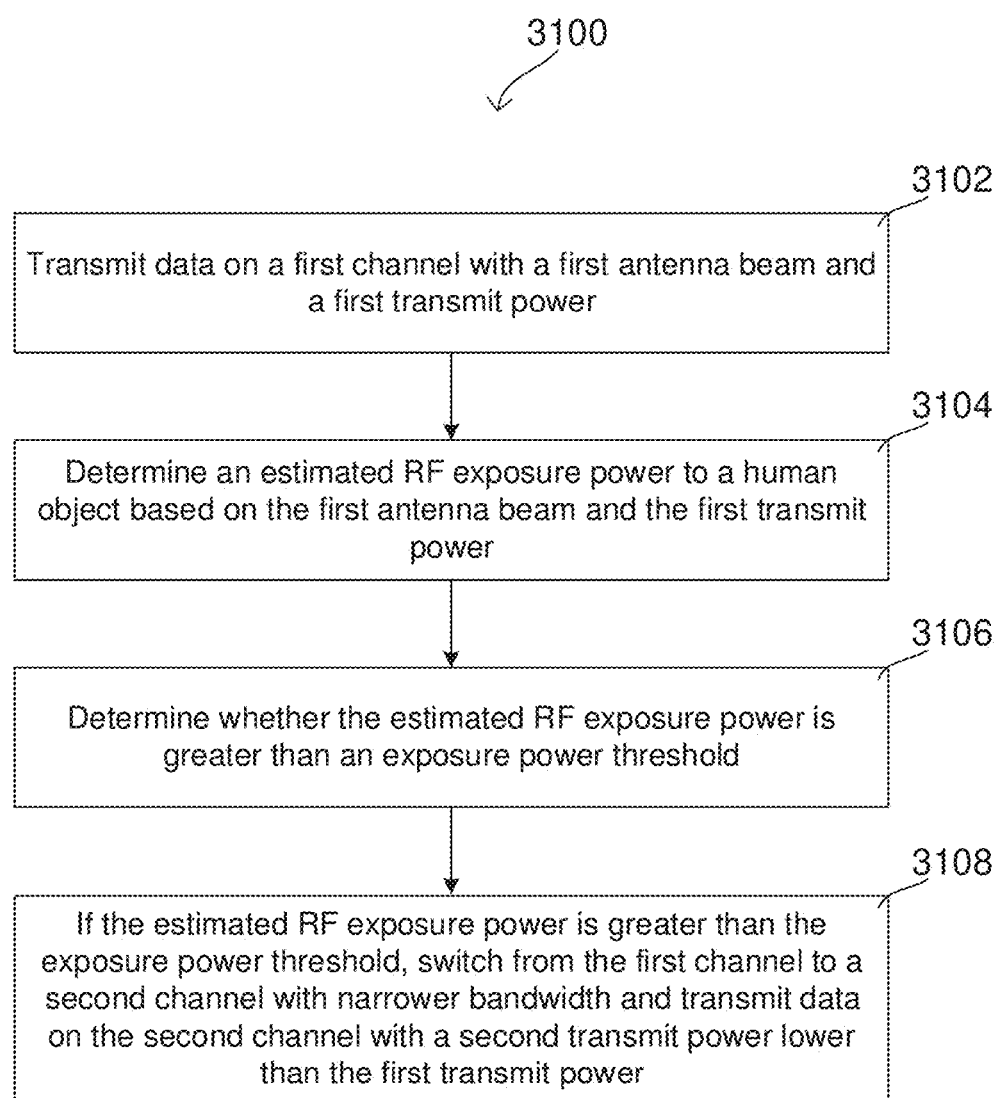
FIGS. 31 and 32 show exemplary methods of performing radio communications according to some aspects.

FIG. 31 shows exemplary method 3100 of performing radio communications according to some aspects. As shown in FIG. 31, method 3100 includes transmitting data on a first channel with a first antenna beam and a first transmit power (stage 3102), determining an estimated radio frequency (RF) exposure power to a human object based on the first antenna beam and the first transmit power (stage 3104), determining whether the estimated RF exposure power is greater than an exposure power threshold (stage 3106), and if the estimated RF exposure power is greater than the exposure power threshold, switching from the first channel to a second channel with narrower bandwidth and transmitting data on the second channel with a second transmit power lower than the first transmit power (stage 3108).

Figure 32:
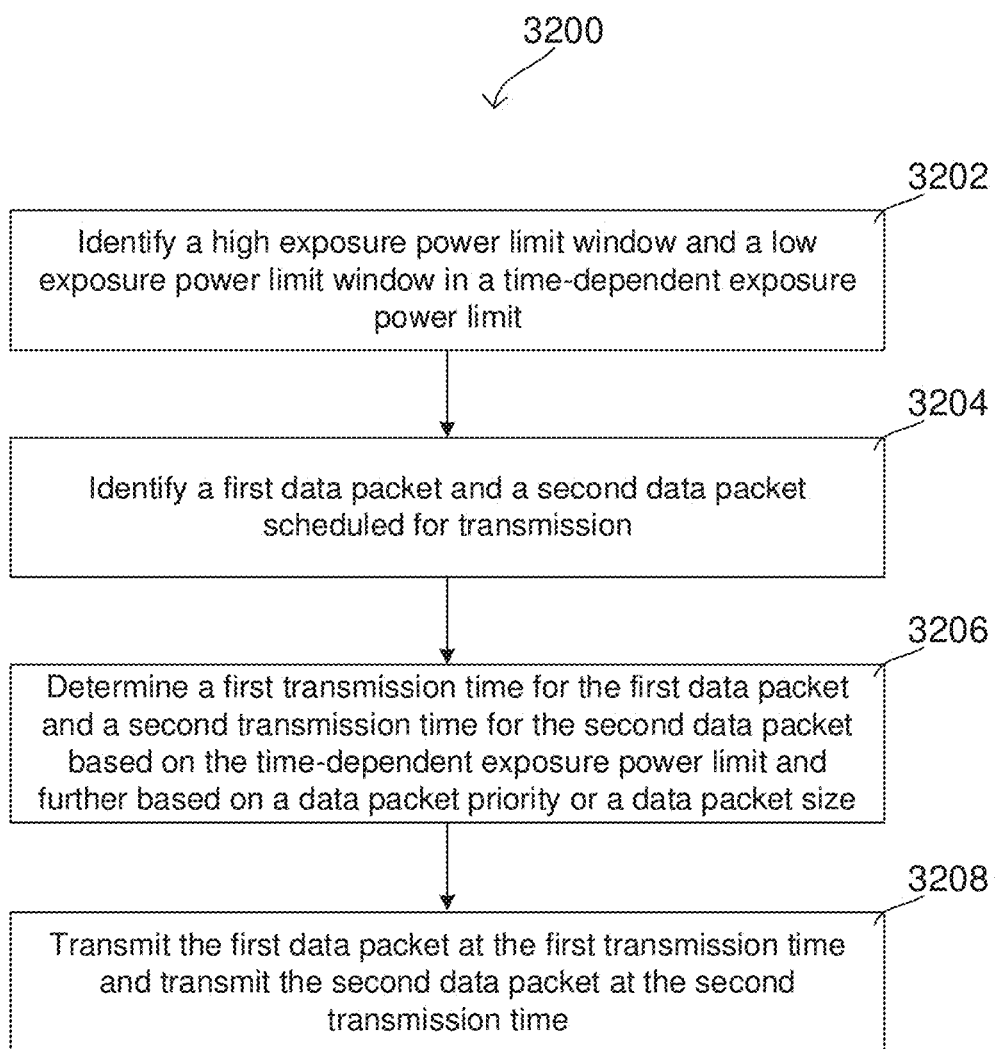

FIG. 32 shows exemplary method 3200 of performing radio communications according to some aspects. As shown in FIG. 32, method 3200 includes identifying a high exposure power limit window and a low exposure power limit window in a time-dependent exposure power limit (stage 3202), identifying a first data packet and a second data packet scheduled for transmission (stage 3204), determining a first transmission time for the first data packet and a second transmission time for the second data packet based on the time-dependent exposure power limit and further based on a data packet priority or a data packet size (stage 3206), and transmitting the first data packet at the first transmission time and transmitting the second data packet at the second transmission time (stage 3208).

As introduced above, radio access technologies such as WiGiG and 5G NR mmWave use beamforming to compensate for the higher pathloss at high frequency carriers. This beamforming can help achieve the required link SNR to establish and maintain radio links. Many mmWave systems plan to implement this beamforming with large antenna arrays, with some systems even targeting arrays with hundreds of elements. Due to the large number of radiating elements, these antenna arrays may have very high spatial coverage and directional resolution.

When devices use beamforming, they may execute a beam selection procedure to select a desired beam. Some beamforming systems, such WiGig and 5G NR mmWave, use beamsweeping to select the best directional antenna beam, or "sector," for a wireless link. In some cases, a network access node and a terminal device may perform a broad sweep (e.g., a sector level sweep (SLS)), such as where a network access node sends out a signal and a terminal device performs a measurement with each sector of its antenna array (e.g., tunes its antenna array to receive a directional antenna beam that defines the sector). Based on those measurements, the terminal device can identify the sector that provides the best signal quality (e.g., link quality). The terminal device can then configure its antenna array to receive with this selected sector. In various cases, the terminal device and network access node may reverse this procedure to identify a receive sector for the network access node to use, or may sweep in the transmit direction to identify optimal transmit sectors. In some cases, such as WiGig's beam refinement protocol (BRP), the network access node and terminal device can further evaluate the selected sector to select optimal parameters for that sector (e.g., to narrow or adapt the directional antenna beam in that sector to further improve link quality).

However, the massive antenna arrays used in some mmWave systems may make these beamsweeping procedures complex and time-consuming. For example, when the number of antennas and directional resolution (e.g., number of available sectors) is large, a brute-force search that examines each possible sector can take a significant amount of time. Since the terminal device performs measurements on each sector, the terminal device may also expend considerable battery power while performing the beamsweeping search. Moreover, because the terminal device will not know the best sector until the beamsweeping is finished, the system can suffer from performance degradation, or even link loss, while the beamsweeping procedure is pending. Furthermore, the beamsweeping procedures share the wireless medium with the actual data link, which means that long beamsweeping procedures can cut into time that could otherwise be used to transfer data.

For these reasons, it can be beneficial to minimize beamsweeping time and to reduce the power expended by terminal devices during beamsweeping. Accordingly, in some aspects of this disclosure a terminal device may use object sensing to identify sectors that are blocked by objects or human bodies. The terminal device may then skip these sectors during the beamsweeping. Some aspects may also use the object sensing to identify which sectors may be sensitive to retransmit power restrictions due to the presence of human bodies. For example, a terminal device may detect a human object in a given sector and then consider how much it would need to reduce its transmit power in that sector in order to comply with maximum human exposure power limits. Some aspects may also implement the sensor using the actual antenna array, such as a mmWave radar sensor that uses the same antenna array for object sensing and wireless communication.

Figure 33:
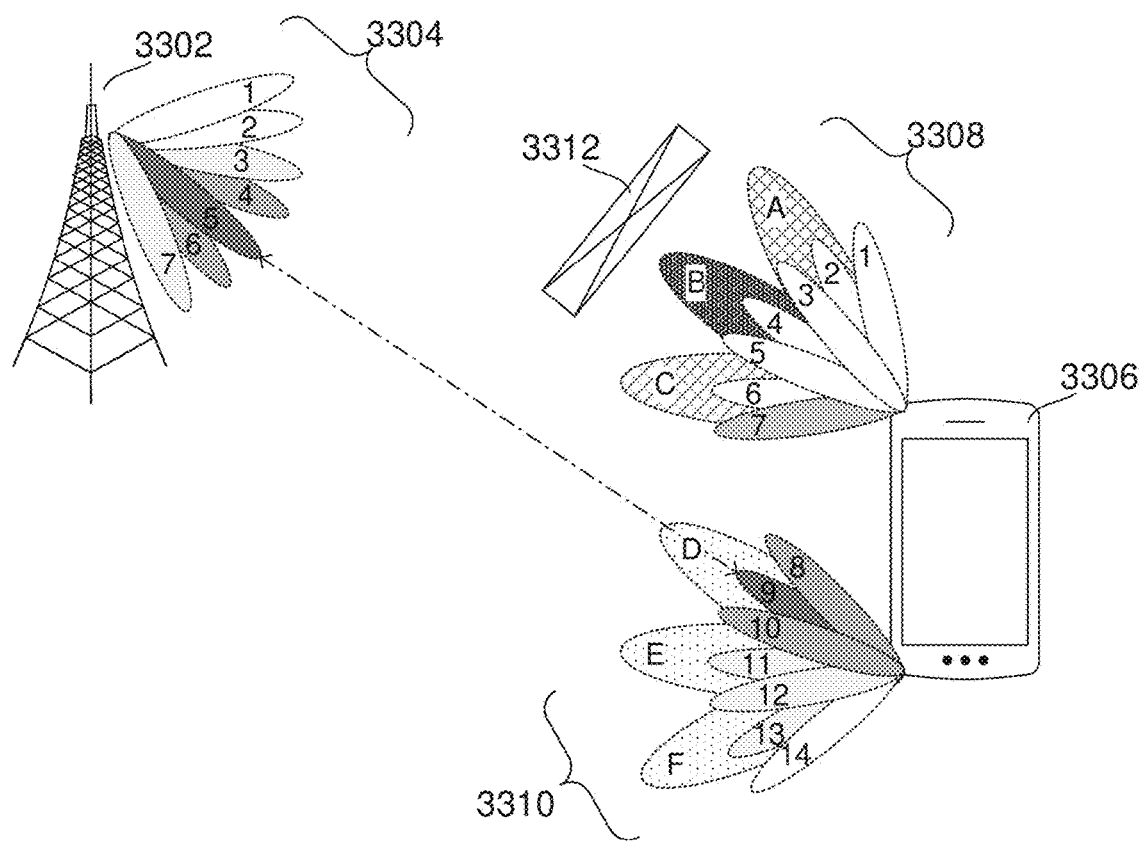
FIG. 33 shows an example of a terminal device selecting sectors for beamsweeping based on object sensing according to some aspects.

FIG. 33 shows an example according to some aspects that illustrates how a terminal device can reduce the beamsweeping time or power penalty based on object sensing. As shown in FIG. 33, terminal device 3306 may be connected with (or in the process of establishing a connection to) network access node 3302. Network access node 3302 and terminal device 3306 may be configured to use beamforming to transmit and receive signals with each other. Accordingly, network access node 3302 may include antenna array 3304 and may use antenna array 3304 to steer a directional antenna beam towards terminal device 3308; in other words, network access node 3302 may steer the directional antenna beam of antenna array 3304 in a certain sector that points to terminal device 3306. Similarly, terminal device 3306 may include antenna arrays 3308 and 3310, which may be positioned on different locations of terminal device 3306 (e.g., on a top side of and a bottom side of the handset). While terminal device 3306 has two antenna arrays in this example, in other examples terminal device 3306 may have only one antenna array, or may have more than two antenna arrays. Terminal device 3306 may operate its antenna arrays similar to network access node 3302. For example, terminal device 3306 may select one of antenna arrays 3308 or 3310 and steer its directional beam in a certain sector toward network access node 3302.

As previously introduced, beamforming systems often use beamsweeping techniques to select the sectors for directional antenna steering. In an example of brute-force beamsweeping, network access node 3302 and terminal device 3306 may control their respective antenna arrays to test out each sector. By evaluating each sector, network access node 3302 and terminal device 3306 may identify sectors to use for transmission and reception. For example, network access node 3302 may select a sector of antenna array 3304 while terminal device 3306 may select a sector of either antenna array 3308 or antenna array 3310 (e.g., whichever provides the overall best sector).

Testing out each possible sector pair, however, may take a considerable duration of time. While the example in FIG. 33 only shows seven sectors per antenna array, advanced antenna arrays may have extremely high directional resolution and may support hundreds of sectors. Accordingly, in some aspects terminal device 3306 may use object sensing to reduce the beamsweeping time or power penalty. As shown in FIG. 33, there may be an object that blocks certain paths between terminal device 3306 and network access node 3306. Because this object attenuates radio signals along these blocked paths, it is unlikely that the beamsweeping procedure will select a sector that points toward any of the blocked paths. In turn, there may be little benefit in analyzing those sectors during beamsweeping. Terminal device 3306 can therefore reduce the beamsweeping time or power penalty by avoiding or skipping testing of those sectors during beamsweeping. Using the example of FIG. 33, terminal device 3306 may use its sensor and determine that sensor direction B is blocked by object 3312. Terminal device 3306 may then determine that sectors 4 and 5 of antenna array 3308 overlap with sensor direction B but that the other sectors of antenna array 3308, as well as the sectors of antenna array 3310, are not blocked.

Terminal device 3306 may therefore test these unblocked sectors during beamsweeping but may not test blocked sectors 4 and 5. This may save time and/or battery power. As shown in FIG. 33, network access node 3302 may select sector 5 of antenna array 3304 as providing the highest link quality (denoted by the degree of shading), and terminal device 3306 may select sector 9 of antenna array 3310. After finishing the beamsweeping and any further beam refinement, network access node 3302 and terminal device 3306 may transmit and receive to each other using the selected sector pair. These techniques are described below in full.

Figure 34:
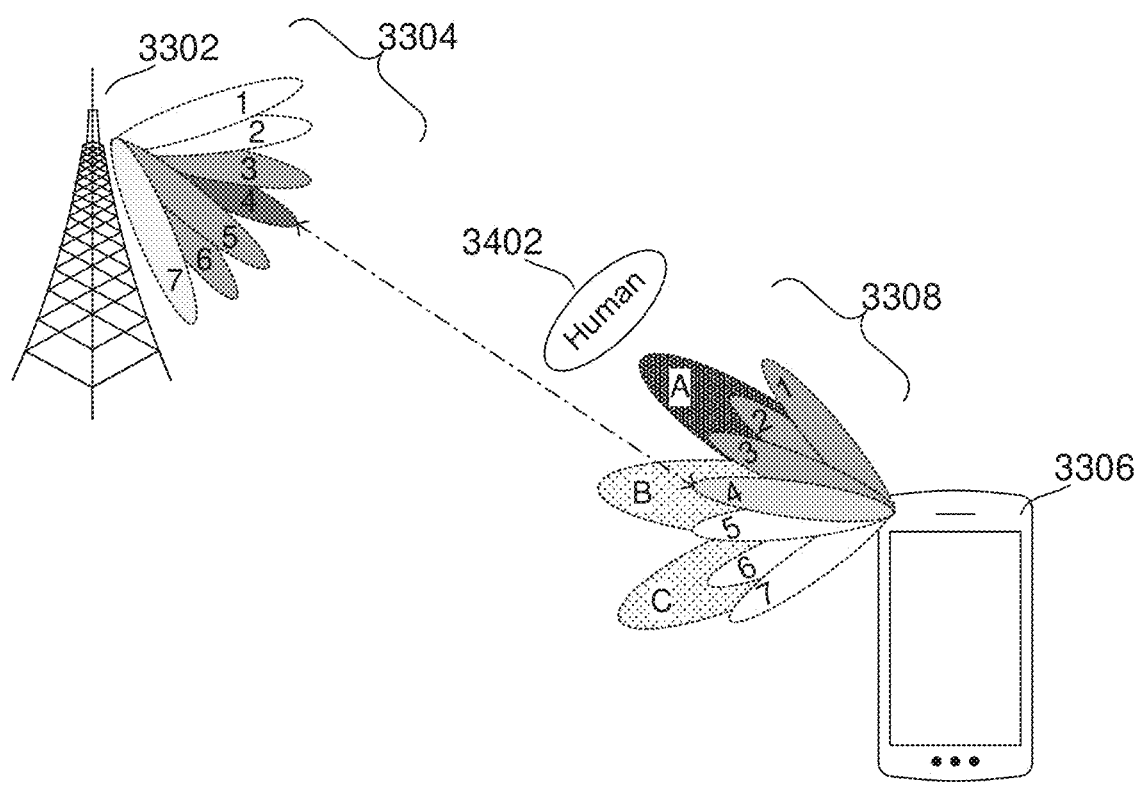
FIG. 34 shows an example of a terminal device selecting sectors for beamsweeping based on detecting a human object according to some aspects.

Some aspects may also consider whether a blocking object is a human object (e.g., part or whole of a human body). FIG. 34 shows an example according to some aspects. In this example, terminal device 3306 may include a sensor configured to detect objects and to distinguish between human and non-human objects. As shown in FIG. 34, the sensor of terminal device 3306 may detect object 3402 in sensor direction A and may determine that object 3402 is a human object. Because sectors 1-3 of antenna array 3308 overlap directionally with sensor direction A, terminal device 3306 may to reduce its transmit power in these directions so its transmissions comply with human exposure power restrictions (e.g., MPE and SAR). Accordingly, even if terminal device 3306e determines during beamsweeping that sectors 1-3 have the highest link quality with network access node 3302, sectors 1-3 may be subject to transmit power restrictions and terminal device 3306 may select another sector. Using the example of FIG. 34, terminal device 3306 may determine that sectors 1-3 have the highest link quality but are blocked by human object 3402 while sector 4 has lower link quality but is not blocked by a human object. Because sectors 1-3 may be subject with transmit power restrictions, terminal device 3306 may select sector 4 to use with network access node 3302. In some aspects, terminal device 3306 may be configured to weight, or prioritize, certain sectors based on whether they are blocked by a human object. This is further described in the examples below.

Figure 35:
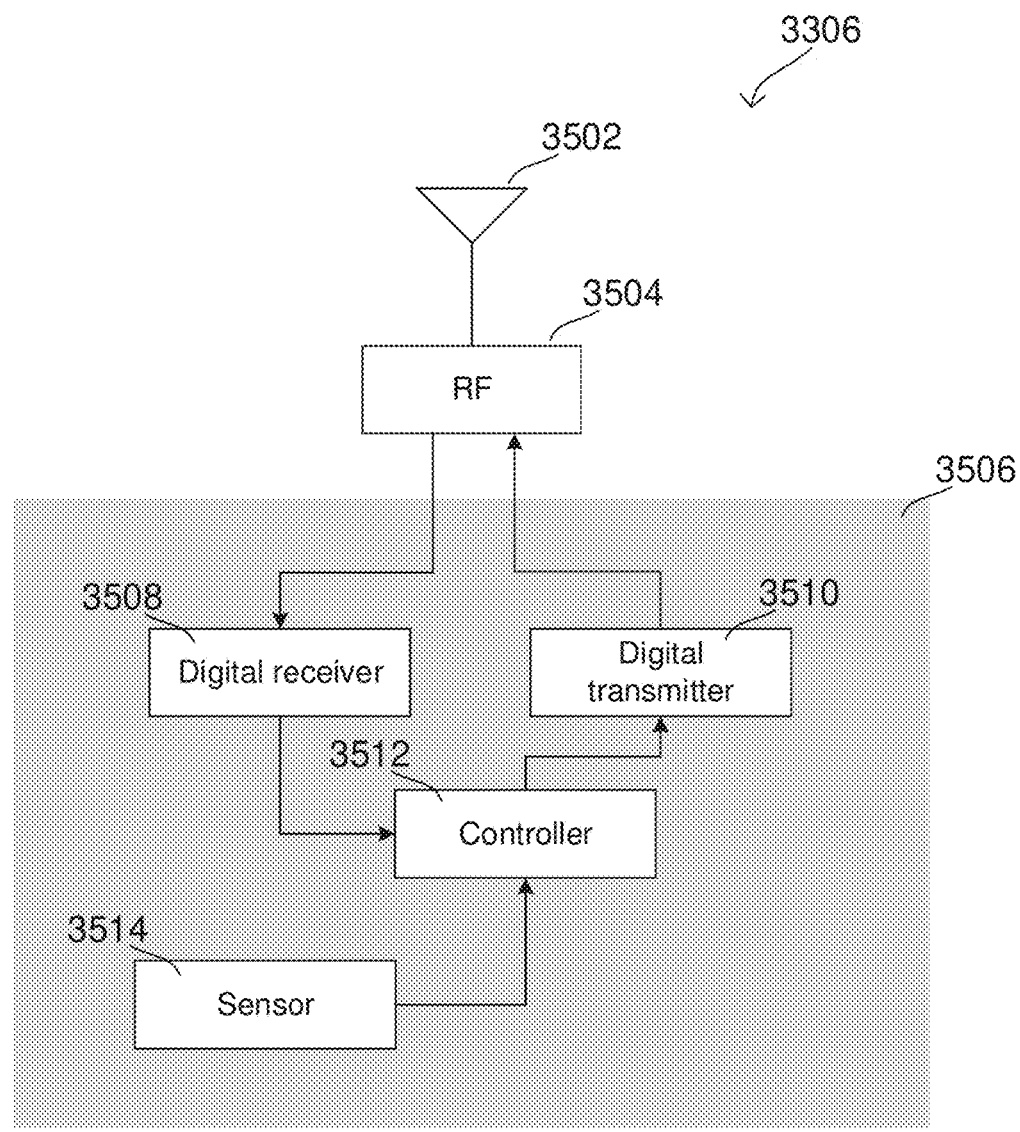
FIG. 35 shows an exemplary internal configuration of a terminal device according to some aspects.
Figure 36:
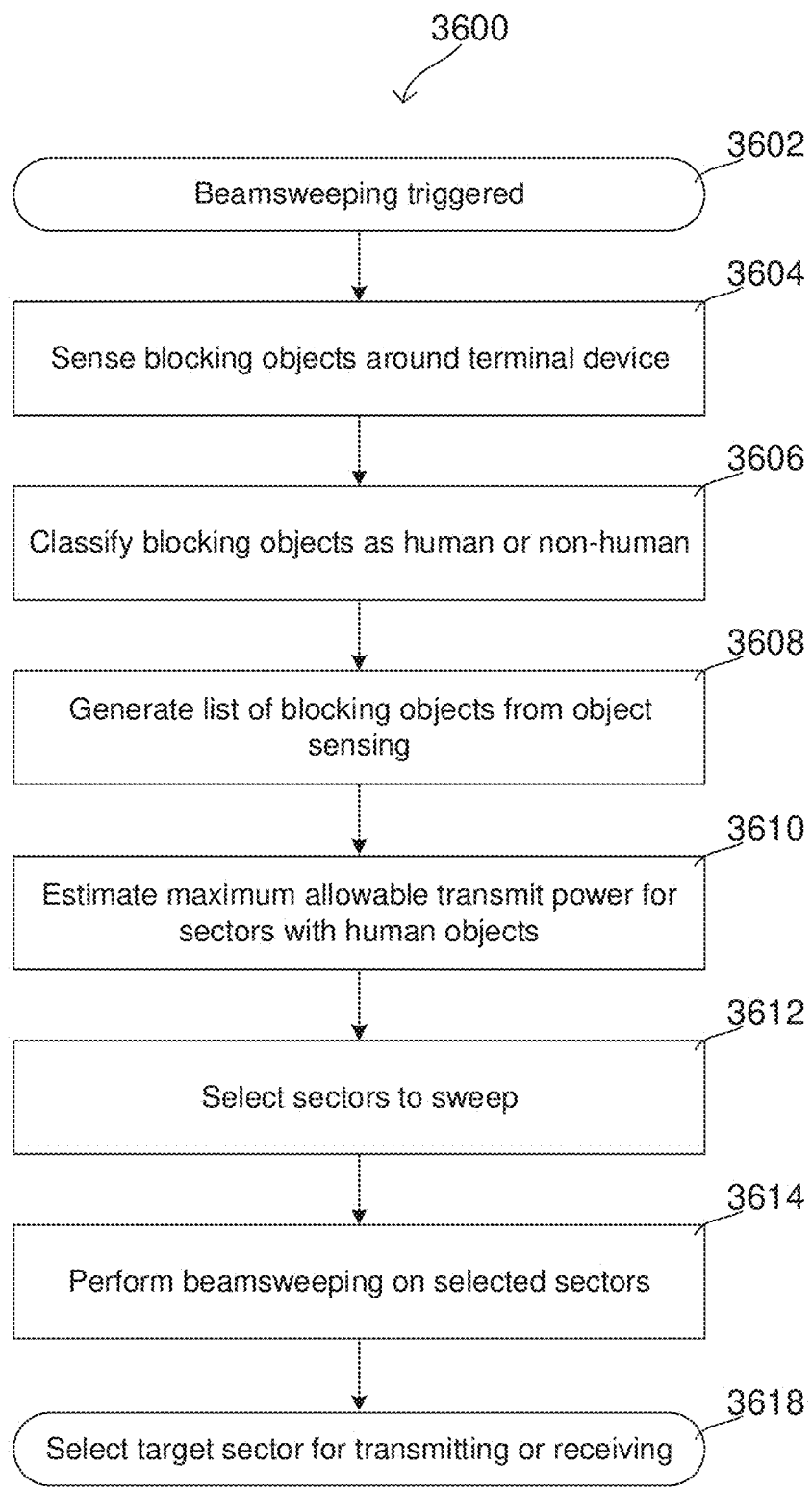
FIG. 36 shows an exemplary flowchart for selecting sectors to beamsweep based on object sensing according to some aspects.

This disclosure now describes these beamsweeping aspects in detail. FIG. 35 shows an exemplary internal configuration of terminal device 3306 according to some aspects and FIG. 36 shows an exemplary flow chart 3600 that terminal device 3306 may execute. Starting with FIG. 35, the depicted configuration is focused on the beamsweeping control features of terminal device 3306 and may not expressly depict other components that are less relevant to these features. As FIG. 35 shows, terminal device 3306 may include antenna system 3502, RF transceiver 3504, and baseband modem 3506. Terminal device 3306 may transmit and receive radio signals on one or more radio access networks. Baseband modem 3506 may direct such communication functionality of terminal device 3306 according to the communication protocols for with each radio access network, and may control antenna system 3502 and RF transceiver 3504 to transmit and receive radio signals according to the formatting and scheduling parameters defined by each communication protocol. Although some designs may include separate communication components for each supported radio communication technology (e.g., a separate antenna, RF transceiver, digital signal processor, and controller), for purposes of conciseness the configuration of terminal device 3306 shown in FIG. 35 depicts only a single instance of these components.

Terminal device 3306 may transmit and receive wireless signals with antenna system 3502, which may be a single antenna or an antenna array that includes multiple antennas. In some aspects, antenna system 3502 may include multiple antenna arrays, such as is shown in FIG. 33 for antenna arrays 3308 and 3310. In some aspects, antenna system 3502 may additionally include analog antenna combination and/or beamforming circuitry (e.g., a set of phase shifters for phased-array beamforming). In the receive (RX) path, RF transceiver 3504 may receive analog radio frequency signals from antenna system 3502 and perform analog and digital RF front-end processing on the analog radio frequency signals to produce digital baseband samples (e.g., In-Phase/Quadrature (IQ) samples) to provide to baseband modem 3506. RF transceiver 3504 may include analog and digital reception components including amplifiers (e.g., Low Noise Amplifiers (LNAs)), filters, RF demodulators (e.g., RF IQ demodulators)), and analog-to-digital converters (ADCs), which RF transceiver 3504 may utilize to convert the received radio frequency signals to digital baseband samples. In the transmit (TX) path, RF transceiver 3504 may receive digital baseband samples from baseband modem 3506 and perform analog and digital RF front-end processing on the digital baseband samples to produce analog radio frequency signals to provide to antenna system 3502 for wireless transmission. RF transceiver 3504 may thus include analog and digital transmission components including amplifiers (e.g., Power Amplifiers (PAs), filters, RF modulators (e.g., RF IQ modulators), and digital-to-analog converters (DACs), which RF transceiver 3504 may utilize to mix the digital baseband samples received from baseband modem 3506 and produce the analog radio frequency signals for wireless transmission by antenna system 3502. In some aspects baseband modem 3506 may control the radio transmission and reception of RF transceiver 3504, including specifying the transmit and receive radio frequencies for operation of RF transceiver 3504.

FIG. 35 also depicts several internal components of baseband modem 3506, including digital receiver 3508, digital transmitter 3510, controller 3512, and sensor 3514. In some aspects, baseband modem 3506 may include a digital signal processor and a protocol controller (e.g., such as in FIG. 2). Digital receiver 3508, digital transmitter 3510, and controller 3512 may therefore be subcomponents of the digital signal processor (e.g., physical layer components) and/or subcomponents of the protocol controller (e.g., protocol stack components). In some aspects, digital receiver 3508 may be the physical layer receive chain, digital transmitter 3510 may be the physical layer transmit chain, and controller 3512 may be the protocol controller that executes the protocol stack of baseband modem 3506. For example, digital receiver 3508 may include a demodulator, demapper (e.g., constellation demapper), de-interleaver, decoder, and/or descrambler. Digital receiver 3508 may receive wireless signals in the form of baseband samples via antenna system 3502 and RF transceiver 3504. Digital receiver 3508 may then sequentially process these baseband samples with the demodulator, demapper (e.g., constellation demapper), de-interleaver, decoder, and/or descrambler to produce a bitstream, which digital receiver 3508 may provide to controller 3512 (e.g., to protocol stack layers of controller 3512). Digital transmitter 3510 may include a scrambler, encoder, interleaver, mapper (e.g., constellation mapper), and/or a modulator, which may sequentially process a bitstream (e.g., provided by protocol stack layers of controller 3512) to produce baseband samples (e.g., complex IQ symbols). Digital transmitter 3510 may then transmit these baseband samples as wireless signals via RF transceiver 3504 and antenna system 3502. Controller 3512 may include one or more processors configured to execute the protocol stack layers as software. This may include generating messages for digital transmitter 3510 to transmit (e.g., messages including user or control data) and/or recovering messages from bitstreams provided by digital receiver 3508. In some aspects, controller 3512 may be configured to perform user-plane and control-plane functions to facilitate the transfer of application layer data to and from terminal device 3306 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by controller 3512 may include executable instructions that define the logic of these functions.

Controller 3512 may also be configured to control beamforming by antenna system 3502. In some aspects, controller 3512 may be configured with the features of beamforming controller 302 in FIGS. 3A and 3B and may control the digital or RF beamforming of antenna system 3502. Controller 3512 may therefore select the beamforming weight vector for antenna system 3502 (either to apply digitally as in FIG. 3B or with RF phase shifters as in FIG. 3B). This can include selecting a sector, such as the sectors described in FIGS. 33 and 34, and configuring antenna system 3502 to transmit and/or receive signals with the selected sector.

As introduced above, terminal device 3306 may be configured to perform beamsweeping using object sensing to reduce the beamsweeping time or power penalty. FIG. 36 shows exemplary flow chart 3600 according to some aspects, which terminal device 3306 may execute for beamsweeping. As shown in FIG. 36, beamsweeping may be triggered in stage 3602. In some aspects, terminal device 3306 may trigger beamsweeping, such as where controller 3512 transmits signaling to network access node 3302 that triggers a beamsweeping procedure. For example, controller 3512 may trigger beamsweeping when terminal device 3306 is first connecting to the network (e.g., initial network access), such as where terminal device 3306 first connects to network access node 3302 and triggers beamsweeping to find a sector pair for transmitting and receiving with network access node 3302. In another example, controller 3512 may detect that the radio link with network access node 3302 fails or degrades. Controller 3512 may then trigger beamsweeping with network access node 3302 to find another sector pair that can restore the radio link.

In other aspects, network access node 3302 may trigger the beamsweeping, such as where network access node 3302 transmits to terminal device 3306 signaling that triggers the beamsweeping. Like the examples above, in some cases network access node 3302 may trigger the beamsweeping when terminal device 3306 initially connects to network access node 3302; in other cases, network access node 3302 may trigger the beamsweeping when the radio link with terminal device 3306 fails or degrades.

After controller 3512 detects that beamsweeping is triggered in stage 3602, controller 3512 may instruct sensor 3514 to sense blocking objects around terminal device 3306 in stage 3604. Sensor 3514 may then perform sensing around terminal device 3306 to detect any blocking objects. In various aspects, sensor 3514 may be an infrared sensor, a capacitive sensor, a resistive sensor, an optical sensor, a piezoelectric sensor, a camera, a microphone, a radar sensor, or the like. Sensor 3514 may be configured to perform human object sensing depending on its sensor type. For example, the infrared sensor measures infrared light and may be configured to detect a human object based on a known IR signature, the camera may be configured to detect a human object via image recognition, the capacitive sensor may be configured to detect a human object by observing charge variations in a capacitor, and so forth. In some aspects, sensor 3514 may be a mmWave radar sensor, and may use an antenna array of antenna system 3502 to detect a human object (e.g., an antenna array-based radar sensor). This is further described below in FIGS. 37 and 38.

Sensor 3514 may be configured to sense directionally and may therefore perform sensing in different sensor directions to determine whether any blocking objects are located in that sensor direction (relative to terminal device 3306). FIGS. 33 and 34 show examples of sensor directions, e.g., sensor directions A-F. Sensor 3514 may determine whether any blocking objects are detected and, if so, record the sensor direction of the blocking object. The sensor directions shown in FIGS. 33 and 34 are exemplary. For example, while FIGS. 33 and 34 show the sensor directions as having coarser resolution than the antenna arrays' directional resolution (the resolution of the sectors), in other examples the sensor directions may have finer resolution than the antenna array's directional resolution. In some aspects, the sensor directions may have an angular resolution of, for example, one degree or less, and may therefore be able to detect the directional angle of a blocking object with resolution of a degree or less. In some aspects, sensor 3514 may determine a range of angles as the sensor direction of a blocking object, where the range of angles specifies the angular range that the blocking object is blocking. For example, sensor 3514 may determine a range of angles from 30-50 degrees for a blocking object that sensor 3514 detects as blocking the range of angles from 30-50 degrees around terminal device 3306.

Sensor 3514 may also determine the distance of the blocking object from terminal device 3306. Using the example of FIG. 33, sensor 3514 may determine that blocking object 3312 is located at sensor direction B relative to terminal device 3306. Sensor 3514 may then determine the distance of blocking object 3312 according to the sensor type of sensor 3514 (e.g., an infrared sensor, a capacitive sensor, a resistive sensor, an optical sensor, a piezoelectric sensor, a camera, a microphone, a radar sensor). For example, depending on the strength of the detection, sensor 3514 may determine how proximate blocking object 3312 is from terminal device 3306.

Sensor 3514 may then, in stage 3606, classify the blocking objects as human or non-human. In some aspects, sensor 3514 may be configured to determine whether a blocking object has properties of living tissue and, if so, may classify the blocking object as human (e.g., sensor 3514 may not specifically classify the blocking object as human living tissue vs. animal living tissue). For example, a capacitive or resistive sensor may distinguish between human and non-human blocking objects based on the conductive or resistive properties of a blocking object (where living tissue has a different conductivity than non-living tissue). An optical sensor or camera may distinguish between human and non-human blocking objects with image recognition, where the shapes of human bodies and human body parts are distinct from non-human objects. An infrared sensor may distinguish between human and non-human blocking objects based on the infrared radiation, heat signature, and/or movement of humans, which is distinct from that of non-human objects. A microphone may distinguish between human and non-human blocking objects based on the distinct sounds (e.g., human vocal speech or breathing) made by humans. A radar sensor (including, for example, the mmWave radar sensor described below) may distinguish between human and non-human objects based on Doppler effects, radio wave reflectivity, or the frequency-dependent radio reflectivity. This is further described below for the mmWave radar sensor.

Based on the object sensing and classification, sensor 3514 may generate a list of blocking objects in stage 3608. In one example, the list of blocking objects may include, for each blocking object: the sensor direction, the distance, and, a human object indicator (indicating whether the blocking object is human or non-human). In some cases, the list may also include the velocity of the blocking objects (detected by sensor 3514) and/or the size of the blocking objects (detected by sensor 3514). Sensor 3514 may then provide the list of blocking objects to controller 3512.

As previously explained, terminal device 3306 may be configured to abide by human exposure power limits, such as MPE or SAR restrictions. These restrictions limit the amount of RF energy that terminal device 3306's transmissions can deliver to a human body. Accordingly, if terminal device 3306 is transmitting on a sector of antenna system 3502 that points at a human object, terminal device 3306 may need to reduce its transmit power to comply with the human exposure power limits. As shown in FIG. 36, controller 3512 may therefore estimate the maximum allowable transmit power in sectors with human objects in stage 3610. For example, the list of blocking objects may indicate that certain sensor directions contain human objects, and that the human objects are located a specific distance from terminal device 3306. Controller 3512 may then identify the sectors of antenna system 3502 that map to these human-blocked sensor directions (e.g., which sectors overlap directionally with the human-blocked sensor directions). Using FIG. 34 as an example, the list of blocking objects may indicate that sensor direction A is blocked by a human object (at a specific distance from terminal device 3306). Controller 3512 may then compare sensor direction A (e.g., the angular range that defines sensor direction A) with the sectors of antenna system 3502. Similar to that described for antenna array 3308 in FIG. 34, antenna system 3502 may support a plurality of sectors, where controller 3512 can configure antenna system 3502 to transmit or receive on any of the sectors using phased array techniques. Because each of antenna system 3502's sectors are known in advance, controller 3512 may compare the angular range that defines sensor direction A (the sensor direction that is blocked by a human object) with the angular ranges that define the sectors of antenna system 3502.

Based on this comparison, controller 3512 may identify the sectors that are also blocked by human objects. Controller 3512 may then estimate the maximum allowable transmit power for these sectors. For example, controller 3512 may use a human exposure power limit (e.g., for an MPE or SAR restriction) and, based on the distance between terminal device 3306 and the human object, determine a maximum allowable transmit power that could be used for a given sector without exceeding the human exposure power limit. If the distance of the human object is farther, the maximum allowable transmit power may be larger; conversely, if distance is smaller, the maximum allowable transmit power may be smaller. In some aspects, controller 3512 may estimate the maximum allowable transmit power based on the amount of directional overlap between the sector and the sensor direction of the human blocking object. For example, the maximum allowable transmit power may be inversely proportional to the amount of directional overlap. In other words, more directional overlap may mean that the sector is steered directly towards the human blocking object, which means that the maximum allowable transmit power will be lower to still comply with the human exposure power limit.

After estimating the maximum allowable transmit power for sectors with human objects, controller 3512 may, in stage 3612, select sectors to sweep during the beamsweeping. These sectors may be referred to as candidate sectors, as they are the sectors that controller 3512 selects to evaluate. Controller 3512 may perform this selection based on different selection logic in different aspects. For example, in some aspects, controller 3512 may be configured to select sectors in stage 3612 based on the level that they are blocked by a blocking object. In one example, controller 3512 may use the list of blocking objects and determine which sectors are partially or fully blocked by a blocking object (e.g., identify one or more blocked sectors, which may be partially or fully blocked). For instance, controller 3512 may identify a first blocking object in the list of blocking objects and then identify the sensor directions that the blocking object occupies (e.g., a single direction or an angular range that represents which angles the blocking object occupies). Controller 3512 may then compare the sensor directions to the angular ranges of each sector available to antenna system 3502 and determine which sectors are blocked by the blocking object (e.g., which sectors have angular ranges that fall in the sensor directions of the blocking object). Using FIG. 34 as an example, controller 3512 may determine that blocking object 3402 is located in sensor direction A, and that sectors 1 to 3 have angular ranges that overlap with blocking object 3402. Sectors 4 to 7, however, have angular ranges that do not overlap with blocking object 3402. Controller 3512 may thus determine that sectors 1 to 3 are blocked but that sectors 4 to 7 are not blocked. If sensor 3514 detected other blocking objects, controller 3512 may be configured to similarly determine which sectors are blocked, and which are not, by those blocking objects. In some aspects, controller 3512 may be configured to select in stage 3612 sectors that are not blocked and to omit sectors that are blocked.

In some aspects, controller 3512 may be configured to determine the level that sectors are blocked (e.g., the amount of the sector that is blocked) and to select sectors in stage 3612 based on that blocking level. For example, controller 3512 may compare, for a given blocking object, the sensor directions to the angular ranges of the available sectors. Controller 3512 may then, for the sectors that are blocked by the blocking object, determine how much of the sectors are blocked, or in other words, the level that each sector is blocked. Controller 3512 may determine this blocking level as, for example, a percentage. Using FIG. 34 as an example, controller 3512 may compare the sensor directions of blocking object 3402 to the angular ranges of sectors 1 to 7 (the available sectors) and determine that blocking object 3402 blocks sectors 1 to 3. Controller 3512 may then determine how much of sectors 1 to 3 are respectively blocked by blocking object 3402. For example, by comparing the angular ranges of sectors 2 and 3 to the sensor directions of blocking object 3402, controller 3512 may determine that blocking object 3402 fully blocks sectors 2 and 3 (e.g., the sensor directions of blocking object 3402 has an angular range that fully overlaps with the respective angular ranges of sectors 2 and 3). In other words, blocking object 3402 blocks 100% of both sectors 2 and 3. On the other hand, controller 3512 may determine that blocking object 3402 only partially blocks sector 1. For example, by comparing the angular range of sector 1 with the sensor directions of blocking object 3402, controller 3512 may estimate that blocking object 3402 blocks a certain amount of sector 1, such as 33% of sector 1's angular range. Controller 3512 may also determine that blocking object 3402 does not block any of sectors 4-7, e.g., 0% of their angular ranges.

Using this procedure, controller 3512 may determine how much of each sector is blocked by a blocking object, or in other words, may determine a blocking level for each sector. If a sector is blocked by multiple blocking objects, controller 3512 may determine the blocking level for that sector by adding up the total angular range of that sector that is blocked by any blocking object. Controller 3512 may then select sectors in stage 3612 based on the blocking levels of the sectors. For example, controller 3512 may use a predefined blocking level threshold, and may select only sectors that have a blocking level less than the predefined blocking threshold in stage 3612 (e.g., only sectors that are blocked by less than a predefined amount). Continuing with the example based on FIG. 34, controller 3512 may use 25% as the predefined blocking threshold, and may select only sectors that have blocking levels less than 25% in stage 3612. Controller 3512 may therefore select sectors 1 and 4 to 7 but may omit sectors 2 and 3. This predefined blocking threshold of 25% is exemplary and can be scaled to any other value.

In some aspects, controller 3512 may also consider the distance of the blocking object from terminal device 3306 when selecting sectors, such as where controller 3512 selects sectors based on both blocking level and distance. In one example, controller 3512 may set a blocking threshold based on the blocking object's distance and then select sectors based on which sectors have blocking levels less than the blocking threshold. For instance, controller 3512 may set the blocking threshold to 50% (e.g., a first blocking threshold) when the blocking object is a first distance and may set the blocking threshold to 33% (e.g., a second blocking threshold less than the first blocking threshold) when the blocking object is a second distance that is less than the first distance. In other words, controller 3512 may set the blocking threshold to a higher value when the blocking object is farther away (thus allowing selection of sectors with more blocking), and to a lower value when the blocking object is closer (thus only selecting sectors with little blocking). Controller 3512 may then select sectors in stage 3612 that have blocking levels less than the blocking threshold. This means that when the blocking object is farther away, controller 3512 may select sectors that are blocked to a greater degree. This is because the blocking may not be as severe when the blocking object is farther away, so even sectors that are significantly blocked may still yield high link quality with the network access node. Conversely, when the blocking object is very close sectors that are blocked even a small degree may not be able to support sufficient link quality with the network access node.

In some aspects, controller 3512 may select sectors in stage 3612 based on the maximum allowable transmit powers calculated in stage 3610 for sectors blocked by human objects. As explained above, these maximum allowable transmit powers may be higher for human objects that are farther away and lower for human objects that are closer; additionally, if terminal device 3306 transmits on one of these sectors, terminal device 3306 may need to transmit at or less than the maximum allowable transmit power in order to comply with the human exposure power limits. Accordingly, in some aspects controller 3512 may select sectors in stage 3612 based on a predefined allowable transmit power threshold, such as where controller 3512 only selects sectors with maximum allowable transmit powers that are greater than the predefined allowable transmit power threshold. Sectors that are not blocked by a human object (e.g., not blocked at all, or blocked only by non-human objects) may not be subject to the same restrictions as those that are blocked by human objects; these sectors that are not blocked by a human object mat therefore have the same maximum allowable transmit power that is higher than that of the sectors blocked by a human object. Accordingly, when considering the predefined allowable transmit power threshold, controller 3512 may select sectors that are not blocked by a human object and sectors that are blocked by a human object but still have a maximum allowable transmit power greater than the predefined allowable transmit power threshold. Since the remaining sectors will have low maximum allowable transmit powers, they may not be viable options for terminal device 3306 to use when communicating with network access node 3302. Controller 3512 may therefore omit these sectors from the selected sectors in stage 3612.

In some aspects, controller 3512 may select sectors to sweep in stage 3612 by generating a weighted sector list in which each sector is assigned a priority. Controller 3512 may assign these priorities to the sectors based on various factors. For example, controller 3512 may assign higher priorities to sectors that are less blocked by blocking objects (low blocking level) and lower priorities to sectors that are more blocked by blocking objects (high blocking level). In another example, controller 3512 may assign higher priorities to sectors that are blocked by non-human objects than the priorities assigned to sectors blocked by human objects. In a further example for sectors blocked by human objects, controller 3512 may assign higher priorities to the sectors that have higher maximum allowable transmit power than the sectors with lower maximum allowable transmit power. In some aspects, controller 3512 may assign the priorities based on multiple of blocking level, human vs. non-human blocking, or maximum allowable transmit power. The pairs of sectors and priorities may form the weighted sector list. Controller 3512 may then select the sectors in stage 3612 based on the weighted sector list. For example, controller 3512 may select a predefined number of sectors with the highest priorities in the weighted sector list.

In some aspects, controller 3512 may select the sectors in stage 3612 based on multiple antenna arrays of terminal device 3306. For example, antenna system 3502 may include multiple antenna arrays, such as antenna arrays 3308 and 3310 shown in FIG. 33. Because antenna arrays 3308 and 3310 are positioned in different locations around the housing of terminal device 3306, their respective sectors may point in different directions. Accordingly, in some cases one of the antenna arrays may be blocked while the other is not. FIG. 33 shows an example of this. In some aspects, controller 3512 may be configured to determine that the sectors of a first antenna array (of a plurality of antenna arrays of terminal device 3306) are blocked by a blocking object while the sectors of a second antenna array are not blocked. Controller 3512 may therefore not select any of the first antenna array's sectors as sectors in stage 3612, and may instead select the sectors in stage 3612 from the second antenna array.

To recap stage 3612, controller 3512 may select from the available set of sectors in to identify a plurality of selected sectors. Controller 3512 may perform this selection based on any factor or criteria described above. After obtaining the selected sectors, controller 3512 may perform beamsweeping on the selected sectors in stage 3614. For example, controller 3512 may transmit or receive signals with antenna system 3502 on the selected sectors to measure the link quality for each sector. This can follow any type of beamsweeping procedure. For example, the WiGig standard specifies a sector level sweep (SLS) beamsweeping pattern where an initiator device performs a sector sweep (ISS) to train its transmitter (known as ISS TXSS) and/or receiver (ISS RXSS), and where a responder device performs a sector sweep (RSS) to train its transmitter (RSS TXSS) and/or receiver (RSS RXSS). In these sector sweeps, network access node 3302 or terminal device 3306 may sequentially step through its sectors and measure the link quality while the other device transmits or receives a reference signal (e.g., a sector sweep frame (SSW)). Network access node 3302 or terminal device 3306 may then identify which sectors provide the best link quality and select a sector to use for transmission or reception with each other.

In standard beamsweeping, terminal device 3306 may test each of a set of sectors of antenna system 3502 (e.g., each sector of each antenna array, including where antenna system 3502 has multiple antenna arrays like in FIG. 33). To avoid such a long and power-consuming procedure, controller 3512 may instead perform the beamsweeping on only the selected sectors in stage 3614. For instance, in an exemplary receive beamsweeping procedure where network access node 3302 transmits reference signals (e.g., with a quasi-omni directional antenna pattern at antenna array 3502) to terminal device 3306 and terminal device measures the link quality of its sectors, controller 3512 may control antenna system 3502 to only receive with the selected sectors. Digital receiver 3508 may therefore only measure the link quality on the selected sectors. Since digital receiver 3508 measures only some of the overall set of sectors, this can save power and time. In some aspects, terminal device 3302 and network access node 3306 may agree in advance which sectors to test, and may shorten the beamsweeping procedure so only the selected sectors are tested. In other aspects, terminal device 3302 and network access node 3306 may not agree in advance which sectors to test, and may instead be configured to perform a beamsweeping procedure of predefined duration (e.g., a duration long enough to test each sector). In those cases, controller 3512 may control digital receiver 3508 to measure the link quality for only the selected sectors, and may control antenna system 3502 to receive only for those selected sectors. Controller 3512 may therefore skip measuring the link quality for the non-selected sectors. Although the beamsweeping procedure may still take the predefined duration of time, terminal device 3302 may save power by not testing each of the available sectors.

In an exemplary transmit beamsweeping procedure, terminal device 3306 may transmit reference signals on each sector and network access node 3302 may measure the link quality for each sector (e.g., with a quasi-omni directional antenna pattern at antenna array 3502). Network access node 3302 may select the sector (or sectors) with the best link quality and send feedback to controller 3512 that identifies that sector (or sectors). In stage 3614 for this case, controller 3512 may control antenna system 3502 and digital transmitter 3510 to only transmit the reference signals with the selected sectors. If terminal device 3306 and network access node 3302 can agree in advance on which sectors to test, controller 3512 may configure the beamsweeping procedure to only test the selected sectors. Otherwise, if terminal device 3306 and network access node 3302 are configured to perform a beamsweeping procedure of predefined duration, controller 3512 may control antenna system 3502 and digital transmitter 3510 to only transmit the reference signals with the selected sectors. Terminal device 3306 may not transmit any reference signal during time slots assigned for the non-selected sectors, and network access node 3302 may measure very poor link quality for those sectors. As a result, network access node 3302 may not select to use any of the non-selected sectors for beamforming.

After the beamsweeping is finished, controller 3512 may select a target sector for transmitting and/or receiving with network access node 3302 in stage 3618. Because controller 3512 only performed beamsweeping on the selected sectors, controller 3512 may select the target sector from the selected sectors. For receive beamsweeping, controller 3512 may select the target sector based on the link qualities for each selected sector. For example, controller 3512 may identify which selected sector had the highest link quality (as measured by digital receiver 3508) and may select that sector as the target sector. For transmit beamforming, network access node 3302 may send feedback to controller 3512 that identifies one or more sectors that had the highest link qualities. Controller 3512 may then select the target sector based on this feedback, such as where controller 3512 selects the target sector as the selected sector for which network access node 3302 reported the highest link quality.

In some aspects, controller 3512 may select the target sector in stage 3618 based on the maximum allowable transmit power. For instance, because sectors with human objects may be subject to transmit power restrictions, controller 3512 may consider how much its transmit power will be restricted if it transmits with one of those sectors. In one example, controller 3512 may scale down link quality measurements from the beamsweeping based on the maximum allowable transmit power, and may then select the target sector based on the scaled link quality measurements. Because sectors that are not blocked by a human object may not be subject to the human exposure power limits, controller 3512 may scale down link quality measurements for human-blocked sectors but may not scale down link quality measurements for unblocked sectors. This may weight selection of the target sector to unblocked sectors; however, if there is a human-blocked sector with very high link quality, it may still have the highest scaled link quality measurement. In some aspects, controller 3512 may scale down the link quality measurements (e.g., all of the link quality measurements, or a subset of the highest link quality measurements) based on the maximum allowable transmit power, and may then select the target sector as the sector with the highest scaled link quality measurement.

In some aspects, controller 3512 may alternatively identify the sector with the highest link quality measurement, and then determine whether this sector is pointed at a human object (e.g., per the human object indicator in the list of blocking objects). If the sector with the highest link quality measurement is not pointed towards a human object, controller 3512 may select that sector as the target sector in stage 3618. If the sector with the highest link quality measurement is pointed towards a human object, controller 3512 may scale down the link quality measurements based on the maximum allowable transmit powers (e.g., scale down all of the link quality measurements, or scale down only a subset of the highest link quality measurements). After scaling down the link quality measurements, controller 3512 may select the sector with the highest scaled link quality measurement as the target sector in stage 3614.

Once controller 3512 selects the target sector, controller 3512 may control terminal device 3306 to transmit or receive with the target sector. For example, controller 3512 may perform RF or digital beamforming based on a beamforming weight vector for the target sector. Antenna array 3502 may therefore transmit or receive with the target sector. As described above, this may focus terminal device 3306's transmission or reception in the direction of the target sector, which can in turn provide beam gain for the radio link with network access node 3302.

In some aspects, controller 3512 may refine the target sector in a beam refinement procedure, such as WiGig's beam refinement protocol (BRP). In a beam refinement procedure, terminal device 3306 and network access node 3302 may selectively narrow or focus the antenna beams for the radio link, such as by adapting the beamforming weight vector to find an antenna beam that further increases the beam gain of the radio link. After refining the target sector in such a procedure, controller 3512 may control terminal device 3306 to use the refined target sector to transmit or receive with network access node 3302.

Various aspects above detailed examples where terminal device 3306 has a sensor (e.g., sensor 3514) dedicated to object sensing. In other aspects, terminal device 3306 may use antenna system 3502 as a radar sensor, such as where terminal device 3306 uses antenna system 3502 as a radar device that transmits signals and detects nearby objects based on the resulting reflected signals.

Figure 37:
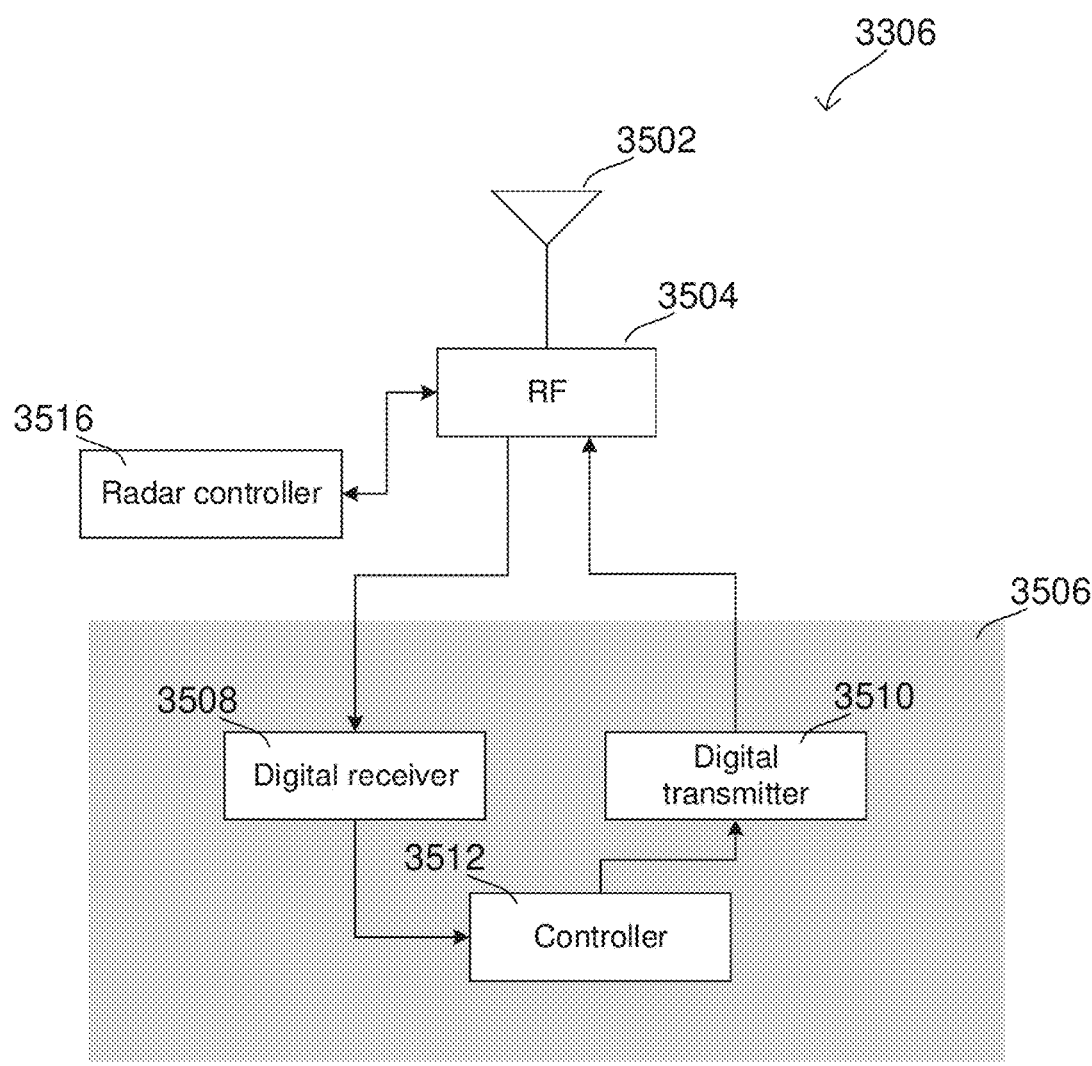
FIG. 37 shows an exemplary internal configuration of a terminal device with a radar sensor that includes the terminal device's antenna array according to some aspects.

FIG. 37 shows an exemplary internal configuration of terminal device 3306 according to some aspects where terminal device 3306 uses antenna system 3502 as part of a radar sensor. As shown in FIG. 37, terminal device 3306 may, like in FIG. 33, include antenna system 3502, RF transceiver 3504 and baseband modem 3506 that includes digital receiver 3508, digital transmitter 3510, and controller 3512. Terminal device 3306 may also include radar controller 3516, which may be connected to the transmit and receive paths of RF transceiver 3504. Radar controller 3516 may form the radar sensor along with antenna system 3502.

Radar controller 3516 may be configured to transmit radio signals via RF transceiver 3504 and antenna system 3502 and to receive the resulting reflected radio signals after the transmitted radio signals reflect back off objects. Radar controller 3516 may then process these reflected signals to sense the objected around terminal device 3306. Accordingly, instead of using a separate sensor (such as sensor 3514 as described in FIG. 35) to detect blocking objects, terminal device 3306 may use antenna system 3502 and radar controller 3516 as a radar sensor to detect blocking objects.

Figure 38:
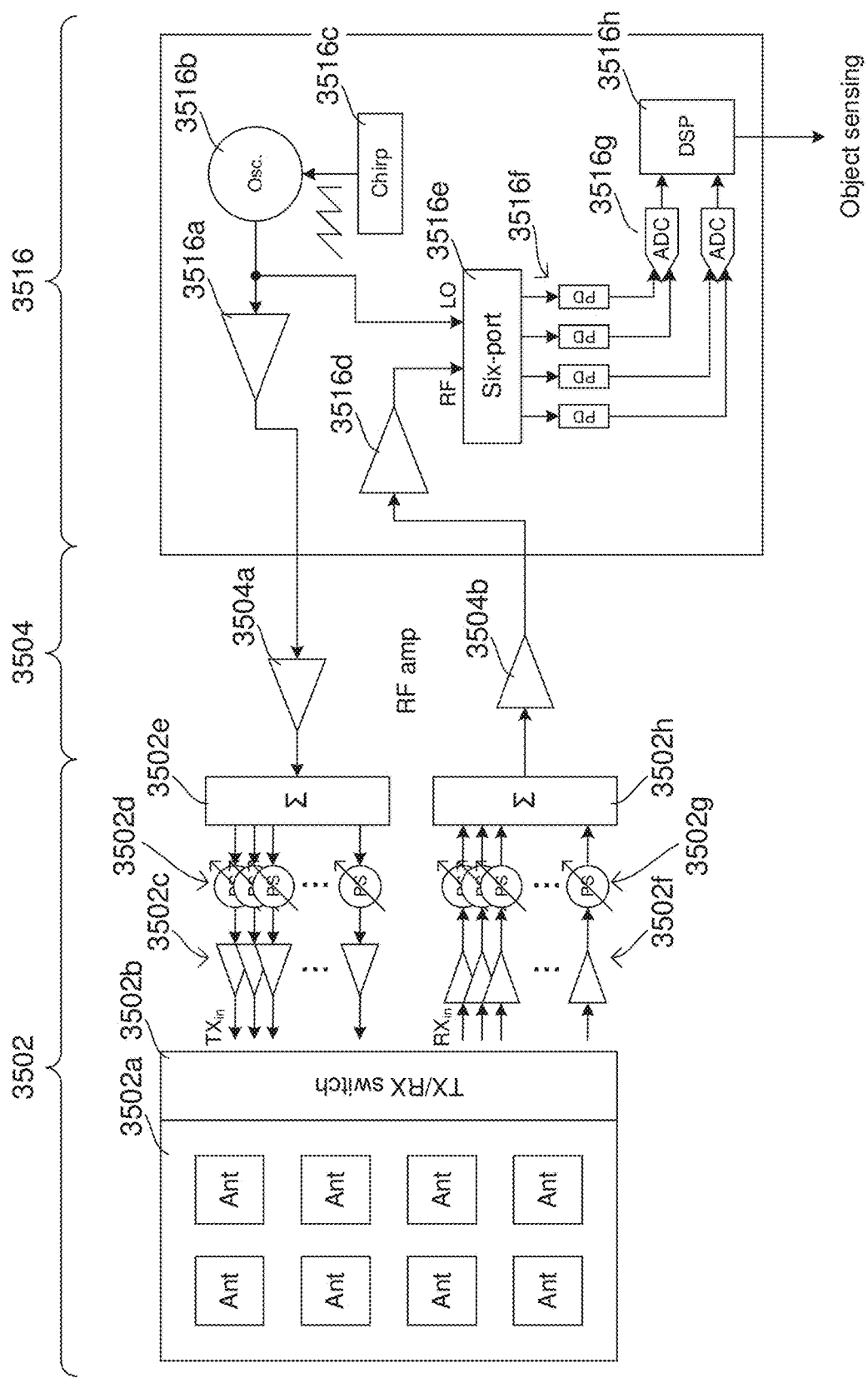
FIG. 38 shows an exemplary internal configuration of a radar sensor using a terminal device's antenna array according to some aspects.

FIG. 38 shows an exemplary diagram of antenna system 3502, RF transceiver 3504, and radar controller 3516 according to some aspects. These components may form the radar sensor of terminal device 3306. As shown in FIG. 38, antenna system 3502 may include antenna array 3502a, switch 3502b, transmit PA bank 3502c, transmit phase shifter array 3502d, transmit splitter 15023, transmit RF amplifier 3504a, receive LNA bank 3502f, receive phase shifter array 3502g, and receive combiner 3502h. RF transceiver 3504 may include transmit RF amplifier 3504a and receive RF amplifier 3504b. Radar controller 3516 may include transmit RF amplifier 3516a, local oscillator 3516b, chirp generator 3516c, receive RF amplifier 3516d, six-port detector 3516e, power detector bank 3516f, ADCs 3516g, and DSP 3516h.

The basic operation is as follows. Radar controller 3516 controls RF transceiver 3504 and antenna system 3502 to radiate a signal from antenna array 3502. That signal radiates outward in space from terminal device 3306 until it hits one or more blocking objects around terminal device 3306. Once the radiated signal hits a blocking object, it is scattered. Some of the radiation enters or propagates through the blocking object and some of the radiation is reflected back by the blocking object. The blocking object's characteristics determine how much radiated energy is absorbed by or propagates through the object and how much radiated energy is reflected back. These object characteristics include the blocking object's size, shape, and the type of material it is made of.

The signal that the blocking object reflects back is called the reflected signal. Because the blocking object's characteristics will influence the reflected signal in specific ways, terminal device 3306 can receive the reflected signal with antenna system 3502 and process the reflected signal with radar controller 3514 to extract information from the reflected signal. This information can include the reflected power, range, Doppler, and the like. Based on this information, radar controller 3514 may determine the distance, sensor direction, and whether the blocking object is a human object or not. Radar controller 3514 may provide this information to controller 3512, which may use the information to select sectors for beamsweeping and to select a target sector for transmitting and receiving.

This operation will now be described in detail, starting first with the transmit direction and then continuing to the receive direction. In the transmit direction, local oscillator 3516b may generate a local oscillation signal (e.g., using a crystal oscillator). In some aspects, local oscillator 3516b may be a voltage-controlled oscillator (VCO) that generates a frequency tone based on the voltage control provided by chirp generator 3516c. Chirp generator 3516c may generate discrete chirps which, when used to control local oscillator 3516c, produces a continuous wave (CW) signal in multiple frequencies that are each generated for a short period of time. Then, as shown in FIG. 38, transmit RF amplifier 3516a and transmit RF amplifier 3504a may amplify the discrete chirp signal. Transmit splitter 3502e may split this transmit signal (the discrete chirp signal) into multiple paths and provide each path to one of the phase shifters in phase shifter array 3502d. These phase shifters, which terminal device 3302 uses for phased-array RF beamforming, may then apply respective phase shifts (e.g., according to a beamforming weight vector) and provide the resulting phase-shifted signals to transmit PA bank 3502. The transmit PAs in transmit PA bank 3502c may amplify the phase-shifted signals and provide the amplified signals to switch 3502b. Switch 3502b may connect each transmit PA in transmit PA bank 3502c to one of the antennas in antenna array 3502a, and may be configured to switch the antennas of antenna array 3502a between transmitting and receiving. Switch 3502b may therefore switch antenna array 3502a to transmit, and antenna array 3502a may wirelessly transmit the discrete chirp signal. In this exemplary configuration, antenna system 3502 may re-use the same antennas for transmission and reception. In other exemplary configurations, antenna system 3502 may include separate sets of transmit antennas and receive antennas (and, e.g., no switch 3502b).

This radiated signal may then radiate out from antenna array 3502 and hit one or more blocking objects. These blocking objects may reflect the radiated signal back towards terminal device 3306 as a reflected signal. As discussed above, the blocking objects' size, shape, and material type may influence the properties of the reflected signal. Antenna array 3502a may then receive the reflected signal, and switch 3502b may switch to receive and provide the received reflected signal to receive LNA bank 3502f (e.g., the output of each antenna element in antenna array 3502a to a respective LNA in LNA bank 3502f). LNA bank 3502f may perform low-noise amplification and provide the resulting amplified signals to receive phase shifter array 3502g. Like transmit phase shifter array 3502d, receive phase shifter array 3502g may perform phased-array RF beamforming by applying respective phase shifts (e.g., according to a beamforming weight vector) and providing the resulting phase-shifted signals to receive combiner 3502h. Receive combiner 3502h may combine the phase-shifted signals (e.g., by summing) and provide the combined signal to receive RF amplifier 3504b.

Radar controller 3516 may then process the reflected signal (the combined signal) to sense blocking objects near terminal device 3306. As shown in FIG. 38, receive RF amplifier 3516d may perform low-noise amplification and provide this signal to six-port detector 3516e. Six-port detector 3516e may also receive the output signal from local oscillator 3516b, which is the transmit signal. Using these two inputs, six-port detector 3516e may add the transmit signal with the reflected signal at four relative phase offsets (e.g., 0, 90, 180, and 270 degrees; in other aspects, six-port detector 3516e can use more or fewer phase offsets). Six-port detector 3516e may then provide those phase isolation signals as its outputs. Depending on the phase difference between the transmit signal and the reflected signal, the outputs will constructively or destructively add by varying amounts. Power detector bank 3516f may then, with each of its power detectors, perform power detection on a respective output to determine the phase difference. ADCs 3516g may then perform analog to digital conversion to digitize the phase differences and provide the phase differences to DSP 3516h. In the example shown in FIG. 38, ADCs 3516g are two differential ADCs, one for in-phase and one for quadrature. In other examples, ADCs 3516g may have four ADCs, each of which performs ADC on an output of six-port detector 3516e.

DSP 3516*h* may then evaluate the phase differences to determine the range of the reflected signal, or in other words, the distance from antenna array 3502*a* at which a blocking object is located. For example, the radiated transmit signal propagates wirelessly through free space before reflecting off a blocking object and returning back to terminal device 3306. The reflected signal will therefore have a different phase from the transmit signal produced by local oscillator 3516*b*, where the phase difference indicates the distance that the reflected signal traveled. The phase difference therefore also indicates how far away the blocking object is. DSP 3516*h* may also measure the strength of the reflected signal and, based on the strength, may determine the degree to which a blocking object is present. In various aspects, DSP 3516*h* may use any of the techniques described in US Patent Application Publication US 2018/0180713 A1 to determine the distance and other characteristics of the blocking object.

In some aspects, terminal device 3306 may use radar controller 3516 and antenna system 3502 as a sensor to execute flow chart 3600 described above in FIG. 36. Accordingly, instead of using sensor 3514 to detect blocking objects around terminal device 3306 in stage 3604, radar controller 3516 may detect blocking objects by using antenna system 3502 to radiate a transmit signal and to receive the reflected signal and by then processing the reflected signal to determine the distance and direction of blocking objects. In some aspects, radar controller 3516 may be configured to steer antenna array 3502*a*'s beam in different directions to perform object sensing in different directions. For example, radar controller 3516 may be configured to control transmit phase shifter array 3502*d* and receive phase shifter array 3502*g* to steer the transmit and receive antenna beams in different sensor directions. Radar controller 3516 may then detect blocking objects in those sensor directions, such as in the same manner that sensor 3514 detected blocking objects in sensor directions described above.

In some aspects, radar controller 3516 may also be configured to determine whether a blocking object is a human object, and may therefore classify blocking objects as human or non-human in stage 3606 of flow chart 3600. For example, in some aspects radar controller 3516 may be configured to identify human object movements and tremor based on the reflected signal's Doppler and micro-Doppler effects. Specifically, when a human object is placed in front of antenna system 3502, natural body tremors will cause unique Doppler effects in the reflected signal, and the reflected signal will have phase and frequency variations. Radar controller 3516 may therefore detect the Doppler and micro-Doppler effects in the reflected signal and, based thereon, may determine that the blocking object is a human object.

In some aspects, radar controller 3516 may be configured to correlate the blocking object's distance (e.g., determined by DSP 3516*h*) with its reflectivity and to distinguish between human and non-human blocking objects based on the correlation. Specifically, because each object has a reflection coefficient, radar controller 3516 may measure the blocking object's reflectivity based on the reflected signal and correlate that reflectivity with the blocking object's distance. Radar controller 3516 may then, based on offline characterization, classify what material the blocking object is made of and determine whether the blocking object is human.

In some aspects, radar controller 3516 may measure the reflectivity of an object across a wide frequency range and then compare the resulting frequency signature with the expected response of the reflectivity of a human object (which may be pre-characterized offline). Since each material, including human tissue, has its own frequency response and reflectivity, radar sensor 3516 can compare the reflected signal's frequency signature with the pre-characterized properties of human tissue and distinguish between human and non-human objects.

In some aspects, radar controller 3516 may combine multiple of these techniques to classify blocking objects as human or non-human in stage 3606.

After classifying blocking objects as human or non-human in stage 3606, terminal device 3306 may perform the rest of flow chart 3600 as described above for FIG. 36. Accordingly, terminal device 3306 may use radar controller 3516 and antenna system 3502 in place of sensor 3514 (e.g., may use radar controller 3516 and antenna system 3502 as a radar sensor). This may have several advantages. For example, because terminal device 3306 uses the same antenna array for both object sensing and radio transmission, the sensor beams may be spatially correlated with the antenna beams. Compared to other cases where the sensor is placed at a different location from the antenna array (or is facing a different direction from the antenna array), aspects using antenna system 3502 for both sensing and radio transmission may be more accurate in determining which antenna beams are blocked. Aspects using antenna system 3502 for both sensing and radio transmission may therefore be better able to select the best sectors and to comply with human exposure power limits.

To summarize, these aspects that select sectors to sweep based on blocking objects may provide several advantages. For example, because terminal device 3306 only sweeps some of the available sectors, the time it takes to connect to the network (initial network access time) may be reduced. Additionally, when the radio link with network access node 3302 is lost, terminal device 3306 may be able to reconnect and recover in a shorter amount of time. These aspects can also save power. Because terminal device 3306 sweeps only some of the sectors, terminal device 3306 may consume less battery power and may increase its battery life. Furthermore, these aspects may save radio resources. For instance, when terminal device 3306 and network access node 3302 can agree in advance to only sweep some of the sectors, the beamsweeping may take less time and therefore occupy less radio resources. This leaves more radio resources to use for data communication, which in turn increases network data bandwidth and throughput. Lastly, these aspects may be more capable of abiding by human exposure power regulations. Because terminal device 3306 considers the presence of human blocking objects and the corresponding maximum allowable transmit powers, terminal device 3306 may avoid delivering excessive RF energy to human objects.

FIG. 39 shows exemplary method 3900 according to some aspects. As shown in FIG. 39, method 3900 includes detecting, with a sensor, one or more objects around the communication device (3902), identifying one or more blocked sectors of an antenna array that are blocked by the one or more objects (3904), selecting, based on the one or more blocked sectors, one or more candidate sectors of the antenna array to evaluate (3906), and determining radio link qualities of the one or more candidate sectors (3908).

FIG. 40 shows exemplary method 4000 according to some aspects. As shown in FIG. 40, method 4000 includes detecting, with a sensor, one or more human objects around the communication device (4002), identifying one or more human-blocked sectors of an antenna array that are blocked by the one or more human objects (4004), estimating a maximum allowable transmit power for the one or more human-blocked sectors (4006), selecting one or more candidate sectors of the antenna array to evaluate based on maximum allowable transmit powers (4008), and determining radio link qualities of the one or more candidate sectors (4010).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (allocated for example in US (FCC Part 15)), 863-868.6 MHz (allocated for example in European Union (ETSI EN 300 220)), 915.9-929.7 MHz (allocated for example in Japan), 917-923.5 MHz (allocated for example in South Korea), 755-779 MHz and 779-787 MHz (allocated for example in China), 790-960 MHz, 1710-2025 MHz, 2110-2200 MHz, 2300-2400 MHz, 2.4-2.4835 GHz (an ISM band with global availability, often used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (allocated for example in the US for Citizen Broadband Radio Service), 5.15-5.25 GHz and 5.25-5.35 GHz and 5.47-5.725 GHz and 5.725-5.85 GHz bands (allocated for example in the US (FCC part 15), consists four U-NII bands in total 500 MHz spectrum), 5.725-5.875 GHz (allocated for example in EU (ETSI EN 301 893)), 5.47-5.65 GHz (allocated for example in South Korea, 5925-7125 MHz and 5925-6425 MHz band (under consideration in US and EU, respectively; next generation Wi-Fi system is expected to include the 6 GHz spectrum as operating band but, as of December 2017, Wi-Fi system is not yet allowed in this band; regulation is expected to be finished in 2019-2020 time frame), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (often below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. Some of the features in this disclosure are defined for the network side, such as Access Points, eNodeBs, New Radio (NR) or next generation Node Bs (gNodeB or gNB, which is typically used in the context of 3GPP fifth generation (5G) communication systems), etc. Still, in some aspects a User Equipment (UE) may take this role and act as an Access Points, eNodeBs, gNodeBs, etc. In other words, some or all features defined herein for network equipment may be implemented by a UE (or terminal device).

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a method of performing radio communications at a communication device, the method including transmitting data on a first channel with a first antenna beam and a first transmit power, determining an estimated radio frequency (RF) exposure power to a human object based on the first antenna beam and the first transmit power, determining whether the estimated RF exposure power is greater than an exposure power threshold, and if the estimated RF exposure power is greater than the exposure power threshold, switching from the first channel to a second channel with narrower bandwidth and transmitting data on the second channel with a second transmit power lower than the first transmit power.

In Example 2, the subject matter of Example 1 can optionally further include if the estimated RF exposure power is less than the exposure power threshold, continuing to transmit data on the first channel with the first antenna beam and the first transmit power.

In Example 3, the subject matter of Example 1 or 2 can optionally include wherein switching from the first channel to the second channel includes transmitting signaling to a network access node for channel switching from the first channel to the second channel.

In Example 4, the subject matter of Example 3 can optionally include wherein transmitting the signaling to the network access node includes transmitting the signaling to the network access node on the second channel.

In Example 5, the subject matter of Example 3 or 4 can optionally further include after transmitting the signaling to the network access node, receiving on the second channel a transmission grant for transmitting data on the second channel.

In Example 6, the subject matter of any one of Examples 3 to 5 can optionally include wherein the channel switch is a user equipment (UE)-triggered bandwidth part (BWP) switch procedure, and wherein the second channel is a default BWP and the first channel is a non-default BWP.

In Example 7, the subject matter of Example 6 can optionally further include if the estimated RF exposure power is greater than the exposure power threshold, determining whether the default BWP has narrower bandwidth than the non-default BWP, and triggering the BWP fallback procedure if the default BWP has narrower bandwidth than the non-default BWP.

In Example 8, the subject matter of Example 3 can optionally include wherein the channel switch is a user equipment (UE)-triggered bandwidth part (BWP) switch procedure and wherein transmitting the signaling to the network access node on the second channel includes transmitting a random access transmission to the network access node on the second channel.

In Example 9, the subject matter of any one of Examples 1 to 8 can optionally include wherein the first channel and the second channel have mutually exclusive frequency ranges on a same wideband carrier.

In Example 10, the subject matter of any one of Examples 1 to 9 can optionally further include detecting the human object with a sensor.

In Example 11, the subject matter of Example 10 can optionally include wherein the sensor is a passive infrared sensor, a capacitive sensor, a resistive sensor, an optical sensor, a piezoelectric sensor, a camera, a microphone, a radar detector, or an antenna array-based radar sensor.

In Example 12, the subject matter of Example 10 or 11 can optionally further include determining human object sensing information that describes a distance or a direction of the human object relative to an antenna array of the communication device, wherein determining the estimated RF exposure power includes determining the estimated RF exposure power based on the human object sensing information, the first transmit power, and the first antenna beam.

In Example 13, the subject matter of Example 10 or 11 can optionally further include determining, with the sensor, a distance value based on a distance between the human object and an antenna array of the communication device, and determining, with the sensor, a direction value based on a direction between the human object and an antenna array of the communication device, wherein determining the estimated RF exposure power includes determining the estimated RF exposure power based on the distance value, the direction value, the first transmit power, and the first antenna beam.

In Example 14, the subject matter of any one of Examples 1 to 13 can optionally include wherein the human object is a whole human body or a part of a human body.

In Example 15, the subject matter of any one of Examples 1 to 14 can optionally include wherein if the estimated RF exposure power is greater than the exposure power threshold, the method further includes identifying a high exposure power limit window scheduled before a low exposure power limit window in a time-independent exposure power limit, identifying a first timepoint based on a channel switch latency and the end timepoint of the high exposure power limit window, and transmitting signaling at the first timepoint to trigger a channel switch from the first channel to the second channel.

In Example 16, the subject matter of Example 15 can optionally include wherein the channel switch takes effect at a second timepoint approximately equal to the first timepoint plus the channel switch latency.

In Example 17, the subject matter of any one of Examples 1 to 14 can optionally include wherein if the estimated RF exposure power is greater than the exposure power threshold, the method further includes identifying a high exposure power limit window scheduled before a low exposure power limit window in a time-independent exposure power limit, and triggering a channel switch from the first channel to the second channel based on the timing of the high exposure power limit window.

In Example 18, the subject matter of any one of Examples 1 to 17 can optionally include wherein transmitting the data on the first channel includes transmitting the data with a digital transmitter via a radio transceiver and an antenna array.

Example 19 is a method of performing radio communications at a communication device, the method including identifying a high exposure power limit window and a low exposure power limit window in a time-dependent exposure power limit, identifying a first data packet scheduled for transmission and a second data packet scheduled for transmission, determining a first transmission time for the first data packet and a second transmission time for the second data packet based on the time-dependent exposure power limit and further based on a data packet priority or a data packet size, and transmitting the first data packet at the first transmission time and transmitting the second data packet at the second transmission time.

In Example 20, the subject matter of Example 19 can optionally include wherein the high exposure power limit window is a time window that has a larger human radio frequency (RF) exposure power limit than the low exposure power limit window.

In Example 21, the subject matter of Example 19 or 20 can optionally include wherein the time-dependent exposure power limit is a power limit curve that restricts human RF exposure power to certain levels at different points in time.

In Example 22, the subject matter of any one of Examples 19 to 21 can optionally include wherein the low exposure power limit window is scheduled immediately after the high exposure power limit window.

In Example 23, the subject matter of any one of Examples 19 to 22 can optionally further include determining that the first data packet has a higher data packet priority than the second data packet.

In Example 24, the subject matter of Example 23 can optionally include wherein determining that the first data packet has a higher data packet priority than the second data packet is based on Quality of Service (QoS) requirements assigned to the first data packet and the second data packet.

In Example 25, the subject matter of any one of Examples 19 to 22 can optionally further include determining that the first data packet has a higher data packet size than the second data packet.

In Example 26, the subject matter of any one of Examples 23 to 25 can optionally include wherein determining the first transmission time for the first data packet and the second transmission time for the second data packet includes selecting the first transmission time during the high exposure power limit window and selecting the second transmission time during the low exposure power limit window.

Example 27 is a communication device including a digital transmitter configured to transmit data on a first channel with a first antenna beam and a first transmit power, an estimator configured to determine an estimated radio frequency (RF) exposure power to a human object based on the first antenna beam and the first transmit power, and a controller configured to determine whether the estimated RF exposure power is greater than an exposure power threshold, wherein, if the controller determines the estimated RF exposure power is greater than the exposure power threshold, the controller is configured to switch the digital transmitter from the first channel to a second channel with narrower bandwidth and the digital transmitter is configured to transmit data on the second channel with a second transmit power lower than the first transmit power.

In Example 28, the subject matter of Example 27 can optionally further include a radio transceiver and an antenna array, wherein the digital transmitter is configured to transmit the data on the first channel via the radio transceiver and the antenna array.

In Example 29, the subject matter of Example 28 can optionally include wherein the antenna array is configured to transmit wireless signals to form the first antenna beam.

In Example 30, the subject matter of any one of Examples 27 to 29 can optionally include wherein if the estimated RF exposure power is less than the exposure power threshold, the digital transmitter is configured to continue to transmit data on the first channel with the first antenna beam and the first transmit power.

In Example 31, the subject matter of any one of Examples 27 to 30 can optionally include wherein the controller is configured to switch the digital transmitter from the first channel to the second channel by controlling the digital transmitter to transmit signaling to a network access node for channel switching from the first channel to the second channel.

In Example 32, the subject matter of Example 31 can optionally include wherein the digital transmitter is configured to transmit the signaling to the network access node on the second channel.

In Example 33, the subject matter of Example 31 or 32 can optionally further include a digital receiver configured to receive, on the second channel, a transmission grant for transmitting data on the second channel.

In Example 34, the subject matter of any one of Examples 31 to 33 can optionally include wherein the channel switch is a user equipment (UE)-triggered bandwidth part (BWP) switch procedure, and wherein the second channel is a default BWP and the first channel is a non-default BWP.

In Example 35, the subject matter of Example 34 can optionally include wherein the controller is further configured to if the estimated RF exposure power is greater than the exposure power threshold, determine whether the default BWP has narrower bandwidth than the non-default BWP, and trigger the BWP fallback procedure if the default BWP has narrower bandwidth than the non-default BWP.

In Example 36, the subject matter of Example 31 can optionally include wherein the channel switch is a user equipment (UE)-triggered bandwidth part (BWP) switch procedure, and wherein the digital transmitter is configured to transmit the signaling to the network access node on the second channel by transmitting a random access transmission to the network access node on the second channel.

In Example 37, the subject matter of any one of Examples 27 to 36 can optionally include wherein the first channel and the second channel have mutually exclusive frequency ranges on a same wideband carrier.

In Example 38, the subject matter of any one of Examples 27 to 37 can optionally further include a sensor configured to detect the human object.

In Example 39, the subject matter of Example 38 can optionally include wherein the sensor is a passive infrared sensor, a capacitive sensor, a resistive sensor, an optical sensor, a piezoelectric sensor, a camera, a microphone, a radar detector, or an antenna array-based radar sensor.

In Example 40, the subject matter of Example 38 or 39 can optionally include wherein the sensor is further configured to determine human object sensing information that describes a distance or a direction of the human object relative to an antenna array of the communication device, and wherein the estimator is configured to determine the estimated RF exposure power by determining the estimated RF exposure power based on the human object sensing information, the first transmit power, and the first antenna beam.

In Example 41, the subject matter of Example 38 or 39 can optionally include wherein the sensor is further configured to determine a distance value based on a distance between the human object and an antenna array of the communication device, and to determine a direction value based on a direction between the human object and an antenna array of the communication device, and wherein the estimator is configured to determine the estimated RF exposure power by determining the estimated RF exposure power based on the distance value, the direction value, the first transmit power, and the first antenna beam.

In Example 42, the subject matter of any one of Examples 27 to 41 can optionally include wherein the human object is a whole human body or a part of a human body.

In Example 43, the subject matter of any one of Examples 27 to 42 can optionally include wherein if the estimated RF exposure power is greater than the exposure power threshold the controller is further configured to identify a high exposure power limit window scheduled before a low exposure power limit window in a time-independent exposure power limit, and to identify a first timepoint based on a channel switch latency and the end timepoint of the high exposure power limit window, and the digital transmitter is further configured to transmit signaling at the first timepoint to trigger the channel switch from the first channel to the second channel.

In Example 44, the subject matter of Example 43 can optionally include wherein the channel switch takes effect at a second timepoint approximately equal to the first timepoint plus the channel switch latency.

In Example 45, the subject matter of any one of Examples 27 to 42 can optionally include wherein if the estimated RF exposure power is greater than the exposure power threshold the controller is further configured to identify a high exposure power limit window scheduled before a low exposure power limit window in a time-independent exposure power limit, and to trigger a channel switch from the first channel to the second channel based on the timing of the high exposure power limit window.

Example 46 is a communication device including a controller configured to identify a high exposure power limit window and a low exposure power limit window in a time-dependent exposure power limit, identify a first data packet scheduled for transmission and a second data packet scheduled for transmission, and determine a first transmission time for the first data packet and a second transmission time for the second data packet based on the time-dependent exposure power limit and further based on a data packet priority or a data packet size, and a digital transmitter configured to transmit the first data packet at the first transmission time and to transmit the second data packet at the second transmission time.

In Example 47, the subject matter of Example 46 can optionally further include a radio transceiver and one or more antennas, wherein the digital transmitter is configured to transmit the first data packet and the second data packet via the radio transceiver and the one or more antennas.

In Example 48, the subject matter of Example 46 or 47 can optionally include wherein the high exposure power limit window is a time window that has a larger human radio frequency (RF) exposure power limit than the low exposure power limit window.

In Example 49, the subject matter of any one of Examples 46 to 48 can optionally include wherein the time-dependent exposure power limit is a power limit curve that restricts human RF exposure power to certain levels at different points in time.

In Example 50, the subject matter of any one of Examples 46 to 49 can optionally include wherein the low exposure power limit window is scheduled immediately after the high exposure power limit window.

In Example 51, the subject matter of any one of Examples 46 to 50 can optionally include wherein the controller is further configured to determine that the first data packet has a higher data packet priority than the second data packet.

In Example 52, the subject matter of Example 51 can optionally include wherein the controller is configured to determine that the first data packet has a higher data packet priority than the second data packet based on Quality of Service (QoS) requirements assigned to the first data packet and the second data packet.

In Example 53, the subject matter of any one of Examples 46 to 50 can optionally include wherein the controller is further configured to determine that the first data packet has a higher data packet size than the second data packet.

In Example 54, the subject matter of any one of Examples 51 to 53 can optionally include wherein the controller is configured to determine the first transmission time for the first data packet and the second transmission time for the second data packet by selecting the first transmission time during the high exposure power limit window and selecting the second transmission time during the low exposure power limit window.

Example 55 is a non-transitory compute readable medium storing instructions that, when executed by one or more processors, cause the one or more processors to perform the method of any one of Examples 1 to 26.

Example 56 is a communication device including one or more processors configured to perform the method of any one of Examples 1 to 26.

Example 57 is a communication device including means for transmitting data on a first channel with a first antenna beam and a first transmit power, means for determining an estimated radio frequency (RF) exposure power to a human object based on the first antenna beam and the first transmit power, means for determining whether the estimated RF exposure power is greater than an exposure power threshold, and means for, if the estimated RF exposure power is greater than the exposure power threshold, switching from the first channel to a second channel with narrower bandwidth and transmitting data on the second channel with a second transmit power lower than the first transmit power.

Example 58 is a communication device including means for identifying a high exposure power limit window and a low exposure power limit window in a time-dependent exposure power limit, means for identifying a first data packet and a second data packet scheduled for transmission, means for determining a first transmission time for the first data packet and a second transmission time for the second data packet based on the time-dependent exposure power limit and further based on a data packet priority or a data packet size, and means for transmitting the first data packet at the first transmission time and transmitting the second data packet at the second transmission time.

Example 59 is a method of performing radio communications at a communication device, the method including detecting, with a sensor, one or more objects around the communication device, identifying one or more blocked sectors of an antenna array that are blocked by the one or more objects, selecting, based on the one or more blocked sectors, one or more candidate sectors of the antenna array to evaluate, and determining radio link qualities of the one or more candidate sectors.

In Example 60, the subject matter of Example 59 can optionally include wherein determining radio link qualities of the one or more candidate sectors includes performing a beamsweeping procedure with a network access node to determine the radio link qualities of the one or more candidate sectors.

In Example 61, the subject matter of Example 59 can optionally include wherein determining radio link qualities of the one or more candidate sectors includes performing a sector-level sweep procedure with a network access node to determine the radio link qualities of the one or more candidate sectors.

In Example 62, the subject matter of Example 59 can optionally include wherein determining the radio link quality for a first candidate sector of the one or more candidate sectors includes controlling the antenna array to receive a signal with the first candidate sector, and measuring the signal to obtain the radio link quality the first candidate sector.

In Example 63, the subject matter of Example 62 can optionally include wherein controlling the antenna array to receive the signal with the first candidate sector includes applying a set of complex beamforming weights to the antenna elements of the antenna array with digital beamforming or radio frequency (RF) phased-array beamforming, wherein the set of complex beamforming weights forms the first candidate sector as a radiation pattern of the antenna array.

In Example 64, the subject matter of Example 59 can optionally include wherein determining the radio link quality for a first candidate sector of the one or more candidate sectors includes controlling the antenna array to transmit a signal with the first candidate sector, and receiving a signal from a network access node that indicates the radio link quality for the first candidate sector.

In Example 65, the subject matter of Example 64 can optionally include wherein controlling the antenna array to transmit a signal with the first candidate sector includes applying a set of complex beamforming weights to the antenna elements of the antenna array with digital beamforming or radio frequency (RF) phased-array beamforming, wherein the set of complex beamforming weights forms the first candidate sector as a radiation pattern of the antenna array.

In Example 66, the subject matter of any one of Examples 59 to 65 can optionally include wherein determining radio link qualities of the one or more candidate sectors includes determining radio link qualities for only the one or more candidate sectors.

In Example 67, the subject matter of any one of Examples 59 to 66 can optionally include wherein the antenna array is configured to operate with a plurality of sectors and wherein the one or more blocked sectors are a reduced subset of the plurality of sectors.

In Example 66, the subject matter of any one of Examples 59 to 66 can optionally further include selecting a target sector based on the radio link qualities, and controlling the antenna array to transmit or receive signals with the target sector.

In Example 69, the subject matter of any one of Examples 59 to 66 can optionally further include determining, with the sensor, a sensor direction at which the first object is located relative to the communication device.

In Example 70, the subject matter of Example 69 can optionally include wherein the sensor direction includes an angle or a range of angles relative to the communication device.

In Example 71, the subject matter of any one of Examples 59 to 70 can optionally further include determining, with the sensor, a distance of the first object from the communication device.

In Example 72, the subject matter of any one of Examples 69 to 71 can optionally include wherein identifying the one or more blocked sectors of the antenna array includes identifying a first blocked sector of the one or more blocked sectors by determining that the first blocked sector overlaps directionally with the sensor direction of the first object.

In Example 73, the subject matter of Example 72 can optionally include wherein the sensor direction of the first object is a first angular range relative to the communication device and wherein a plurality of sectors of the antenna array each occupy a respective angular range relative to the communication device, and wherein identifying the first blocked sector includes comparing the first angular range to the respective angular ranges of the plurality of sectors, and determining that the first angular range overlaps with the angular range of the first blocked sector.

In Example 74, the subject matter of any one of Examples 59 to 73 can optionally include wherein selecting the one or more candidate sectors of the antenna array to evaluate includes identifying, from a plurality of sectors of the antenna array, one or more unblocked sectors that are not partially or fully blocked by the one or more objects, and including the one or more unblocked sectors in the one or more candidate sectors.

In Example 75, the subject matter of any one of Examples 59 to 73 can optionally include wherein selecting the one or more candidate sectors of the antenna array to evaluate includes determining, for the one or more blocked sectors, blocking levels that indicate an amount that each of the one or more blocked sectors is blocked by the one or more objects, and selecting the one or more candidate sectors based on the blocking levels.

In Example 76, the subject matter of Example 75 can optionally include wherein selecting the one or more candidate sectors based on the blocking levels includes identifying a subset of the one or more blocked sectors with blocking levels less than a predefined blocking level threshold, and including the subset of the one or more blocked sectors in the one or more candidate sectors.

In Example 77, the subject matter of any one of Examples 59 to 73 can optionally include wherein selecting the one or more candidate sectors of the antenna array to evaluate includes selecting a subset of the one or more blocked sectors based on a distance of the one or more objects from the communication device, and including the subset of the one or more blocked sectors in the one or more candidate sectors.

In Example 78, the subject matter of any one of Examples 59 to 73 can optionally include wherein selecting the one or more candidate sectors of the antenna array to evaluate includes identifying, from the one or more blocked sectors, one or more human-blocked sectors that are blocked by a human object, estimating maximum allowable transmit powers for the one or more human-blocked sectors, and selecting the one or more candidate sectors based on the maximum allowable transmit powers.

In Example 79, the subject matter of Example 78 can optionally include wherein selecting the one or more candidate sectors based on the maximum allowable transmit powers includes identifying a subset of the one or more human blocked sectors with maximum allowable transmit powers greater than a predefined threshold, and including the subset of the one or more human blocked sectors in the one or more candidate sectors.

In Example 80, the subject matter of Example 78 or 79 can optionally include wherein estimating the maximum allowable transmit powers for a first human-blocked sector of the one or more human-blocked sectors includes determining a distance from the communication device that a human object is in the first human-blocked sector, and estimating the maximum allowable transmit power for the first human-blocked sector based on the distance.

In Example 81, the subject matter of any one of Examples 78 to 80 can optionally further include selecting a target sector based on the radio link qualities and the maximum allowable transmit powers, and controlling the antenna array to transmit or receive signals with the target sector.

In Example 82, the subject matter of any one of Examples 59 to 81 can optionally include wherein the sensor is an infrared sensor, a capacitive sensor, a resistive sensor, an optical sensor, a piezoelectric sensor, a camera, a microphone, or a radar sensor.

In Example 83, the subject matter of any one of Examples 59 to 80 can optionally include wherein the sensor includes the antenna array and a radar controller, and wherein detecting the one or more objects around the communication device includes controlling the antenna array to transmit a transmit signal, controlling the antenna array to receive, as a reflected signal, the transmit signal after the transmit signal reflects back off the one or more objects, and processing the reflected signal to detect the one or more objects.

In Example 84, the subject matter of Example 83 can optionally include wherein processing the reflected signal to detect the one or more objects includes detecting the one or more objects based on a phase difference between the transmit signal and the reflected signal.

In Example 85, the subject matter of Example 83 or 84 can optionally further include classifying the one or more objects as human or non-human based on the reflected signal by processing the reflected signal to detect Doppler or micro-Doppler effects in the reflected signal, and classifying the first object as a human object based on the Doppler or micro-Doppler effects.

In Example 86, the subject matter of Example 83 or 84 can optionally further include classifying the one or more objects as human or non-human based on the reflected signal by determining, based on the reflected signal, a distance of the first object from the communication device, and correlating the distance with a reflectivity of the first object to determine a correlation, and classifying the first object as a human object based on the correlation.

In Example 87, the subject matter of Example 83 or 84 can optionally further include classifying the one or more objects as human or non-human based on the reflected signal by measuring, based on the reflected signal, a reflectivity of the first object across a frequency range to determine a frequency signature, and comparing the frequency signature with a pre-characterized human tissue frequency signature, and classifying the first object as a human object based on the comparing.

Example 88 is a method of performing radio communications at a communication device, the method including detecting, with a sensor, one or more human objects around the communication device, identifying one or more human-blocked sectors of an antenna array that are blocked by the one or more human objects, estimating a maximum allowable transmit power for the one or more human-blocked sectors, selecting one or more candidate sectors of the antenna array to evaluate based on maximum allowable transmit powers, and determining radio link qualities of the one or more candidate sectors.

In Example 89, the subject matter of Example 88 can optionally include wherein detecting with the sensor the one or more human objects includes detecting, with the sensor, a plurality of objects around the communication device, and determining that a first object of the plurality objects is a human object and including the first object in the one or more human objects.

In Example 90, the subject matter of Example 88 can optionally include wherein the sensor is a radar, and wherein determining that the first object is a human object includes controlling the radar to transmit a transmit signal that radiates outward from the communication device, controlling the radar to receive, as a reflected signal, the transmit signal after the transmit signal reflects back off first object, and classifying the first object as a human object based on the reflected signal.

In Example 91, the subject matter of Example 90 can optionally include wherein classifying the first object as a human object based on the reflected signal includes processing the reflected signal to detect Doppler or micro-Doppler effects in the reflected signal, and classifying the first object as a human object based on the Doppler or micro-Doppler effects.

In Example 92, the subject matter of Example 90 can optionally include wherein classifying the first object as a human object based on the reflected signal includes determining, based on the reflected signal, a distance of the first object from the communication device, and correlating the distance with a reflectivity of the first object to determine a correlation, and classifying the first object as a human object based on the correlation.

In Example 93, the subject matter of Example 90 can optionally include wherein classifying the first object as a human object based on the reflected signal includes measuring, based on the reflected signal, a reflectivity of the first object across a frequency range to determine a frequency signature, and comparing the frequency signature with a pre-characterized human tissue frequency signature, and classifying the first object as a human object based on the comparing.

In Example 94, the subject matter of any one of Examples 90 to 93 can optionally include wherein the radar includes the antenna array and a radar controller.

In Example 95, the subject matter of Example 94 can optionally include wherein controlling the radar to transmit the transmit signal includes controlling, with the radar controller, the antenna array to transmit the transmit signal, and wherein controlling the radar to receive the reflected signal includes controlling, with the radar controller, the antenna array to receive the reflected signal.

In Example 96, the subject matter of any one of Examples 88 to 95 can optionally include wherein selecting one or more candidate sectors of the antenna array to evaluate based on the maximum allowable transmit powers includes identifying a subset of the one or more human-blocked sectors with maximum allowable transmit powers greater than a predefined threshold, and including the subset of the one or more human-blocked sectors in the one or more candidate sectors.

In Example 97, the subject matter of any one of Examples 88 to 96 can optionally further include detecting, with the sensor, one or more non-human objects around the communication device, identifying one or more non-human blocked sectors of the antenna array that are blocked by the one or more non-human objects, and including a subset of the one or more non-human blocked sectors in the one or more candidate sectors for which radio link qualities are evaluated.

In Example 98, the subject matter of Example 97 can optionally further include selecting a target sector based on the radio link qualities and the maximum allowable transmit powers, and controlling the antenna array to transmit or receive signals with the target sector.

In Example 99, the subject matter of Example 98 can optionally include wherein selecting the target sector based on the radio link qualities and the maximum allowable transmit powers includes scaling down the radio link qualities of the one or more human-blocked sectors based on their respective maximum allowable transmit powers to obtain weighted radio link qualities for the one or more human-blocked sectors, and selecting, as the target sector, the sector of the one or more candidate sectors that has the radio link quality or the weighted radio link quality with the highest value.

In Example 100, the subject matter of any one of Examples 88 to 96 can optionally further include selecting a target sector based on the radio link qualities and the maximum allowable transmit powers, and controlling the antenna array to transmit or receive signals with the target sector.

In Example 101, the subject matter of any one of Examples 88 to 100 can optionally include wherein determining radio link qualities of the one or more candidate sectors includes performing a beamsweeping procedure with a network access node to determine the radio link qualities of the one or more candidate sectors.

In Example 102, the subject matter of any one of Examples 88 to 100 can optionally include wherein determining radio link qualities of the one or more candidate sectors includes performing a sector-level sweep procedure with a network access node to determine the radio link qualities of the one or more candidate sectors.

In Example 103, the subject matter of any one of Examples 88 to 100 can optionally include wherein determining the radio link quality for a first candidate sector of the one or more candidate sectors includes controlling the antenna array to receive a signal with the first candidate sector, and measuring the signal to obtain the radio link quality the first candidate sector.

In Example 104, the subject matter of Example 103 can optionally include wherein controlling the antenna array to receive the signal with the first candidate sector includes controlling the antenna array to apply a set of complex beamforming weights to the antenna elements of the antenna array, wherein the set of complex beamforming weights forms the first candidate sector as a radiation pattern of the antenna array.

In Example 105, the subject matter of any one of Examples 88 to 100 can optionally include wherein determining the radio link quality for a first candidate sector of the one or more candidate sectors includes controlling the antenna array to transmit a signal with the first candidate sector, and receiving a signal from a network access node that indicates the radio link quality for the first candidate sector.

In Example 106, the subject matter of Example 105 can optionally include wherein determining the radio link quality for a first candidate sector includes controlling the antenna array to apply a set of complex beamforming weights to the antenna elements of the antenna array, wherein the set of complex beamforming weights forms the first candidate sector as a radiation pattern of the antenna array.

In Example 107, the subject matter of any one of Examples 88 to 107 can optionally include wherein determining radio link qualities of the one or more candidate sectors includes determining radio link qualities for only the one or more candidate sectors.

Example 108 is a communication device including a sensor configured to detect one or more objects around the communication device, and a controller configured to identify one or more blocked sectors of an antenna array that are blocked by the one or more objects, select, based on the one or blocked sectors, one or more candidate sectors of the antenna array to evaluate, and determine radio link qualities of the one or more candidate sectors.

In Example 109, the subject matter of Example 108 can optionally further include the antenna array and a radio transceiver.

In Example 110, the subject matter of Example 108 can optionally further include a digital transmitter and a digital receiver that are connected to the controller, wherein the digital transmitter is configured to transmit signals via the antenna array and the radio transceiver and wherein the digital receiver is configured to receive signals via the antenna array and the radio transceiver.

In Example 111, the subject matter of any one of Examples 108 to 110 can optionally include wherein the controller is configured to determine the radio link qualities of the one or more candidate sectors by performing a beamsweeping procedure with a network access node to determine the radio link qualities of the one or more candidate sectors.

In Example 112, the subject matter of any one of Examples 108 to 110 can optionally include wherein the controller is configured to determine the radio link qualities of the one or more candidate sectors by performing a sector-level sweep procedure with a network access node to determine the radio link qualities of the one or more candidate sectors.

In Example 113, the subject matter of any one of Examples 108 to 110 can optionally include wherein the controller is configured to determine the radio link quality for a first candidate sector of the one or more candidate sectors by controlling the antenna array to receive a signal with the first candidate sector, and controlling a digital receiver to measure the signal to obtain the radio link quality the first candidate sector.

In Example 114, the subject matter of Example 113 can optionally include wherein the controller is configured to control the antenna array to receive the signal with the first candidate sector by applying a set of complex beamforming weights to the antenna elements of the antenna array with digital beamforming or radio frequency (RF) phased-array beamforming, wherein the set of complex beamforming weights forms the first candidate sector as a radiation pattern of the antenna array.

In Example 115, the subject matter of any one of Examples 108 to 110 can optionally include wherein the controller is configured to determine the radio link quality for a first candidate sector of the one or more candidate sectors by controlling the antenna array to transmit a signal with the first candidate sector, and controlling a digital receiver to receive a signal from a network access node that indicates the radio link quality for the first candidate sector.

In Example 116, the subject matter of Example 115 can optionally include wherein the controller is configured to control the antenna array to transmit the signal with the first candidate sector by applying a set of complex beamforming weights to the antenna elements of the antenna array with digital beamforming or radio frequency (RF) phased-array beamforming, wherein the set of complex beamforming weights forms the first candidate sector as a radiation pattern of the antenna array.

In Example 117, the subject matter of any one of Examples 108 to 116 can optionally include wherein the controller is configured to determine radio link qualities for only the one or more candidate sectors.

In Example 118, the subject matter of any one of Examples 108 to 117 can optionally include wherein the antenna array is configured to operate with a plurality of sectors and wherein the one or more blocked sectors are a reduced subset of the plurality of sectors.

In Example 119, the subject matter of any one of Examples 108 to 118 can optionally include wherein the controller is further configured to select a target sector based on the radio link qualities, and control the antenna array to transmit or receive signals with the target sector.

In Example 120, the subject matter of any one of Examples 108 to 119 can optionally include wherein the sensor is configured to determine a sensor direction at which the first object is located relative to the communication device.

In Example 121, the subject matter of Example 120 can optionally include wherein the sensor direction includes an angle or a range of angles relative to the communication device.

In Example 122, the subject matter of any one of Examples 108 to 121 can optionally include wherein the sensor is further configured to determine a distance of the first object from the communication device.

In Example 123, the subject matter of any one of Examples 120 to 122 can optionally include wherein the controller is configured to identify the one or more blocked sectors of the antenna array by identifying a first blocked sector of the one or more sectors by determining that the first blocked sector overlaps directionally with the sensor direction of the first object.

In Example 124, the subject matter of Example 123 can optionally include wherein the sensor direction of the first object is a first angular range relative to the communication device and wherein a plurality of sectors of the antenna array each occupy a respective angular range relative to the communication device, and wherein the controller is configured to identify the first blocked sector by comparing the first angular range to the respective angular ranges of the plurality of sectors, and determining that the first angular range overlaps with the angular range of the first blocked sector.

In Example 125, the subject matter of any one of Examples 108 to 124 can optionally include wherein the controller is configured to select the one or more candidate sectors of the antenna array to evaluate by identifying, from a plurality of sectors of the antenna array, one or more unblocked sectors that are not partially or fully blocked by the one or more objects, and including the one or more unblocked sectors in the one or more candidate sectors.

In Example 125, the subject matter of any one of Examples 108 to 124 can optionally include wherein the controller is configured to select the one or more candidate sectors of the antenna array to evaluate by determining, for the one or more blocked sectors, blocking levels that indicate an amount that each of the one or more blocked sectors is blocked by the one or more objects, and selecting the one or more candidate sectors based on the blocking levels.

In Example 127, the subject matter of Example 125 can optionally include wherein the controller is configured to select the one or more candidate sectors based on the blocking levels by identifying a subset of the one or more blocked sectors with blocking levels less than a predefined blocking level threshold, and including the subset of the one or more blocked sectors in the one or more candidate sectors.

In Example 128, the subject matter of any one of Examples 108 to 124 can optionally include wherein controller is configured to select the one or more candidate sectors of the antenna array to evaluate by selecting a subset of the one or more blocked sectors based on a distance of the one or more objects from the communication device, and including the subset of the one or more blocked sectors in the one or more candidate sectors.

In Example 129, the subject matter of any one of Examples 108 to 124 can optionally include wherein the controller is configured to select the one or more candidate sectors of the antenna array to evaluate by identifying, from the one or more blocked sectors, one or more human-blocked sectors that are blocked by a human object, estimating maximum allowable transmit powers for the one or more human-blocked sectors, and selecting the one or more candidate sectors based on the maximum allowable transmit powers.

In Example 130, the subject matter of Example 129 can optionally include wherein the controller is configured to select the one or more candidate sectors based on the maximum allowable transmit power by identifying a subset of the one or more human blocked sectors with maximum allowable transmit powers less than a predefined threshold, and including the subset of the one or more human blocked sectors in the one or more candidate sectors.

In Example 131, the subject matter of Example 129 or 130 can optionally include wherein the controller is configured to estimate the maximum allowable transmit powers for a first human-blocked sector of the one or more human-blocked sectors by determining a distance from the communication device that a human object is in the first human-blocked sector, and estimating the maximum allowable transmit power for the first human-blocked sector based on the distance.

In Example 132, the subject matter of any one of Examples 129 to 131 can optionally include wherein the controller is further configured to select a target sector based on the radio link qualities and the maximum allowable transmit powers, and control the antenna array to transmit or receive signals with the target sector.

In Example 133, the subject matter of any one of Examples 108 to 132 can optionally include wherein the sensor is an infrared sensor, a capacitive sensor, a resistive sensor, an optical sensor, a piezoelectric sensor, a camera, a microphone, or a radar sensor.

In Example 134, the subject matter of any one of Examples 108 to 132 can optionally include wherein the sensor includes the antenna array and a radar controller, and wherein the radar controller is configured to detect the one or more objects around the communication device by controlling the antenna array to transmit a transmit signal, controlling the antenna array to receive, as a reflected signal, the transmit signal after the transmit signal reflects back off the one or more objects, and processing the reflected signal to detect the one or more objects.

In Example 135, the subject matter of any one of Examples 108 to 132 can optionally include wherein the radar controller is configured to process the reflected signal to detect the one or more objects by detecting the one or more objects based on a phase difference between the transmit signal and the reflected signal.

In Example 136, the subject matter of Example 134 or 135 can optionally include wherein the radar controller is configured to classify the one or more objects as human or non-human based on the reflected signal by processing the reflected signal to detect Doppler or micro-Doppler effects in the reflected signal, and classifying the first object as a human object based on the Doppler or micro-Doppler effects.

In Example 137, the subject matter of Example 134 or 135 can optionally include wherein the radar controller is configured to classify the one or more objects as human or non-human based on the reflected signal by determining, based on the reflected signal, a distance of the first object from the communication device, and correlating the distance with a reflectivity of the first object to determine a correlation, and classifying the first object as a human object based on the correlation.

In Example 138, the subject matter of Example 134 or 135 can optionally include wherein the radar controller is configured to classify the one or more objects as human or non-human based on the reflected signal by measuring, based on the reflected signal, a reflectivity of the first object across a frequency range to determine a frequency signature, comparing the frequency signature with a pre-characterized human tissue frequency signature, and classifying the first object as a human object based on the comparing.

Example 139 is a communication device including a sensor configured to detect one or more human objects around the communication device, and a controller configured to identify one or more human-blocked sectors of an antenna array that are blocked by one or more human objects, estimate a maximum allowable transmit power for the one or more human-blocked sectors, select one or more candidate sectors of the antenna array to evaluate based on maximum allowable transmit powers, and determine radio link qualities of the one or more candidate sectors.

In Example 140, the subject matter of Example 139 can optionally further include the antenna array and a radio transceiver.

In Example 141, the subject matter of Example 139 can optionally further include a digital transmitter and a digital receiver that are connected to the controller, wherein the digital transmitter is configured to transmit signals via the antenna array and the radio transceiver and wherein the digital receiver is configured to receive signals via the antenna array and the radio transceiver.

In Example 142, the subject matter of any one of Examples 139 to 141 can optionally include wherein the sensor is configured to detect the one or more human objects by detecting a plurality of objects around the communication device, and determining that a first object of the plurality objects is a human object and including the first object in the one or more human objects.

In Example 143, the subject matter of Example 142 can optionally include wherein the sensor is a radar, and wherein the sensor is configured to determine that the first object is a human object by controlling the radar to transmit a transmit signal that radiates outward from the communication device, controlling the radar to receive, as a reflected signal, the transmit signal after the transmit signal reflects back off first object, and classifying the first object as a human object based on the reflected signal.

In Example 144, the subject matter of Example 143 can optionally include wherein the sensor is configured to classify the first object as a human object based on the reflected signal by processing the reflected signal to detect Doppler or micro-Doppler effects in the reflected signal, and classifying the first object as a human object based on the Doppler or micro-Doppler effects.

In Example 145, the subject matter of Example 143 can optionally include wherein the sensor is configured to classify the first object as a human object based on the reflected signal by determining, based on the reflected signal, a distance of the first object from the communication device, correlating the distance with a reflectivity of the first object to determine a correlation, and classifying the first object as a human object based on the correlation.

In Example 146, the subject matter of Example 143 can optionally include wherein the sensor is configured to classify the first object as a human object based on the reflected signal by measuring, based on the reflected signal, a reflectivity of the first object across a frequency range to determine a frequency signature, comparing the frequency signature with a pre-characterized human tissue frequency signature, and classifying the first object as a human object based on the comparing.

In Example 147, the subject matter of any one of Examples 143 to 146 can optionally include wherein the radar includes the antenna array and a radar controller.

In Example 148, the subject matter of Example 147 can optionally include wherein the sensor is configured to control the radar to transmit the transmit signal by controlling, with the radar controller, the antenna array to transmit the transmit signal, and wherein the sensor is configured to control the radar to receive the reflected signal includes by controlling, with the radar controller, the antenna array to receive the reflected signal.

In Example 149, the subject matter of any one of Examples 139 to 148 can optionally include wherein the controller is configured to select the one or more candidate sectors of the antenna array to evaluate based on the maximum allowable transmit powers by identifying a subset of the one or more human-blocked sectors with maximum allowable transmit powers greater than a predefined threshold, and including the subset of the one or more human-blocked sectors in the one or more candidate sectors.

In Example 150, the subject matter of any one of Examples 139 to 149 can optionally include wherein the sensor is further configured to detect one or more non-human objects around the communication device, and wherein the controller is further configured to identify one or more non-human blocked sectors of the antenna array that are blocked by the one or more non-human objects, and to include a subset of the one or more non-human blocked sectors in the one or more candidate sectors for which radio link qualities are evaluated.

In Example 151, the subject matter of Example 150 can optionally include wherein the controller is further configured to select a target sector based on the radio link qualities and the maximum allowable transmit powers, and to control the antenna array to transmit or receive signals with the target sector.

In Example 152, the subject matter of Example 151 can optionally include wherein the controller is configured to select the target sector based on the radio link qualities and the maximum allowable transmit powers by scaling down the radio link qualities of the one or more human-blocked sectors based on their respective maximum allowable transmit powers to obtain weighted radio link qualities for the one or more human-blocked sectors, and selecting, as the target sector, the sector of the one or more candidate sectors that has the radio link quality or the weighted radio link quality with the highest value.

In Example 153, the subject matter of any one of Examples 139 to 152 can optionally include wherein the controller is further configured to select a target sector based on the radio link qualities and the maximum allowable transmit powers, and to control the antenna array to transmit or receive signals with the target sector.

In Example 154, the subject matter of any one of Examples 139 to 153 can optionally include wherein the controller is configured to determine the radio link qualities for the one or more candidate sectors by performing a beamsweeping procedure with a network access node to determine the radio link qualities of the one or more candidate sectors.

In Example 155, the subject matter of any one of Examples 139 to 154 can optionally include wherein the controller is configured to determine the radio link qualities for the one or more candidate sectors by performing a sector-level sweep procedure with a network access node to determine the radio link qualities of the one or more candidate sectors.

In Example 156, the subject matter of any one of Examples 139 to 155 can optionally include wherein the controller is configured to determine the radio link quality for a first candidate sector of the one or more candidate sectors by controlling the antenna array to receive a signal with the first candidate sector, and measuring the signal to obtain the radio link quality the first candidate sector.

In Example 157, the subject matter of Example 156 can optionally include wherein the controller is configured to control the antenna array to receive the signal with the first candidate sector by controlling the antenna array to apply a set of complex beamforming weights to the antenna elements of the antenna array, wherein the set of complex beamforming weights forms the first candidate sector as a radiation pattern of the antenna array.

In Example 158, the subject matter of any one of Examples 139 to 155 can optionally include wherein the controller is configured to determine the radio link quality for a first candidate sector of the one or more candidate sectors by controlling the antenna array to transmit a signal with the first candidate sector, and receiving a signal from a network access node that indicates the radio link quality for the first candidate sector.

In Example 159, the subject matter of Example 158 can optionally include wherein the controller is configured to control the antenna array to transmit the signal with the first candidate sector by controlling the antenna array to apply a set of complex beamforming weights to the antenna elements of the antenna array, wherein the set of complex beamforming weights forms the first candidate sector as a radiation pattern of the antenna array.

In Example 160, the subject matter of any one of Examples 139 to 155 can optionally include wherein the controller is configured to determine the radio link qualities for only the one or more candidate sectors.

Example 161 is a non-transitory computer readable medium storing instructions that, when executed by one or more processors of a communication device, cause the communication device to perform the method of any one of Examples 59 to 107.

Example 162 is a communication device including one or more processors configured to perform the method of any one of Examples 59 to 107.

In Example 163, the subject matter of Example(s) 163 may include a communication device including an evaluator configured to evaluate one or more criteria, wherein a first criterion of the one or more criteria includes detecting an object; a determiner configured to determine one or more beam pairs from a plurality of potential beam pairs to use in communications with a second device based on the evaluation of the one or more criteria and transmit an indication of one or more partner-side beams of a selected beam pair of the one or more beam pairs to the second device; and a beam controller configured to adjust an antenna to communicate with the second device via a device-side beam of the selected beam pair.

In Example 164, the subject matter of Example(s) 163 may include wherein the object is an animate object.

In Example 165, the subject matter of Example(s) 164 may include wherein the animate object is a human body.

In Example 166, the subject matter of Example(s) 165 may include one or more detectors configured to detect the object.

In Example 167, the subject matter of Example(s) 166 may include wherein the one or more detectors include one or more of a passive infrared sensor, a capacitive sensor, a resistive sensor, an optical sensor, a piezoelectric sensor, a camera, a microphone, a proximity sensor, a proximity detector, or a radar detector.

In Example 168, the subject matter of Example(s) 163-167 may include wherein the one or more criteria includes a maximum power exposure (MPE) threshold to electromagnetic radiation.

In Example 169, the subject matter of Example(s) 168 may include wherein the MPE threshold is defined by a regulatory authority.

In Example 170, the subject matter of Example(s) 168-169 may include wherein the determiner is configured to determine the one or more beam pairs based on the detection of the object and the MPE threshold.

In Example 171, the subject matter of Example(s) 170 may include wherein the determiner is configured to determine the one or more beam pairs by determining which of the plurality of potential beam pairs do not exceed the MPE threshold in a direction of the detected object.

In Example 172, the subject matter of Example(s) 163-171 may include wherein the one or more criteria includes a channel quality between the communication device and the second device for the plurality of potential beam pairs.

In Example 173, the subject matter of Example(s) 172 may include wherein the one or more criteria includes a channel quality between the communication device and the second device for the one or more beam pairs.

In Example 174, the subject matter of Example(s) 172-173 may include wherein the determiner is configured to select the selected beam pair from the one or more beam pairs based on having the highest channel quality.

In Example 175, the subject matter of Example(s) 172-174 may include wherein the determiner is configured to measure each respective channel quality of the plurality of potential beam pairs from one or more reference signals on each of the plurality of potential beam pairs.

In Example 176, the subject matter of Example(s) 172-175 may include wherein the determiner is configured to measure each respective channel quality of the one or more beam pairs from one or more reference signals on each of the one or more beam pairs.

In Example 177, the subject matter of Example(s) 175-176 may include wherein the measuring of each of the respective channel quality of the one or more reference signals includes measuring L1-RSRP.

In Example 178, the subject matter of Example(s) 175-177 may include wherein the measuring of each of the respective channel quality of the one or more reference signals includes measuring a signal-to-interference-plus-noise ratio (SINR).

In Example 179, the subject matter of Example(s) 175-178 may include wherein the measuring of each of the respective channel quality of the one or more reference signals includes measuring a mutual information (MI) between a transmitted signal and a corresponding received signal.

In Example 180, the subject matter of Example(s) 163-179 may include wherein the determiner is configured to transmit the indication to the second device via a beam recovery request to the second device.

In Example 181, the subject matter of Example(s) 180 may include wherein the beam recovery requests includes the one or more partner-side beams.

In Example 182, the subject matter of Example(s) 181 may include wherein the beam recovery request includes a priority order of the one or more partner-side beams, wherein at least one of the one or more partner-side beams has highest priority.

In Example 183, the subject matter of Example(s) 163-182 may include wherein the communication device is configured to switch to the device-side beam according to a scheduling parameter with the second device.

In Example 184, the subject matter of Example(s) 163-183 may include a receiver configured to receive a downlink control information (DCI) from the second device after the adjustment to the device-side beam.

In Example 185, the subject matter of Example(s) 163-184 may include the evaluator configured to update the evaluation of the one or more criteria.

In Example 186, the subject matter of Example(s) 185 may include the determiner configured to determine one or more updated beam pairs from the plurality of potential beam pairs based on the updated evaluation of the one or more criteria.

In Example 187, the subject matter of Example(s) 186 may include wherein the beam controller is configured to adjust the device-side beam to an updated device-side beam selected from the one or more updated beam pairs and transmit an updated one or more partner-side beams to the second device.

In Example 188, the subject matter of Example(s) 163-187 may include the antenna including one or more antenna arrays each including a plurality of antenna elements.

In Example 189, the subject matter of Example(s) 188 may include wherein the beam controller adjusts the antenna by controlling beamforming weights, including a gain factor or a phase factor, applied to each the plurality of antenna elements.

In Example 190, a communication device including a beam controller configured to control an antenna to communicate with a second device via a device-side beam of a beam pair, wherein the second device communicates with the communication device via a partner-side beam of the beam pair; an evaluator configured to evaluate one or more criteria; and a determiner configured to update the beam pair based on the evaluation of the one or more criteria, wherein the beam controller adjusts the device-side beam to an updated device-side beam of the updated beam pair, and the updated partner-side beam of the beam pair is communicated to the second device.

In Example 191, the subject matter of Example(s) 190 may include wherein the evaluation of the one or more criteria includes one or more of a detection of an object, a maximum power exposure (MPE) to electromagnetic radiation, or a channel quality between the communication device and the second device for the one or more beam pairs.

In Example 192, a communication device including one or more processors configured to evaluate one or more criteria; determine one or more beam pairs from a plurality of potential beam pairs to use in communications with a second device based on the one or more criteria; transmit an indication of a one or more partner-side beams of a selected beam pair of the one or more beam pairs to the second device; and adjust an antenna of the communication device to communicate with the second device via a device-side beam of the selected beam pair.

In Example 193, a communication device including means to evaluate one or more criteria; means to determine one or more beam pairs from a plurality of potential beam pairs to use in communications with a second device based on the one or more criteria; means to transmit an indication of a one or more partner-side beams of a selected beam pair of the one or more beam pairs to the second device; and means to adjust an antenna of the communication device to communicate with the second device via a device-side beam of the selected beam pair.

In Example 194, a method for a communication device to conduct wireless communications, the method including evaluating one or more criteria, wherein the one or more criteria includes detecting an object; determining one or more beam pairs from a plurality of potential beam pairs to use in communications with a second device based on the one or more criteria; transmitting an indication of a one or more partner-side beams of a selected beam pair of the one or more beam pairs to the second device; and adjusting an antenna of the communication device to communicate with the second device via a device-side beam of the selected beam pair.

In Example 195, the subject matter of Example(s) 194 may include wherein the object is an animate object.

In Example 196, the subject matter of Example(s) 195 may include wherein the animate object is a human body.

In Example 197, the subject matter of Example(s) 194-196 may include detecting the object with one or more detectors of the communication device.

In Example 198, the subject matter of Example(s) 197 may include wherein the one or more detectors include one or more of a passive infrared sensor, a capacitive sensor, a resistive sensor, an optical sensor, a piezoelectric sensor, a camera, a proximity sensor, a proximity detector, or a radar detector.

In Example 199, the subject matter of Example(s) 194-198 may include wherein evaluating the one or more criteria includes evaluating a maximum power exposure (MPE) threshold to electromagnetic radiation.

In Example 200, the subject matter of Example(s) 199 may include wherein the MPE is defined by a regulatory authority.

In Example 201, the subject matter of Example(s) 199-200 may include wherein the determining of the one or more beam pairs is based on the detection of the object and the MPE threshold.

In Example 202, the subject matter of Example(s) 201 may include determining the one or more beam pairs by determining which of the plurality of potential beam pairs do not exceed the MPE threshold in a direction of the detected object.

In Example 203, the subject matter of Example(s) 194-202 may include wherein evaluating of the one or more criteria includes measuring a channel quality between the communication device and the second device for the plurality of potential beam pairs.

In Example 204, the subject matter of Example(s) 203 may include wherein evaluating of the one or more criteria includes measuring a channel quality between the communication device and the second device for the one or more beam pairs.

In Example 205, the subject matter of Example(s) 203-204 may include selecting the selected beam pair from the one or more beam pairs based on having the highest channel quality.

In Example 206, the subject matter of Example(s) 203-205 may include measuring each respective channel quality of the plurality of potential beam pairs from one or more reference signals on each of the plurality of potential beam pairs.

In Example 207, the subject matter of Example(s) 203-206 may include measuring each respective channel quality of the one or more beam pairs from one or more reference signals on each of the one or more beam pairs.

In Example 208, the subject matter of Example(s) 206-207 may include wherein the measuring of each of the respective channel quality of the one or more reference signals includes measuring L1-RSRP.

In Example 209, the subject matter of Example(s) 206-208 may include wherein the measuring of each of the respective channel quality of the one or more reference signals includes measuring a signal-to-interference-plus-noise ratio (SINR).

In Example 210, the subject matter of Example(s) 206-209 may include wherein the measuring of each of the respective channel quality of the one or more reference signals includes measuring a mutual information (MI) between a transmitted signal and a corresponding received signal.

In Example 211, the subject matter of Example(s) 194-210 may include transmitting the indication to the second device via a beam recovery request to the second device.

In Example 212, the subject matter of Example(s) 211 may include wherein the beam recovery requests includes the one or more partner-side beams.

In Example 213, the subject matter of Example(s) 212 may include wherein the beam recovery request includes a priority order of the one or more partner-side beams, wherein at least one of the one or more partner-side beams has highest priority.

In Example 214, the subject matter of Example(s) 194-213 may include switching to the device-side beam according to a scheduling parameter with the second device.

In Example 215, the subject matter of Example(s) 194-214 may include receiving a downlink control information (DCI) from the second device after the adjustment to the device-side beam.

In Example 216, the subject matter of Example(s) 194-216 may include updating the evaluation of the one or more criteria.

In Example 217, the subject matter of Example(s) 216 may include determining an updated one or more beam pairs from the plurality of potential beam pairs based on the updated evaluation of the one or more criteria.

In Example 218, a method for a communication device to perform wireless communications, the method including communicating with a second device via a device-side beam of a beam pair, wherein the second device communicates with the communication device via a partner-side beam of the beam pair; evaluating one or more criteria; and updating a beam pair based on the evaluation of the one or more criteria, wherein the updating of the beam pair includes adjusting the device-side beam to an updated device-side beam of the updated beam pair, and communicating an updated partner-side beam of the updated beam pair to the second device.

In Example 219, the subject matter of Example(s) 218 may include wherein the evaluation of the one or more criteria includes one or more of a detection of an object, a maximum power exposure (MPE) to electromagnetic radiation, or a channel quality between the communication device and the second device for the one or more beam pairs.

In Example 220, one or more non-transitory computer-readable media storing instructions thereon that, when executed by at least one processor of a communication device, direct the communication device to perform the method of any one of Examples 194-219.

In Example 221, a communication device including one or more detectors configured to detect one or more objects; a beam controller configured to control one or more antenna arrays to generate a plurality of beams according to a beam scheme based on the one or more detected objects, wherein the beam scheme implements the plurality of beams according to at least one of: over an angular range with respect to the communication device, wherein a first beam of the plurality of beams has a different angle with respect to the communication device than a second beam of the plurality of beams, and each beam of the plurality of beams is maintained based on a predetermined time pattern, or a selective widening or narrowing of at least one beam of the plurality of beams with respect to another beam of the plurality of beams.

In Example 222, the subject matter of Example(s) 221 may include wherein the beam controller is configured to implement the plurality of beams over an angular range with respect to the communication device and the selective widening or narrowing.

In Example 223, the subject matter of Example(s) 221-222 may include wherein each of the plurality of beams' respective angles are selected from a plurality of angles in a predefined set.

In Example 224, the subject matter of Example(s) 223 may include wherein each angle in the predefined set has a discrete angular change with respect to at least one other angle in the predefined set.

In Example 225, the subject matter of Example(s) 221-224 may include wherein the beam controller is configured to schedule the plurality of beams to cover the angular range according to a round robin mechanism.

In Example 226, the subject matter of Example(s) 225 may include wherein the beam controller determines a repetition period of each cycle of the round robin mechanism based on a maximum power exposure (MPE) threshold.

In Example 227, the subject matter of Example(s) 226 may include wherein the MPE threshold is determined based on one or more regulations or rules by a regulatory authority.

In Example 228, the subject matter of Example(s) 221-227 may include wherein the selective widening or narrowing of the at least one beam of the plurality of beams with respect to the other beam of the plurality of beams is based on a maximum power exposure (MPE) threshold.

In Example 229, the subject matter of Example(s) 228 may include wherein a total transmission power of the selective widening or narrowing of the at least one beam of the plurality of beams with respect to the other beam of the plurality of beams remains the same.

In Example 230, the subject matter of Example(s) 228-229 may include wherein the widening or narrowing is performed in at least one of a horizontal, a vertical, or a planar direction with respect to a communication partner device.

In Example 231, the subject matter of Example(s) 221-230 may include wherein the beam controller is configured to dynamically select between implementing the beam scheme over the angular range and the selective widening or narrowing of at least one beam.

In Example 232, the subject matter of Example(s) 231 may include a measurer configured to measure channel conditions, wherein the dynamic selection is based on the measured channel conditions.

In Example 233, the subject matter of Example(s) 231-232 may include wherein the beam controller is configured to determine between line-of-sight (LoS) channel conditions and multi-path channel conditions based on the measurement of one or more channel parameters.

In Example 234, the subject matter of Example(s) 233 may include wherein a first of the one or more channel parameters is a delay spread measured in one or more received signals.

In Example 235, the subject matter of Example(s) 234 may include wherein the one or more received signals include one or more downlink signals received from a base station, and the one or more downlink signals are spatially associated to one or more uplink channels.

In Example 236, the subject matter of Example(s) 235 may include wherein the beam controller compares the delay spread to a predefined delay spread threshold.

In Example 237, the subject matter of Example(s) 236 may include wherein when the delay spread is greater than the threshold, the beam controller dynamically selects the implementing the beam scheme over the angular range.

In Example 238, the subject matter of Example(s) 236-237 may include wherein when the delay spread is less than the threshold, the beam controller dynamically selects the selective widening or narrowing of at least one beam.

In Example 239, the subject matter of Example(s) 221-238 may include a measurer configured to measure a link quality for one or more of the plurality of beams.

In Example 240, the subject matter of Example(s) 239 may include wherein the beam controller is configured to control the beam scheme based on the link quality of one or more of the plurality of beams.

In Example 241, the subject matter of Example(s) 221-240 may include the one or more antenna arrays.

In Example 242, the subject matter of Example(s) 221-241 may include wherein the predetermined time pattern is communicated with a communication partner device.

In Example 243, a communication device including a controller configured to control one or more antenna arrays including a plurality of antenna elements according to a receive scheme, the controller including a detector configured to detect a change in an angle of arrival of a signal; a subset controller configured to control a first subset of antenna elements of the plurality of antenna elements to receive the signal based on the detected change, wherein the first subset of antenna elements includes less antenna elements than the plurality of antenna elements; and a determiner configured to determine which of the antenna elements in the first subset of antenna elements reports a suitable reception strength and set the one or more antenna arrays to the receive scheme based on the determination.

In Example 244, the subject matter of Example(s) 243 may include wherein the suitable signal strength is the highest signal strength.

In Example 245, the subject matter of Example(s) 243 may include wherein the suitable signal strength is higher than a threshold.

In Example 246, the subject matter of Example(s) 243-245 may include wherein the subset controller is configured to control a second subset of antenna elements, located within the first subset, to receive the signal based on the second subset determination, and the determiner is configured to set the one or more antenna arrays to the receive scheme based on the second subset determination.

In Example 247, the subject matter of Example(s) 243-246 may include wherein the first subset includes about half of the antenna elements of the one or more antenna arrays.

In Example 248, the subject matter of Example(s) 243-246 may include wherein the first subset includes about one quarter of the antenna elements of the one or more antenna arrays.

In Example 249, the subject matter of Example(s) 243-246 may include wherein the first subset includes about one eighth of the antenna elements of the one or more antenna arrays.

In Example 250, the subject matter of Example(s) 246-249 may include wherein the second subset includes half the antenna elements of the first subset.

In Example 251, the subject matter of Example(s) 243-250 may include the one or more antenna arrays.

In Example 252, a communication device including one or more processors configured to control one or more antenna arrays to generate a plurality of beams according to a beam scheme, wherein the beam scheme implements the plurality of beams according to at least one of: over an angular range with respect to the communication device, wherein a first beam of the plurality of beams has a different angle with respect to the communication device than a second beam of the plurality of beams, and each beam of the plurality of beams is maintained based on a predetermined time pattern; or a selective widening or narrowing of at least one beam of the plurality of beams with respect to another beam of the plurality of beams.

In Example 253, a communication device including one or more processors configured to detect a change in an angle of arrival of a signal; control a first subset of antenna elements of the plurality of antenna elements to receive the signal based on the detected change, wherein the first subset of antenna elements includes less antenna elements than the plurality of antenna elements; and determine which of the antenna elements in the first subset of antenna elements reports a suitable reception strength and set the one or more antenna arrays to the receive scheme based on the determination.

In Example 254, a communication device including means to control one or more antenna arrays to generate a plurality of beams according to a beam scheme, wherein the beam scheme implements the plurality of beams according to at least one of: over an angular range with respect to the communication device, wherein a first beam of the plurality of beams has a different angle with respect to the communication device than a second beam of the plurality of beams, and each beam of the plurality of beams is maintained based on a predetermined time pattern; or a selective widening or narrowing of at least one beam of the plurality of beams with respect to another beam of the plurality of beams.

In Example 255, a communication device including means to detect a change in an angle of arrival of a signal; means to control a first subset of antenna elements of the plurality of antenna elements to receive the signal based on the detected change, wherein the first subset of antenna elements includes less antenna elements than the plurality of antenna elements; and means to determine which of the antenna elements in the first subset of antenna elements reports a suitable reception strength and set the one or more antenna arrays to the receive scheme based on the determination.

In Example 256, a method including: making one or more measurements; controlling one or more antenna arrays to generate one or more beams according to a beam scheme based on the one or more measurements, wherein the beam scheme implements the one or more beams according to at least one of: over an angular range with respect to the communication device, wherein a first beam of the one or more beams has a different angle with respect to the communication device than a second beam of the one or more beams, and each beam of the one or more beams is maintained based on a predetermined time pattern, or a selective widening or narrowing of at least one beam of the one or more beams.

In Example 257, the subject matter of Example(s) 256 may include implementing the one or more beams according to scheme over the angular range and the selective widening or narrowing of the at least one beam.

In Example 258, the subject matter of Example(s) 256-257 may include wherein the one or more beams include a plurality of beams and wherein each of the plurality of beams' respective angles are selected from a plurality of angles in a predefined set.

In Example 259, the subject matter of Example(s) 258 may include wherein each angle in the predefined set has a discrete angular change with respect to at least one other angle in the predefined set.

In Example 260, the subject matter of Example(s) 256-259 may include scheduling the plurality of beams to cover the angular range according to a round robin mechanism.

In Example 261, the subject matter of Example(s) 260 may include determining a repetition period of each cycle of the round robin mechanism based on a maximum power exposure (MPE) threshold.

In Example 262, the subject matter of Example(s) 261 may include determining the MPE threshold based on one or more regulations or rules by a regulatory authority.

In Example 263, the subject matter of Example(s) 256-262 may include basing the selective widening or narrowing of the at least one beam of the one or more beams on a maximum power exposure (MPE) threshold.

In Example 264, the subject matter of Example(s) 263 may include wherein a total transmission power of the selective widening or narrowing of the at least one beam of the one or more beams with respect to another beam of the one or more beams remains the same.

In Example 265, the subject matter of Example(s) 263-264 may include wherein the widening or narrowing is performed in at least one of a horizontal, a vertical, or a planar direction with respect to a communication partner device.

In Example 266, the subject matter of Example(s) 256-265 may include dynamically selecting between implementing the beam scheme over the angular range or implementing the selective widening or narrowing of the at least one beam based on the one or more measurements.

In Example 267, the subject matter of Example(s) 266 may include wherein the making one or more measurements includes measuring channel conditions and basing the dynamic selection on the measured channel conditions.

In Example 268, the subject matter of Example(s) 266-267 may include determining between line-of-sight (LoS) channel conditions and multi-path channel conditions based on the measurement of one or more channel parameters.

In Example 269, the subject matter of Example(s) 268 may include wherein a first of the one or more channel parameters is a delay spread measured in one or more received signals.

In Example 270, the subject matter of Example(s) 269 may include wherein the one or more received signals inlcude one or more downlink signals received from a base station, and the one or more downlink signals are spatially associated to one or more uplink channels.

In Example 271, the subject matter of Example(s) 270 may include comparing the delay spread to a predefined delay spread threshold.

In Example 272, the subject matter of Example(s) 271 may include wherein when the delay spread is greater than the threshold, further including selecting implementing the beam scheme over the angular range.

In Example 273, the subject matter of Example(s) 271-272 may include wherein when the delay spread is less than the threshold, further including selecting implementing the selective widening or narrowing of the at least one beam.

In Example 274, the subject matter of Example(s) 256-273 may include wherein the making one or more measurements inlcudes detecting an obstacle between the communication device and a communication partner device.

In Example 275, the subject matter of Example(s) 274 may include controlling the beam scheme based on the detection of the obstacle.

In Example 276, the subject matter of Example(s) 256-275 may include communicating the predetermined time pattern with a communication partner device.

In Example 277, a method for controlling one or more antenna arrays including a plurality of antenna elements according to a receive scheme, the method including: detecting a change in an angle of arrival of a signal; controlling a first subset of antenna elements of the plurality of antenna elements to receive the signal based on the detected change, wherein the first subset of antenna elements includes less antenna elements than the plurality of antenna elements; and determining which of the antenna elements in the first subset of antenna elements reports a suitable reception strength and set the one or more antenna arrays to the receive scheme based on the determination.

In Example 278, the subject matter of Example(s) 277 may include wherein the suitable signal strength is the highest signal strength.

In Example 279, the subject matter of Example(s) 277 may include wherein the suitable signal strength is higher than a threshold.

In Example 280, the subject matter of Example(s) 277-279 may include controlling a second subset of antenna elements, located within the first subset, to receive the signal based on the second subset determination, and setting the one or more antenna arrays to the receive scheme based on the second subset determination.

In Example 281, the subject matter of Example(s) 277-280 may include wherein the first subset includes about half of the antenna elements of the one or more antenna arrays.

In Example 282, the subject matter of Example(s) 277-280 may include wherein the first subset includes about one quarter of the antenna elements of the one or more antenna arrays.

In Example 283, the subject matter of Example(s) 277-280 may include wherein the first subset includes about one eighth of the antenna elements of the one or more antenna arrays.

In Example 284, the subject matter of Example(s) 277-283 may include wherein the second subset includes half the antenna elements of the first subset.

In Example 285, one or more non-transitory computer-readable media storing instructions thereon that, when executed by at least one processor of a communication device, direct the communication device to perform the method of any one of Examples 256-284.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising one or more processors configured to:
    evaluate one or more criteria, wherein a first criterion of the one or more criteria comprises detecting an object;
    determine a plurality of potential beam pairs to use in communications with a second device based on the evaluation of the one or more criteria;
    measure a channel quality for each of the plurality of potential beam pairs;
    determine one or more beam pairs based on the measurements;
    generate a request, based on the measured channel qualities, to the second device to trigger a change to one or more partner-side beams of the one or more beam pairs; and
    adjust an antenna to communicate with the second device via one or more device-side beams of the one or more beam pairs.

2. The communication device of claim 1, wherein a second criterion of the one or more criteria comprises a maximum power exposure (MPE) threshold to electromagnetic radiation.

3. The communication device of claim 2, wherein the one or more processors are configured to determine the plurality of potential beam pairs based on the detection of the object and the MPE threshold.

4. The communication device of claim 1, wherein the measurement of the channel qualities for each of the plurality of potential beam pairs comprises measuring a Layer 1 (L1)-Reference Signal Received Power (RSRP) based on a set of downlink references signals.

5. The communication device of claim 1, wherein the one or more processors are configured to switch to the device-side beam according to a scheduling parameter with the second device.

6. A communication device comprising one or more processors configured to:
    control one or more antenna arrays to generate a plurality of beams according to a beam scheme based on one or more detected objects and dynamically select between implementing the beam scheme:
    over an angular range with respect to the communication device, wherein a first beam of the plurality of beams has a different angle with respect to the communication device than a second beam of the plurality of beams, and each beam of the plurality of beams is maintained based on a predetermined time pattern, and
    by choosing between selectively widening or narrowing of at least one beam of the plurality of beams with respect to another beam of the plurality of beams.

7. The communication device of claim 6, wherein the one or more processors are configured to schedule the plurality of beams to cover the angular range according to a round robin mechanism.

8. The communication device of claim 6 the one or more processors further configured to measure channel conditions, wherein the dynamic selection is based on the measured channel conditions.

9. The communication device of claim 6 the one or more processors further configured to determine between line-of-sight (LoS) channel conditions and multi-path channel conditions based on a measurement of one or more channel parameters.

10. A communication device comprising:
a digital transmitter configured to transmit data on a first channel with a first antenna beam and a first transmit power;
an estimator configured to determine an estimated radio frequency (RF) exposure power to a human object based on the first antenna beam and the first transmit power; and
a controller configured to determine whether the estimated RF exposure power is greater than an exposure power threshold,
wherein, if the controller determines the estimated RF exposure power is greater than the exposure power threshold, the controller is configured to switch the digital transmitter from the first channel to a second channel with narrower bandwidth and the digital transmitter is configured to transmit data on the second channel with a second transmit power lower than the first transmit power.

11. The communication device of claim 10, wherein the controller is configured to switch the digital transmitter from the first channel to the second channel by:
controlling the digital transmitter to transmit signaling to a network access node for channel switching from the first channel to the second channel.

12. The communication device of claim 11, wherein the digital transmitter is configured to transmit the signaling to the network access node on the second channel.

13. The communication device of claim 11, wherein the channel switch is a user equipment (UE)-triggered bandwidth part (BWP) switch procedure, and wherein the second channel is a default BWP and the first channel is a non-default BWP.

14. The communication device of claim 10, wherein if the estimated RF exposure power is greater than the exposure power threshold:
the controller is further configured to identify a high exposure power limit window scheduled before a low exposure power limit window in a time-independent exposure power limit, and to identify a first timepoint based on a channel switch latency and the end timepoint of the high exposure power limit window; and
the digital transmitter is further configured to transmit signaling at the first timepoint to trigger the channel switch from the first channel to the second channel.

15. A communication device comprising:
a sensor configured to detect one or more objects around the communication device; and
a controller configured to:
identify one or more blocked sectors of an antenna array that are blocked by the one or more objects,
select, based on the one or blocked sectors, one or more candidate sectors of the antenna array to evaluate, and
determine radio link qualities of the one or more candidate sectors.

16. The communication device of claim 15, wherein the controller is configured to determine the radio link qualities of the one or more candidate sectors by:
performing a beamsweeping procedure with a network access node to determine the radio link qualities of the one or more candidate sectors.

17. The communication device of claim 15, wherein the antenna array is configured to operate with a plurality of sectors and wherein the one or more blocked sectors are a reduced subset of the plurality of sectors.

18. The communication device of claim 15, wherein the controller is further configured to:
select a target sector based on the radio link qualities; and
control the antenna array to transmit or receive signals with the target sector.

19. The communication device of claim 15, wherein the controller is configured to select the one or more candidate sectors of the antenna array to evaluate by:
identifying, from a plurality of sectors of the antenna array, one or more unblocked sectors that are not partially or fully blocked by the one or more objects; and
including the one or more unblocked sectors in the one or more candidate sectors.

* * * * *